US009712611B2

(12) United States Patent
Narayana et al.

(10) Patent No.: US 9,712,611 B2
(45) Date of Patent: *Jul. 18, 2017

(54) SYSTEMS AND METHODS FOR GSLB MEP CONNECTION MANAGEMENT ACROSS MULTIPLE CORE APPLIANCES

(71) Applicant: Citrix Systems, Inc., Fort Lauderdale, FL (US)

(72) Inventors: Raghav Somanahalli Narayana, Bangalore (IN); Murali Raja, San Jose, CA (US); Rishi Mutnuru, Sunnyvale, CA (US); Ravi Kondamuru, Sunnyvale, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 300 days.

This patent is subject to a terminal disclaimer.

(21) Appl. No.: 13/850,869

(22) Filed: Mar. 26, 2013

(65) Prior Publication Data
US 2013/0232260 A1 Sep. 5, 2013

Related U.S. Application Data

(63) Continuation of application No. 12/645,822, filed on Dec. 23, 2009, now Pat. No. 8,412,832.

(51) Int. Cl.
*G06F 15/173* (2006.01)
*H04L 29/08* (2006.01)

(52) U.S. Cl.
CPC ...... *H04L 67/1036* (2013.01); *H04L 67/1002* (2013.01); *H04L 67/1029* (2013.01); *H04L 29/08846* (2013.01); *H04L 67/2885* (2013.01)

(58) Field of Classification Search
CPC ............ H04L 67/1008; H04L 67/1029; H04L 67/1002; H04L 61/1511; H04L 29/12066
See application file for complete search history.

(56) References Cited

U.S. PATENT DOCUMENTS 6,092,178 A * 7/2000 Jindal et al. .................. 712/27
7,086,061 B1 * 8/2006 Joshi et al. .................. 718/105
(Continued)

OTHER PUBLICATIONS

Notice of Allowance on U.S. Appl. No. 12/645,822 dated Dec. 7, 2012.
(Continued)

*Primary Examiner* — Blake Rubin
(74) *Attorney, Agent, or Firm* — Foley & Lardner LLP; Christopher J. McKenna

(57) ABSTRACT

The present disclosure presents systems and methods for obtaining metric information by a multi-core GSLB intermediary device and providing global server load balancing services using the obtained information. A first core of a multi-core GSLB appliance establishes a transport layer connection to a remote load balancer at a site of a plurality of sites. The first core transmits a message to each of the other cores of the multi-core GSLB appliance that the first core is a master core for receiving metric information from the load balancer. The first core receives metric information of the remote site from the load balancer. The first core propagates the metric information to each of the other cores of the GSLB appliance. A GSLB virtual server on a slave core receives a DNS request. The GSLB virtual server determines a DNS resolution for the DNS request based on the metric information.

20 Claims, 25 Drawing Sheets

(56) References Cited

U.S. PATENT DOCUMENTS

| | | | |
|---|---|---|---|
| 7,254,626 B1* | 8/2007 | Kommula et al. ............. 709/223 |
| 7,369,540 B1* | 5/2008 | Giroti .................... H04L 12/66 |
| | | 370/352 |
| 7,423,977 B1* | 9/2008 | Joshi ............................ 370/252 |
| 7,454,500 B1* | 11/2008 | Hsu et al. ..................... 709/226 |
| 7,584,301 B1* | 9/2009 | Joshi ............................ 709/244 |
| 7,657,629 B1* | 2/2010 | Kommula ......... H04L 29/12066 |
| | | 709/226 |
| 7,965,699 B1* | 6/2011 | Accardi ............. H04L 67/1002 |
| | | 370/351 |
| 2001/0052016 A1* | 12/2001 | Skene et al. .................. 709/226 |
| 2003/0065763 A1* | 4/2003 | Swildens ................ H04L 12/14 |
| | | 709/224 |
| 2004/0019659 A1* | 1/2004 | Sadot .................. H04L 12/2697 |
| | | 709/219 |
| 2004/0133634 A1* | 7/2004 | Luke .................. G06F 11/2089 |
| | | 709/203 |
| 2006/0075119 A1* | 4/2006 | Hussain ................ H04L 49/90 |
| | | 709/227 |
| 2006/0224725 A1 | 10/2006 | Bali et al. |
| 2007/0233851 A1* | 10/2007 | Ma ..................... H04L 67/1008 |
| | | 709/224 |
| 2008/0225718 A1 | 9/2008 | Raja et al. |
| 2009/0070448 A1* | 3/2009 | Pearson ............ H04L 29/12264 |
| | | 709/223 |
| 2009/0193129 A1* | 7/2009 | Agarwal ............. H04L 63/0281 |
| | | 709/229 |
| 2010/0042743 A1* | 2/2010 | Jeon ................. H04L 29/12066 |
| | | 709/238 |
| 2010/0095008 A1* | 4/2010 | Joshi ............................ 709/228 |
| 2011/0126196 A1* | 5/2011 | Cheung et al. ................... 718/1 |
| 2011/0231561 A1* | 9/2011 | Pawson .................. H04W 4/02 |
| | | 709/228 |
| 2015/0215267 A1* | 7/2015 | Kagan ................ H04L 61/1511 |
| | | 709/245 |

OTHER PUBLICATIONS

Office Action on U.S. Appl. No. 12/645,822 dated Dec. 7, 2011.
Office Action on U.S. Appl. No. 12/645,822 dated Feb. 14, 2011.
Office Action on U.S. Appl. No. 12/645,822 dated Apr. 16, 2012.
US Office Action on U.S. Appl. No. 12/645,822 dated Jun. 7, 2011.

* cited by examiner

SYSTEMS AND METHODS FOR GSLB MEP CONNECTION MANAGEMENT ACROSS MULTIPLE CORE APPLIANCES

RELATED APPLICATION

This application claims the benefit of and priority to U.S. Non-provisional application Ser. No. 12/645,822, entitled "Systems and Methods for GSLB Connection Management Across Multiple Core Appliances" and filed on Dec. 23, 2009, which is incorporated herein by reference in its entirety.

FIELD OF THE INVENTION

The present application generally relates to data communication networks. In particular, the present application relates to systems and methods for performing global service load balancing (GSLB) by a network device.

BACKGROUND OF THE INVENTION

A corporate or enterprise may deploy a number of services across a network to enhance the quality of service provided by the enterprise to the clients accessing the services via servers of the enterprise. The servers of the enterprise may be optimized in a number of ways to meet the demand and load from the volume of clients' requests. In some configurations, the enterprise may further provide one or more intermediaries to manage the network traffic from the clients requesting access to one or more enterprise servers. The enterprise may further provide one or more load balancing network devices manage the network traffic handled by the enterprise servers.

BRIEF SUMMARY OF THE INVENTION

In some instances, a global server load balancing (GSLB) device may be deployed to manage network traffic distributed across a plurality of sites. Each site may comprise one or more load balancing network devices managing traffic across a plurality of servers from each of the sites. The servers may receive client requests accessing various services or resources provided by the servers. Load balancing devices may distribute the network traffic to optimize the performance of the servers and avoid any of the servers being overburdened or crashing. The GSLB device may receive any DNS requests from any clients in order to provide the internet protocol addresses for the clients to access the desired resources on the servers.

In some embodiments, the GSLB device may be a multi-core GSLB device which comprises a plurality of cores, each comprising a GSLB virtual server capable of providing and performing the global server load balancing for the each of the load balancers at each of the sites. The GSLB virtual server load balancers at each of the cores may perform the load balancing based on the metrics and/or information available to each of the cores. However, as the metrics change the performance of each of the GSLB virtual server may begin to deteriorate as the GSLB virtual servers may use outdated or incorrect metrics or information to perform the load balancing. As the network traffic load may continuously change, the multi-core GSLB device may update, maintain and consolidate all the metrics used for global server load balancing and then distribute the updated and consolidated metrics to each of the cores. The GSLB virtual servers at each of the cores may then continue to provide global service load balancing without the deterioration, since the metrics used by each of the GSLB virtual servers at each of the cores would be updated using the updated metrics from the consolidator of the master core.

In some aspects, present disclosure relates to a method of obtaining metric information by a multi-core intermediary device for providing global server load balancing. A first core of a plurality of cores of a first intermediary device providing global server load balancing (GSLB) to a plurality of remote sites may establish a first transport layer connection to a second intermediary device providing services to a first remote site of the plurality of remote sites. The first core of the first intermediary device may transmit a message to each of the other cores of the plurality of cores of the first intermediary device that the first core is a master core for receiving metric information from the second intermediary device. The first core may receive, via the first transport layer connection, metric information of the remote site from the second intermediary device. The first core may propagate the metric information to each of the other cores of the plurality of cores. A GSLB virtual server executing on a second core of the plurality of cores of the first intermediary device may receive a domain name service (DNS) request. The GSLB virtual server may determine a DNS resolution to one of the plurality of remote sites for the DNS request based on the metric information.

In some embodiments, the first intermediary device determines that an internet protocol address of the first intermediary device is lower than a second internet protocol address of the second intermediary device and responsive to the determination, establishes the first transport layer connection. In some embodiments, the second core of the plurality of cores of the first intermediary device establishes a second transport layer connection to a third intermediary device providing services to a second remote site. In further embodiments, the second core transmits a second message to each of the other cores of the plurality of cores that the second is the master core for receiving metric information from the third intermediary device. In further embodiments, the second core receives, via the second transport layer connection, metric information of the second remote site from the third intermediary device. The second core may propagate the metric information of the second remote site to each of the other cores of the plurality of cores. In further embodiments, the second core receives an update of metric information for the first remote site from a third core and ignores the update responsive to identifying that the third core is not the master core for the first remote site. In some embodiments, the first core transmits an update message to the other cores, the update message identifying a difference between a currently obtained value of a metric and a previous value of the metric. In certain embodiments, the first core establishes a monitor to monitor a status of the first remote site. In specific embodiments, the first core determines, responsive to the monitor, that the first remote site is down and transmits a second message to the other cores that the first remote site is down. In further embodiments, by the GSLB service of the second core receives a second DNS request and does not including the first remote site in determining a resolution for the second DNS request.

In some aspects, the present disclosure relates to a system of obtaining metric information by a multi-core intermediary device for providing global server load balancing. A first core of a plurality of cores of a first intermediary device may provide global server load balancing (GSLB) to a plurality of remote sites and establish a first transport layer connection to a second intermediary device providing services to a first remote site of the plurality of remote sites. The first core may transmit a message to each of the other cores of the plurality of cores of the first intermediary device that the first core is a master core for receiving metric information from the second intermediary device. A GSLB virtual server executing on a second core of the plurality of cores of the first intermediary device may receive a domain name (DNS) request and determine a DNS resolution to one of the plurality of remote sites for the DNS request based on the metric information. The first core may receive, via the first transport layer connection, the metric information of the remote site from the second intermediary device and propagate the metric information to each of the other cores of the plurality of cores.

In some embodiments, the first intermediary device determines that an internet protocol address of the first intermediary device is lower than a second internet protocol address of the second intermediary device and responsive to the determination, establishes the first transport layer connection. In some embodiments, the second core of the plurality of cores of the first intermediary device establishes a second transport layer connection to a third intermediary device providing services to a second remote site. In further embodiments, the second core transmits a second message to each of the other cores of the plurality of cores that the second is the master core for receiving metric information from the third intermediary device. In still further embodiments, the second core receives, via the second transport layer connection, metric information of the second remote site from the third intermediary device and propagates the metric information of the second remote site to each of the other cores of the plurality of cores. In yet further embodiments, the second core receives an update of metric information for the first remote site from a third core and ignores the update responsive to identifying that the third core is not the master core for the first remote site. In some embodiments, the first core transmits an update message to the other cores, the update message identifying a difference between a currently obtained value of a metric and a previous value of the metric. In yet further embodiments, the first core establishes a monitor to monitor a status of the first remote site. In some embodiments, the first core determines, responsive to the monitor, that the first remote site is down and transmits a second message to the other cores that the first remote site is down. In certain embodiments, the GSLB service of the second core receives a second DNS request and does not include the first remote site in determining a resolution for the second DNS request.

BRIEF DESCRIPTION OF THE FIGURES

The foregoing and other objects, aspects, features, and advantages of the invention will become more apparent and better understood by referring to the following description taken in conjunction with the accompanying drawings, in which.

In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server;

Section D describes embodiments of systems and methods for virtualizing an application delivery controller;

Section E describes embodiments of systems and methods for providing a multi-core architecture and environment; and Section F describes embodiments of systems and methods for load balancing using metrics.

Section G describes embodiments of systems and methods for global server load balancing (GSLB) across heterogeneous devices Section H describes embodiments of systems and methods for synchronizing metrics across a plurality of cores in a multi-core system; and Section I describes embodiments of systems and methods for obtaining and managing metrics for global server load balancing by a multi-core GSLB device.

A. Network and Computing Environment

Figure 1A:
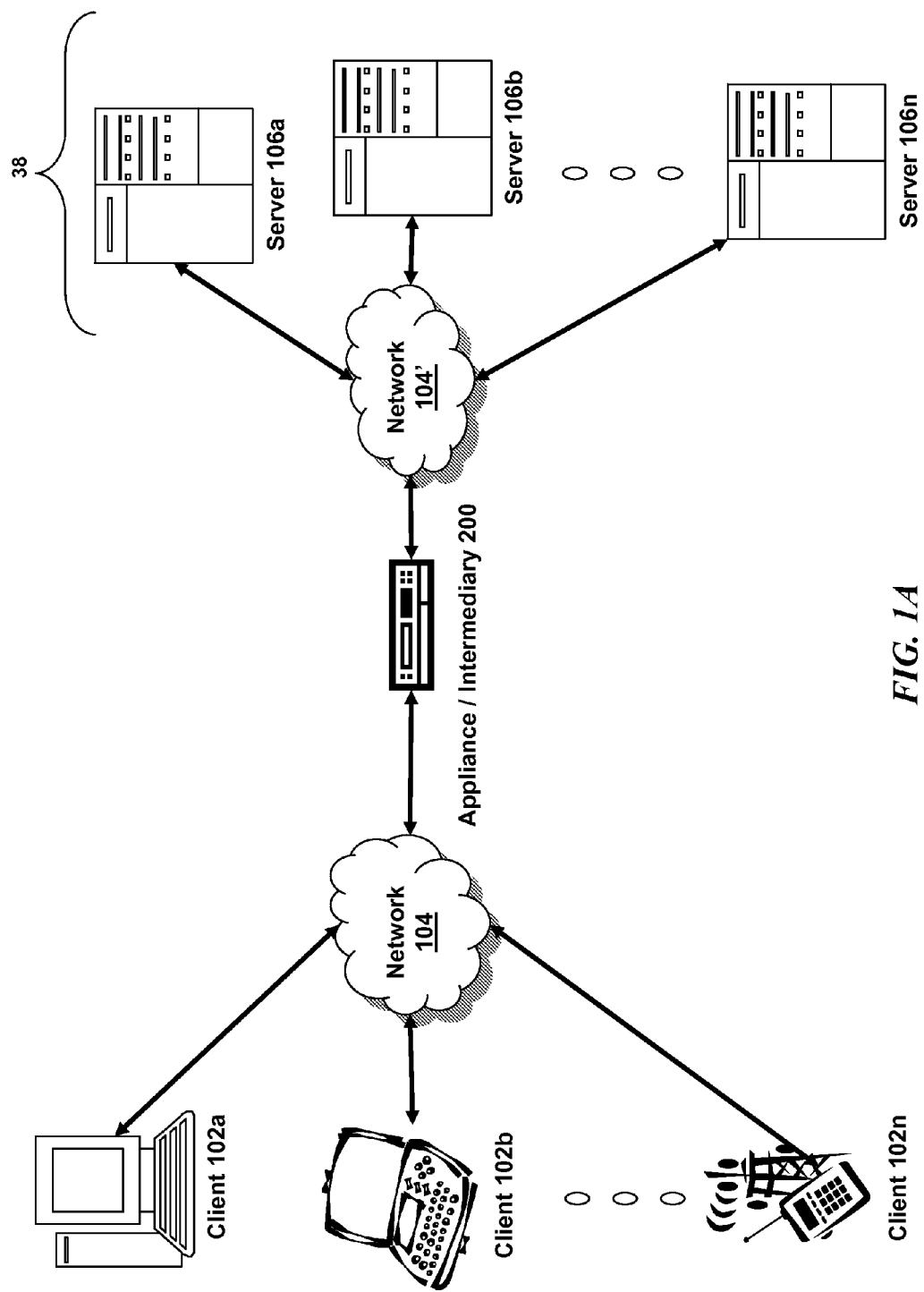
FIG. 1A is a block diagram of an embodiment of a network environment for a client to access a server via an appliance.

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
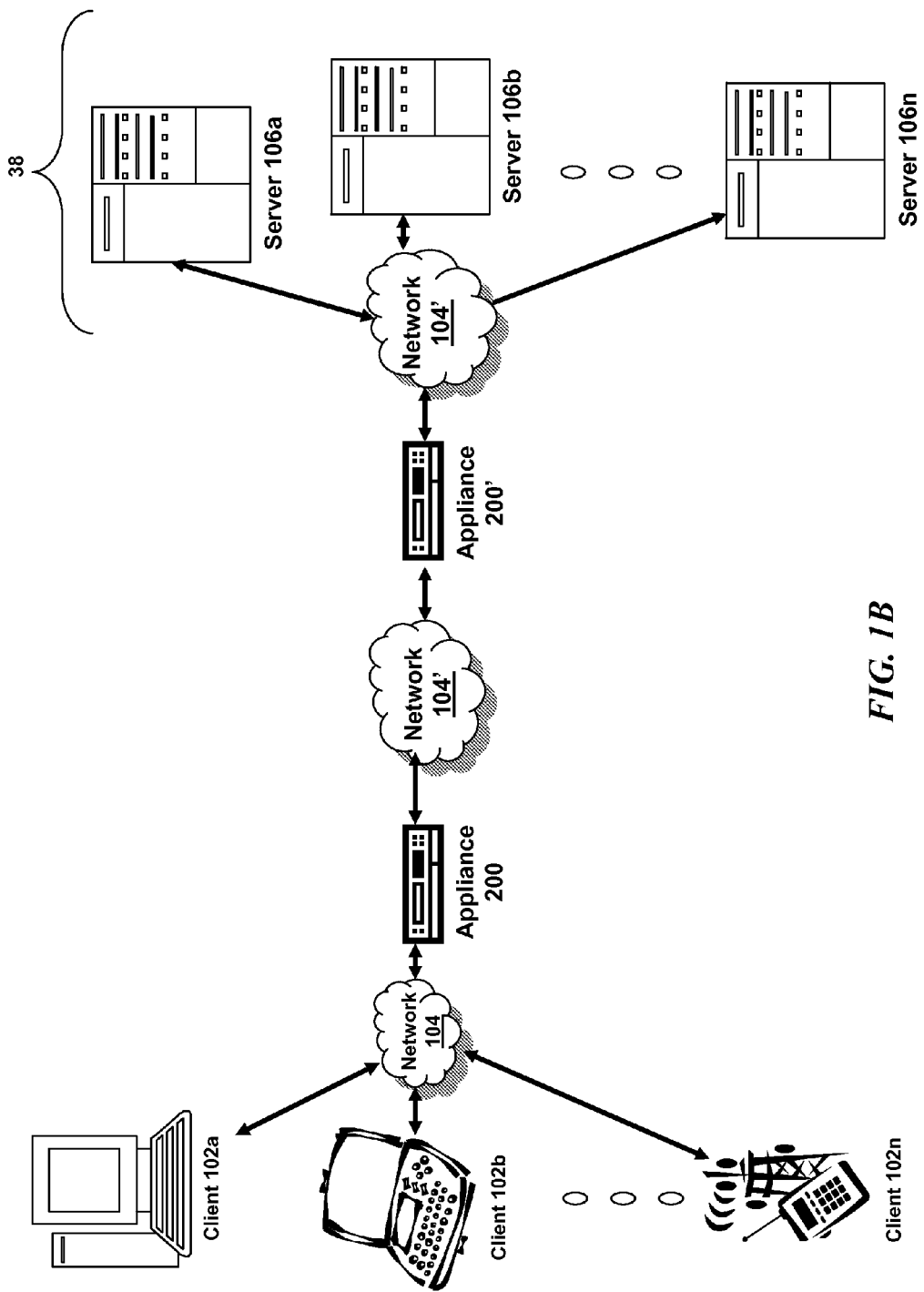
FIG. 1B is a block diagram of an embodiment of an environment for delivering a computing environment from a server to a client via an appliance.
Figure 1C:
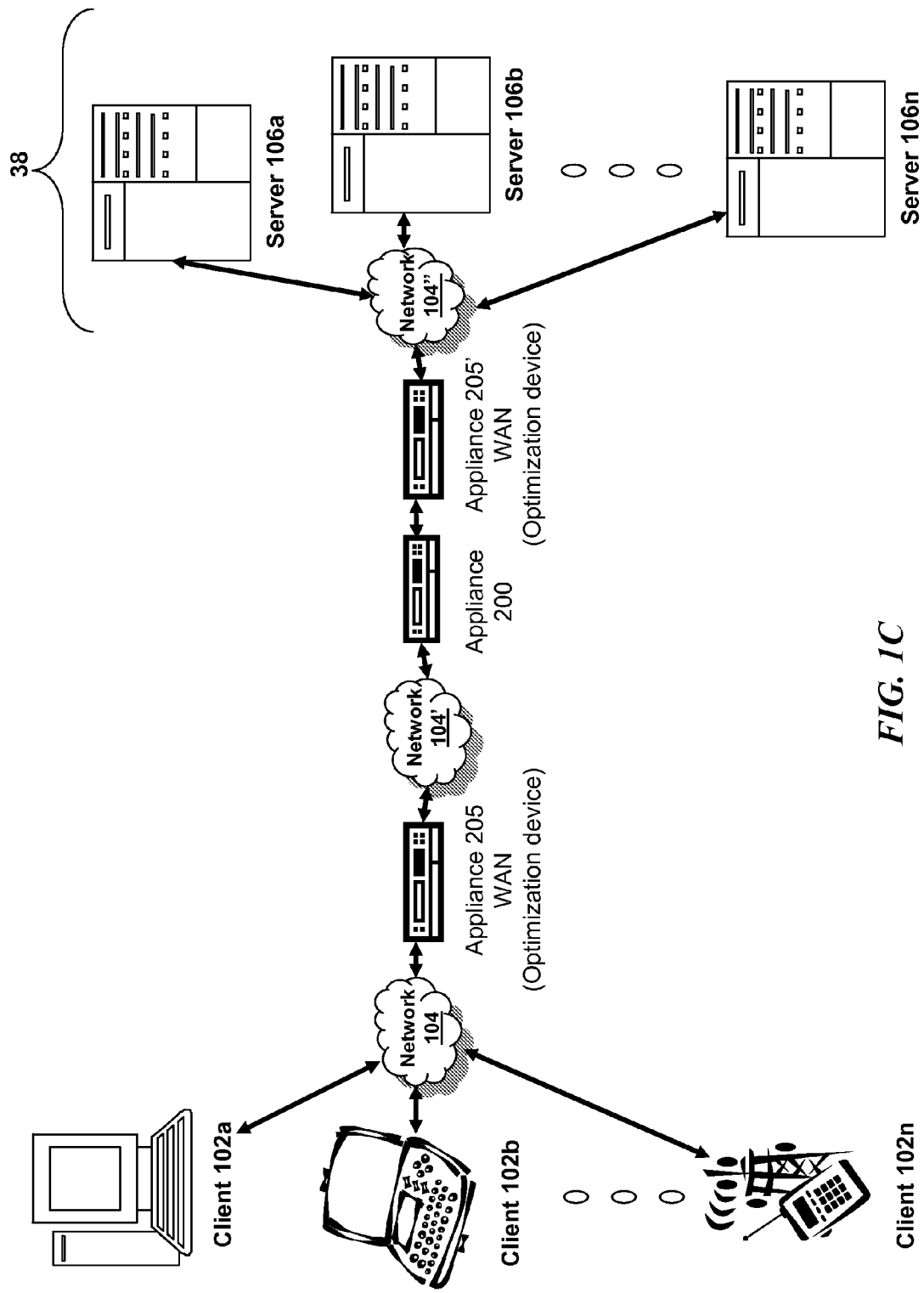
FIG. 1C is a block diagram of another embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and a second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
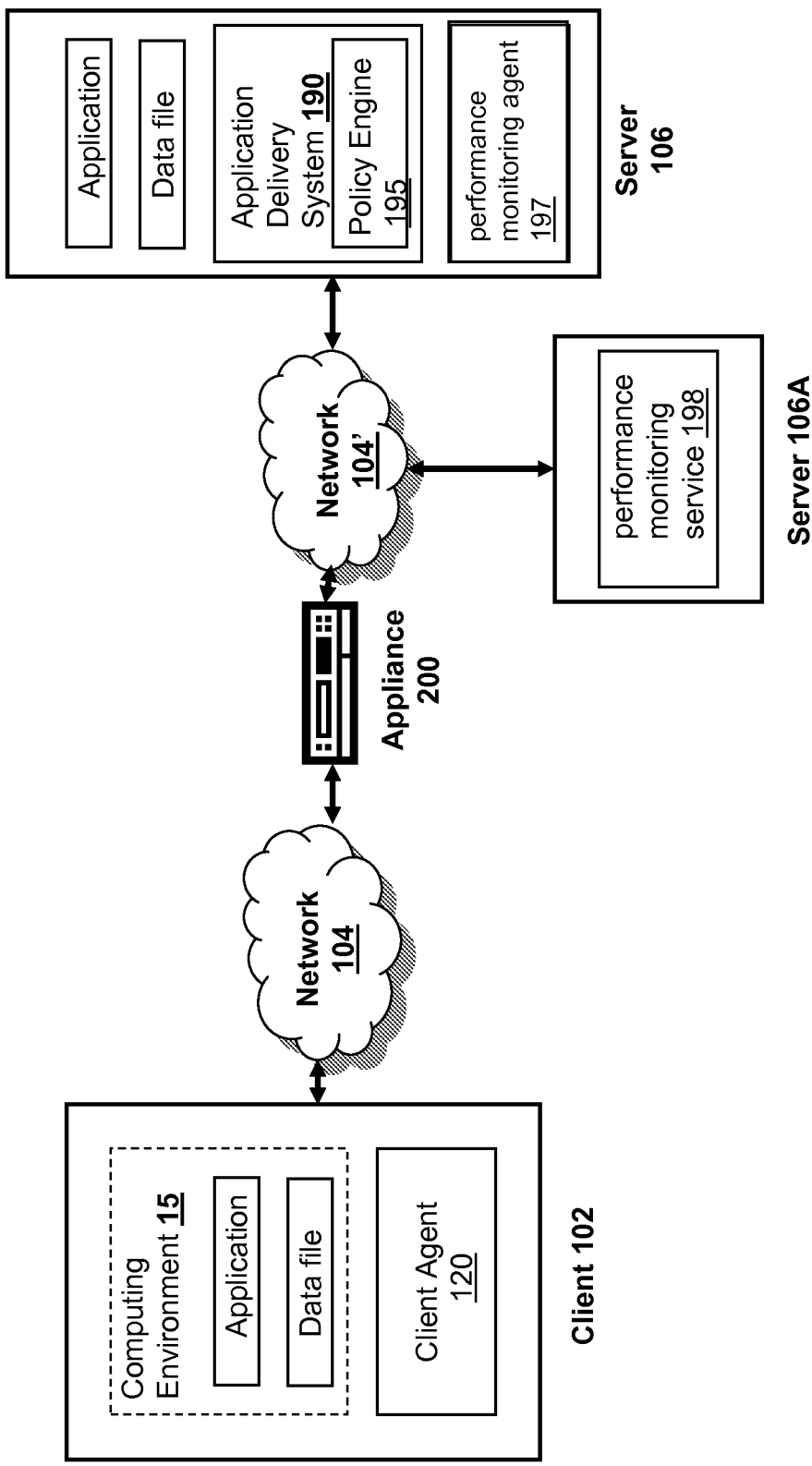
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
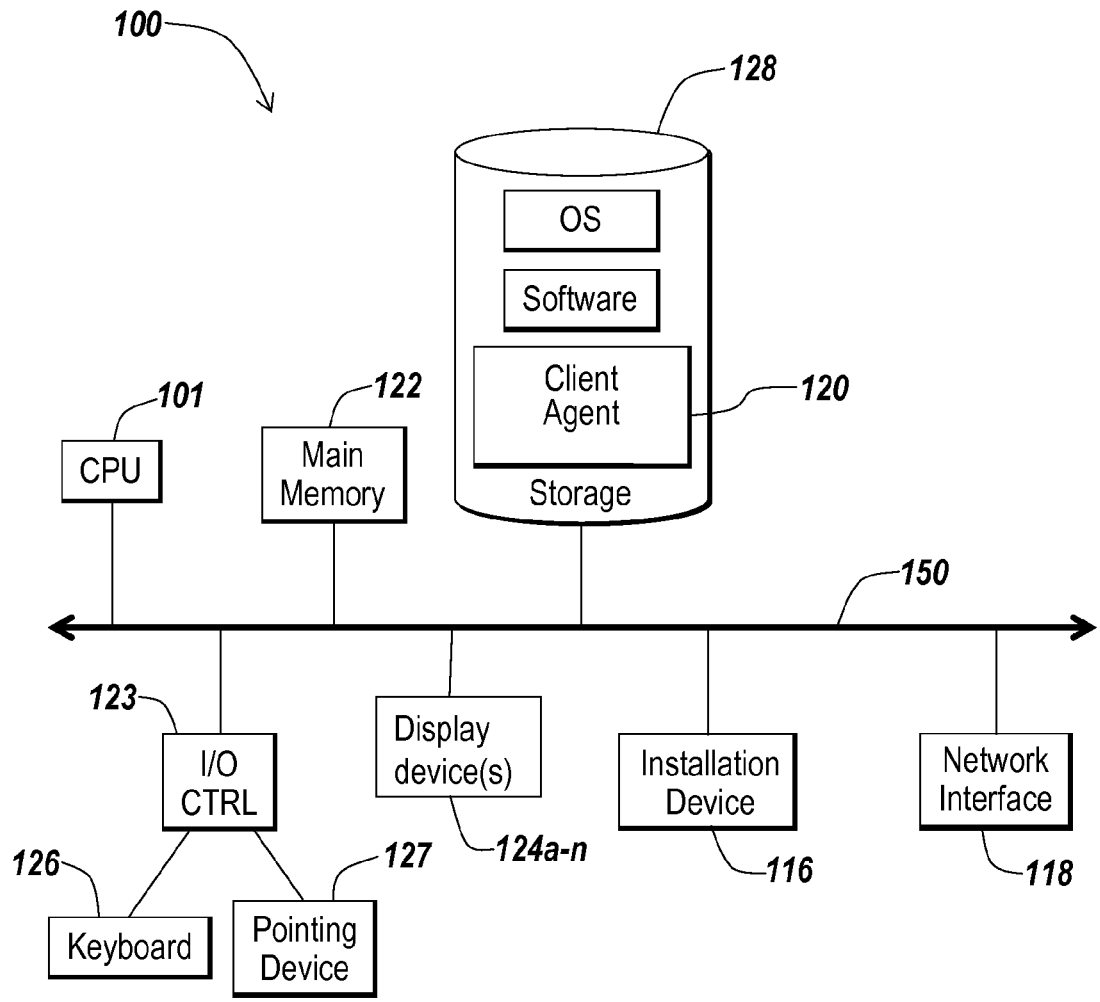
FIGS. 1E-1H are block diagrams of embodiments of a computing device.
Figure 1F:
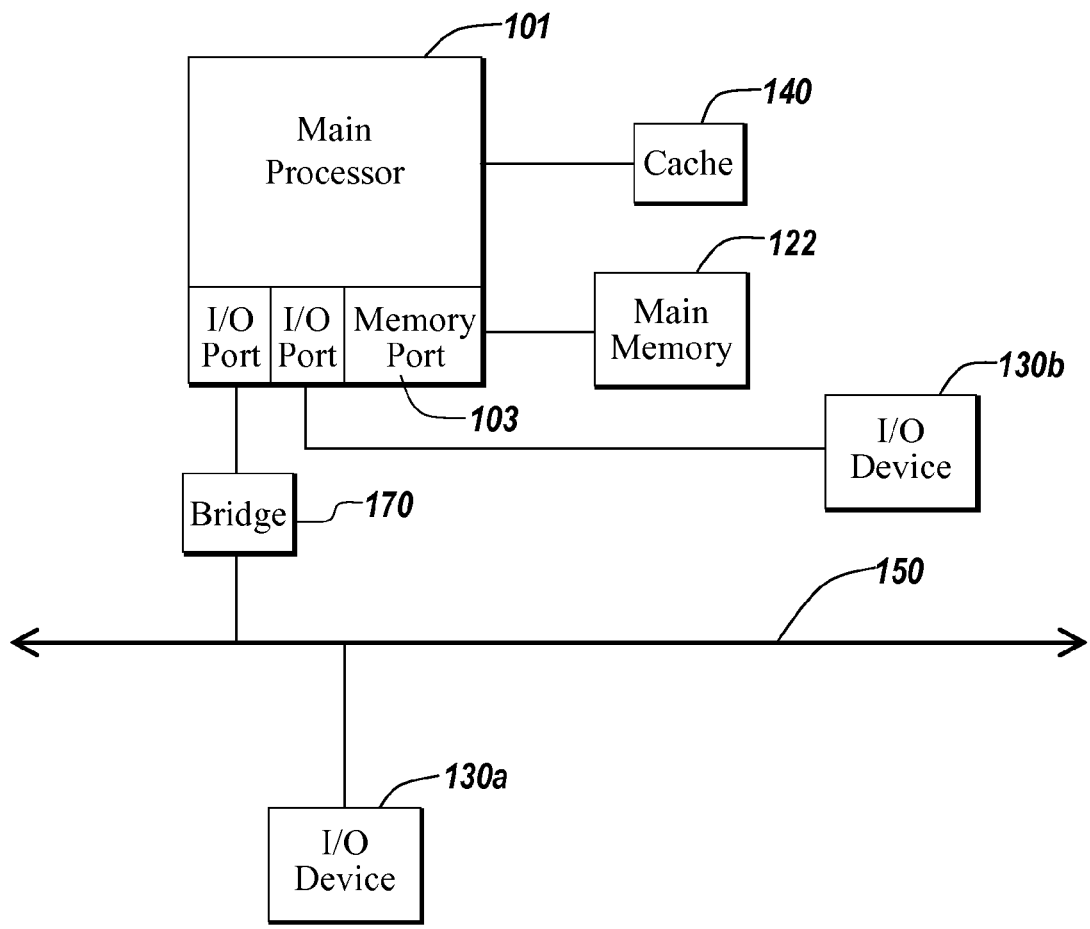

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130*a*-130*b* (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1F depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1F, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130b via HyperTransport, Rapid I/O, or InfiniBand. FIG. 1F also depicts an embodiment in which local busses and direct communication are mixed: the processor 101 communicates with I/O device 130b using a local interconnect bus while communicating with I/O device 130a directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124*a* for the computing device 100. One ordinarily skilled in the art will recognize and appreciate the various ways and embodiments that a computing device 100 may be configured to have multiple display devices 124*a*-124*n*.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
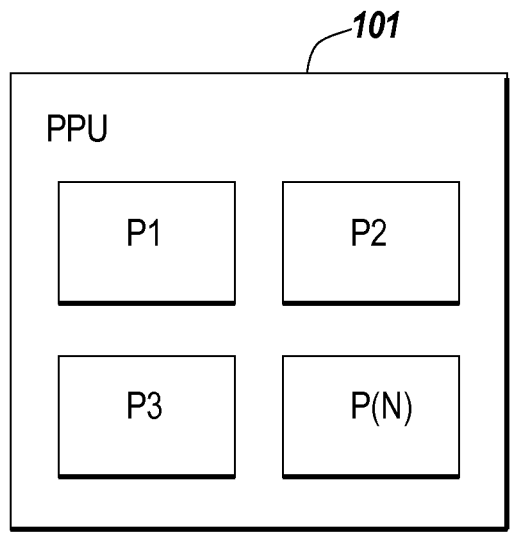

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
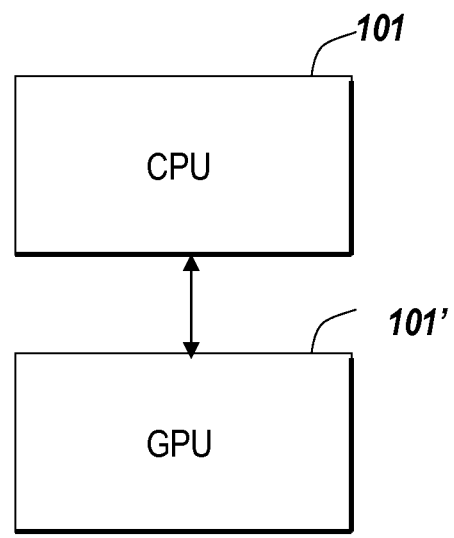

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100*a* executes an application on behalf of a user of a client computing device 100*b*. In other embodiments, a computing device 100*a* executes a virtual machine, which provides an execution session within which applications execute on behalf of a user or a client computing devices 100*b*. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
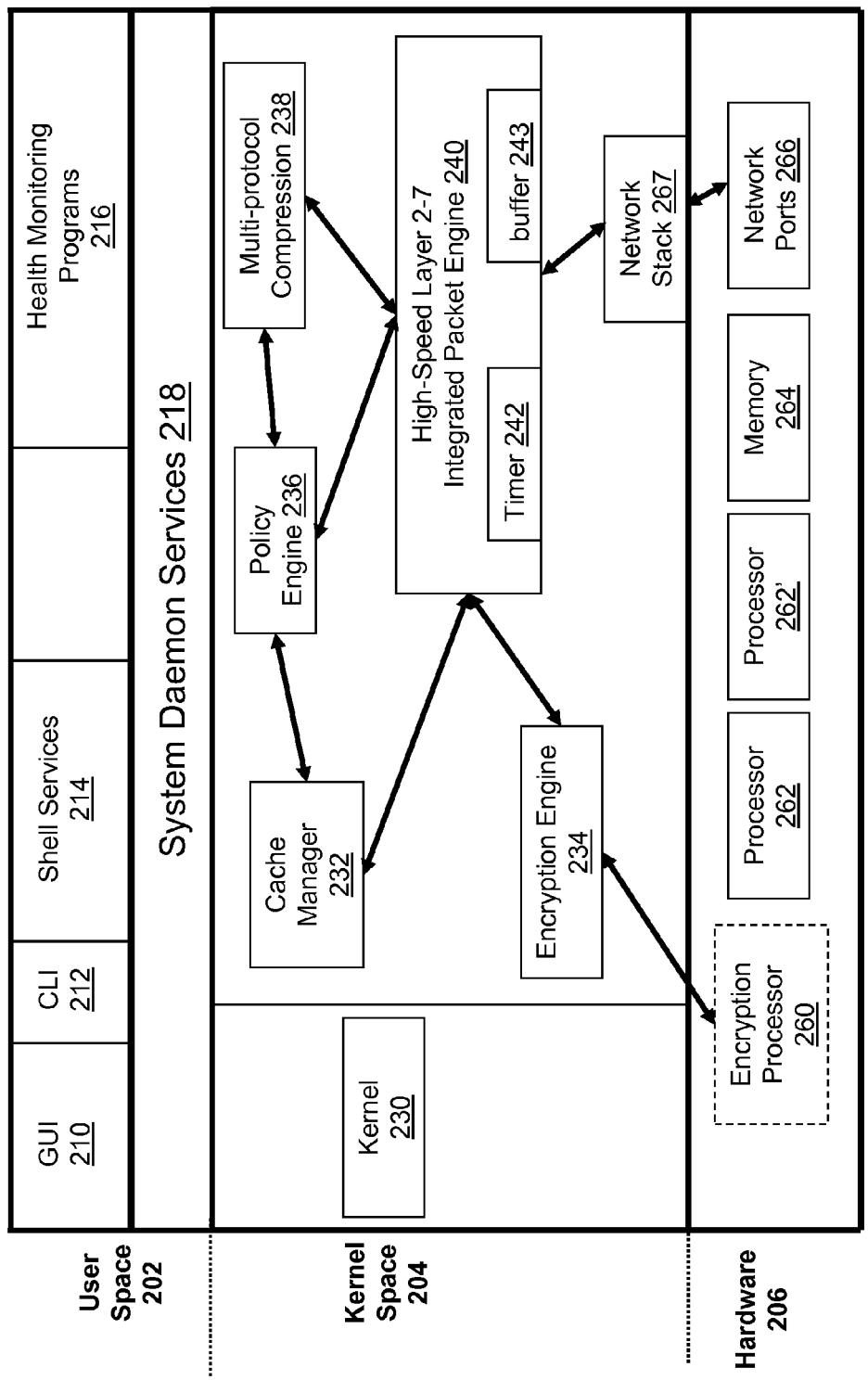
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2A, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), Hyper-Text Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
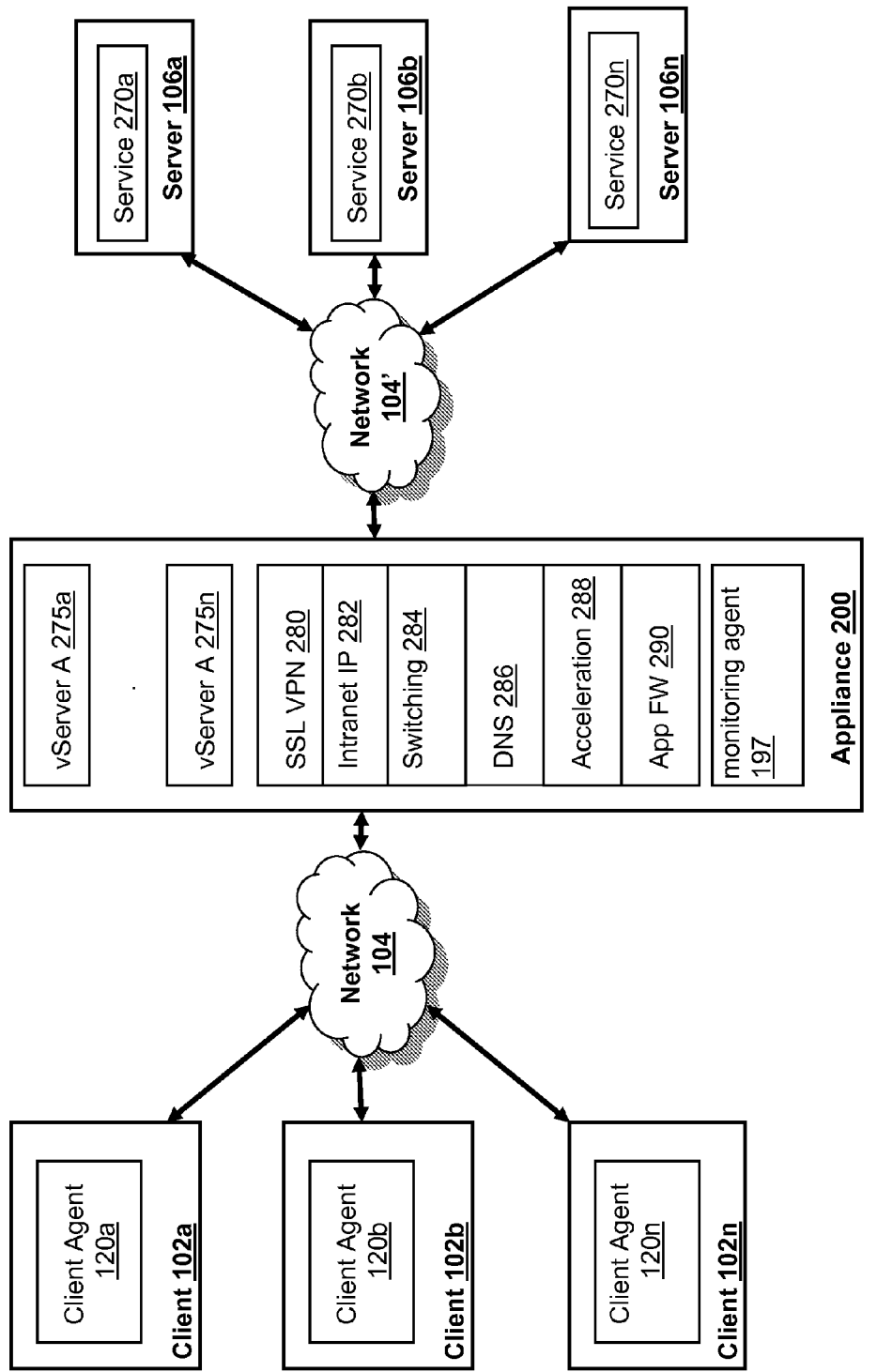
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a vServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102 In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or IntranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP address 282, which is a network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement numbers expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
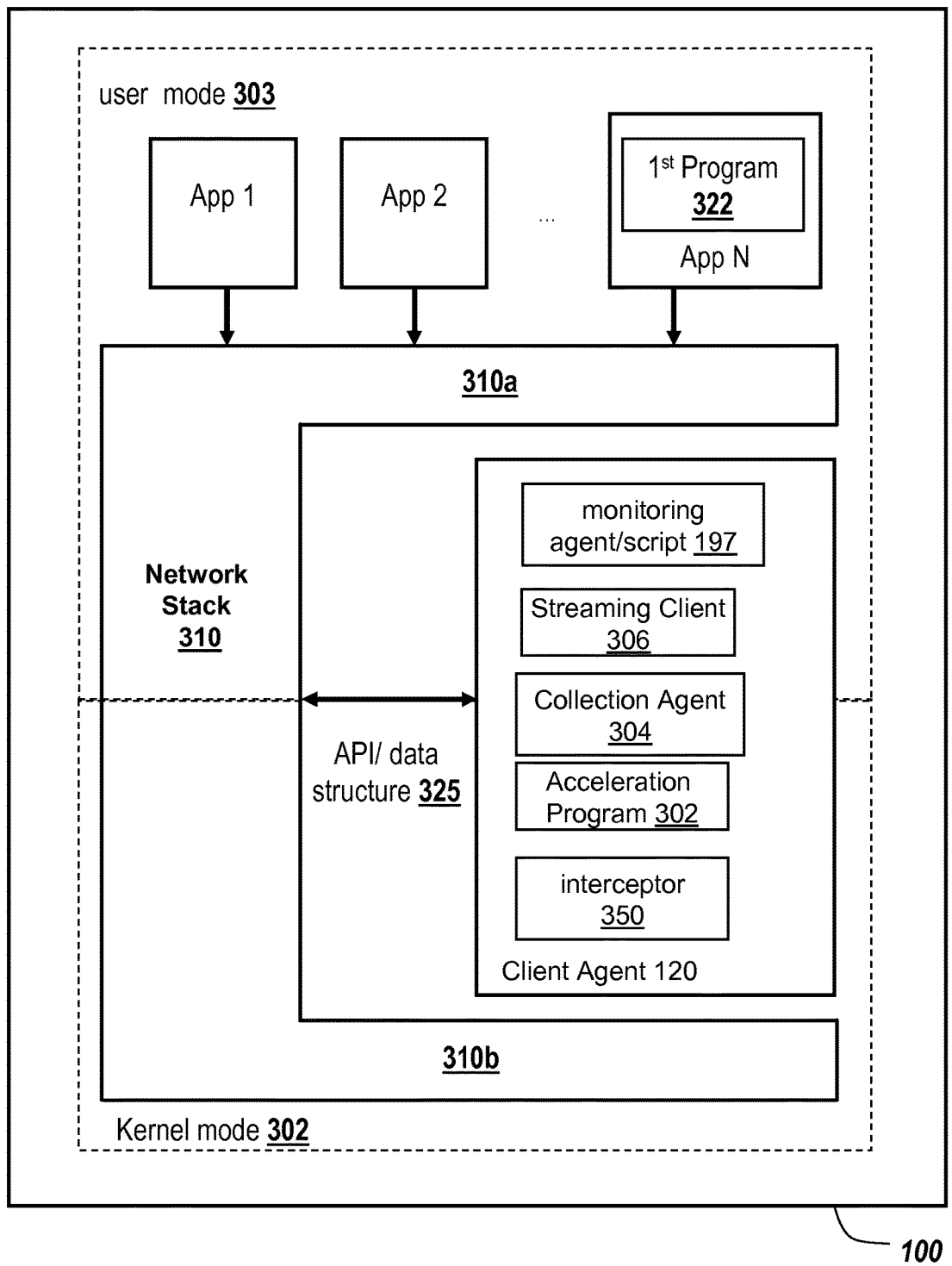
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 302 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol. The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 197 monitors and measures performance of any portion of the client agent 120. For example, in some embodiments, the monitoring agent 197 monitors and measures performance of the acceleration program 302. In another embodiment, the monitoring agent 197 monitors and measures performance of the streaming client 306. In other embodiments, the monitoring agent 197 monitors and measures performance of the collection agent 304. In still another embodiment, the monitoring agent 197 monitors and measures performance of the interceptor 350. In some embodiments, the monitoring agent 197 monitors and measures any resource of the client 102, such as memory, CPU and disk.

The monitoring agent 197 may monitor and measure performance of any application of the client. In one embodiment, the monitoring agent 197 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4A:
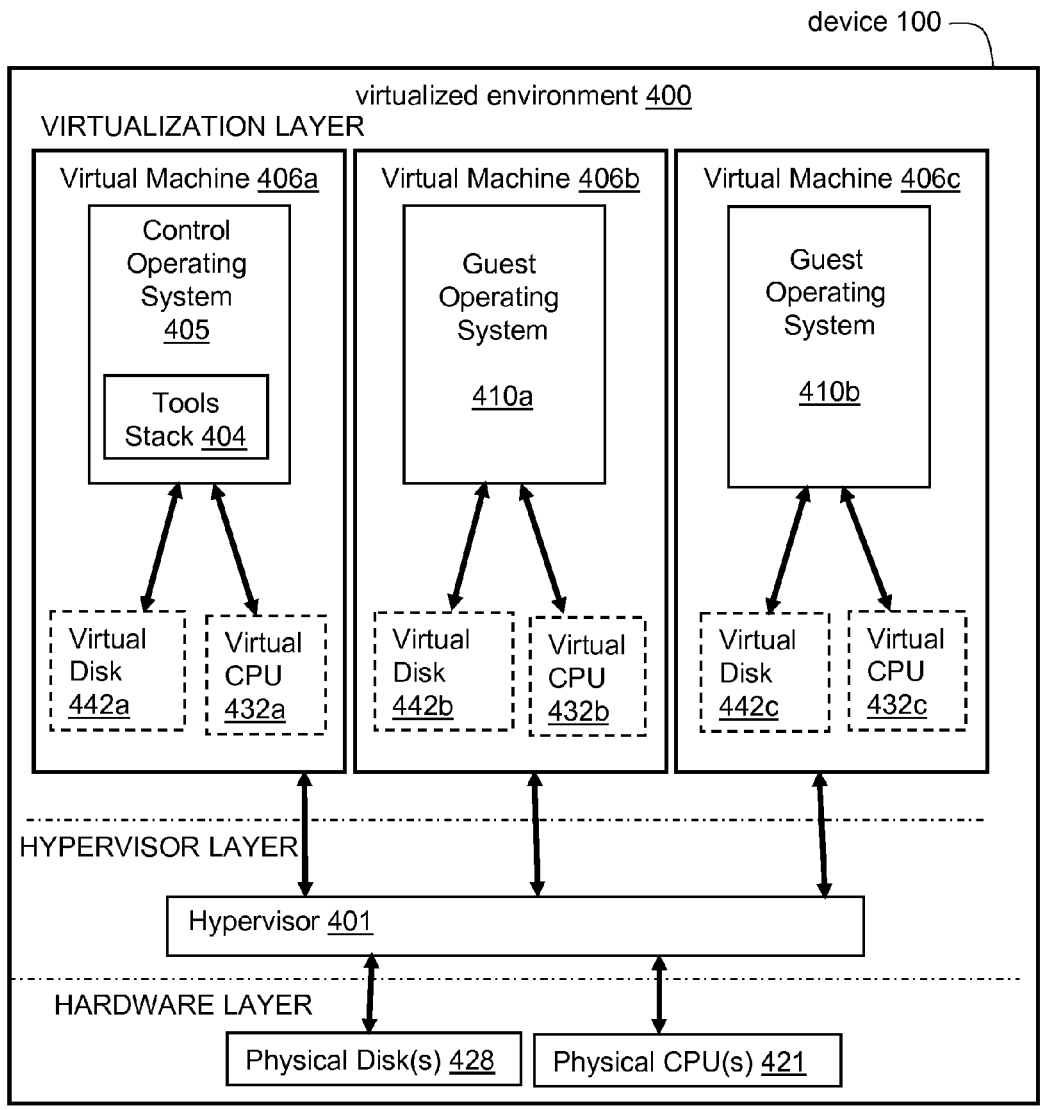
FIG. 4A is a block diagram of an embodiment of a virtualization environment.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406a-c (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405a on a computing device 100a may exchange data with a control operating system 405b on a computing device 100b, via communications between a hypervisor 401a and a hypervisor 401b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100b), or managing virtual machines 406b, 406c on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 404.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4B:
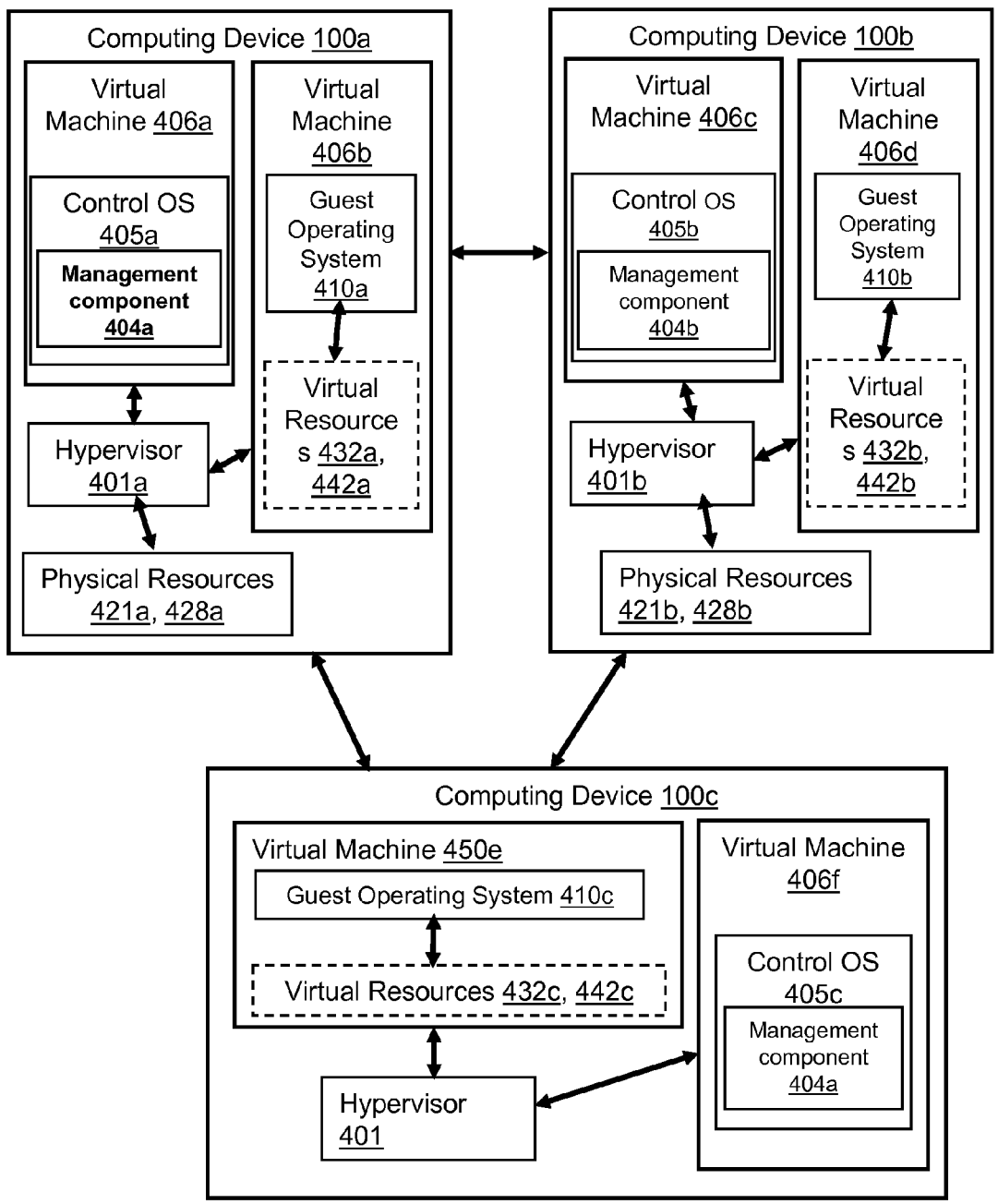
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to variously as tools stacks 404 or management components 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404a is referred to as a pool management component 404a. In another embodiment, a management operating system 405a, which may be referred to as a control operating system 405a, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406b from one physical machine 100 to another. In further embodiments, the management component 404a identifies a computing device 100b on which to execute a requested virtual machine 406d and instructs the hypervisor 401b on the identified computing device 100b to execute the identified virtual machine; such a management component may be referred to as a pool management component.

Figure 4C:
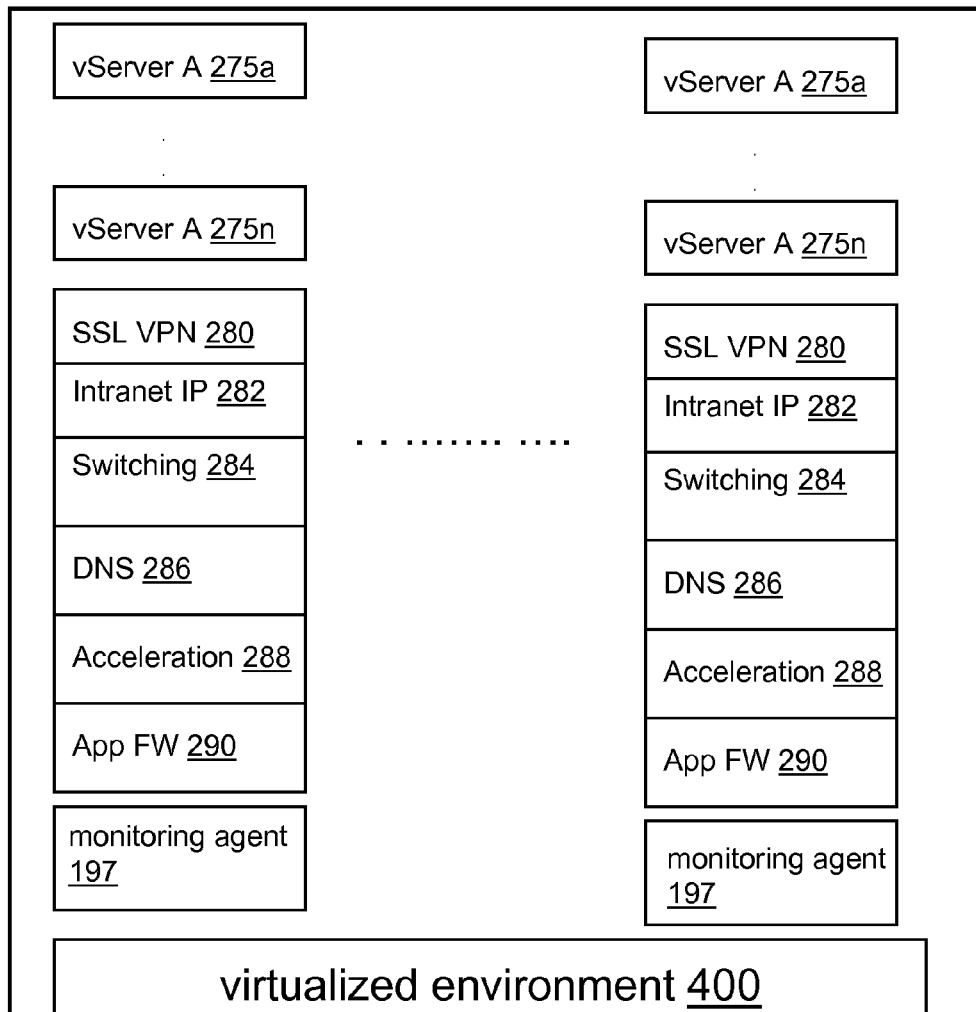
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing a Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7× increase in performance and scalability.

Figure 5A:
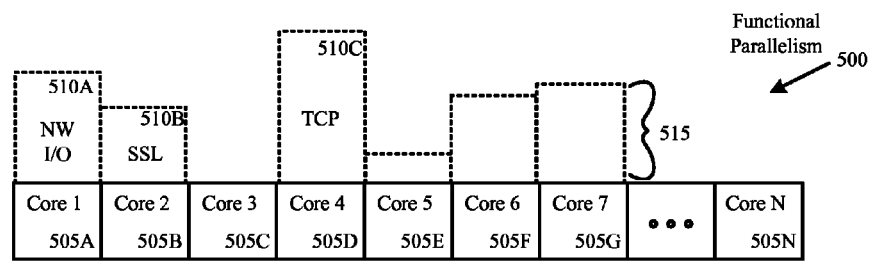
FIG. 5A are block diagrams of embodiments of approaches to implementing parallelism in a multi-core system.
Figure 5A:
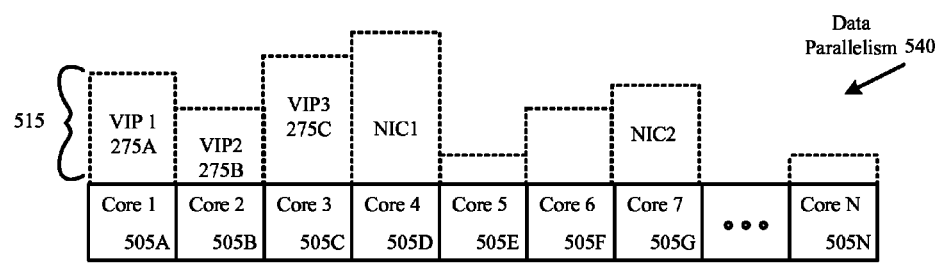
Figure 5A:
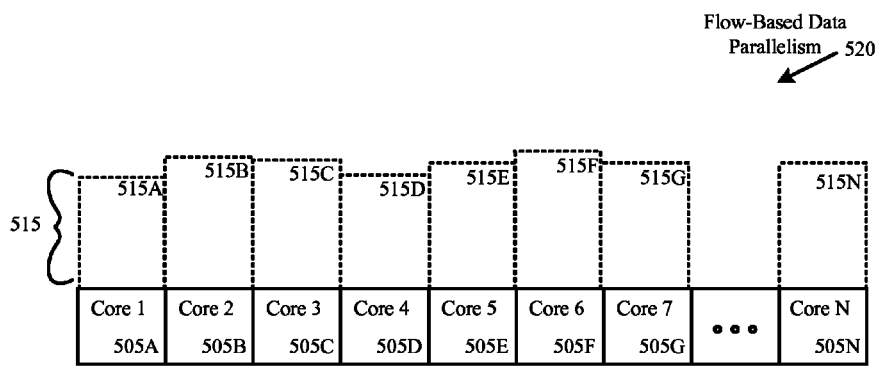

Illustrated in FIG. 5A are some embodiments of work, task, load or network traffic distribution across one or more processor cores according to a type of parallelism or parallel computing scheme, such as functional parallelism, data parallelism or flow-based data parallelism. In brief overview, FIG. 5A illustrates embodiments of a multi-core system such as an appliance 200' with n-cores, a total of cores numbers 1 through N. In one embodiment, work, load or network traffic can be distributed among a first core 505A, a second core 505B, a third core 505C, a fourth core 505D, a fifth core 505E, a sixth core 505F, a seventh core 505G, and so on such that distribution is across all or two or more of the n cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level 515 across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

In further detail to FIG. 5A, in some embodiments, load, work or network traffic can be distributed among cores 505 according to functional parallelism 500. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism 500, can comprise distributing network traffic according to a particular function such as network input/output management (NW I/O) 510A, secure sockets layer (SSL) encryption and decryption 510B and transmission control protocol (TCP) functions 510C. This may lead to a work, performance or computing load 515 based on a volume or level of functionality being used. In some embodiments, distributing work across the cores

505 according to data parallelism 540, can comprise distributing an amount of work 515 based on distributing data associated with a particular hardware or software component. In some embodiments, distributing work across the cores 505 according to flow-based data parallelism 520, can comprise distributing data based on a context or flow such that the amount of work 515A-N on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A, division by function may lead to different cores running at different levels of performance or load 515.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A division by function may lead to different cores running at different levels of load or performance.

Figure 5B:
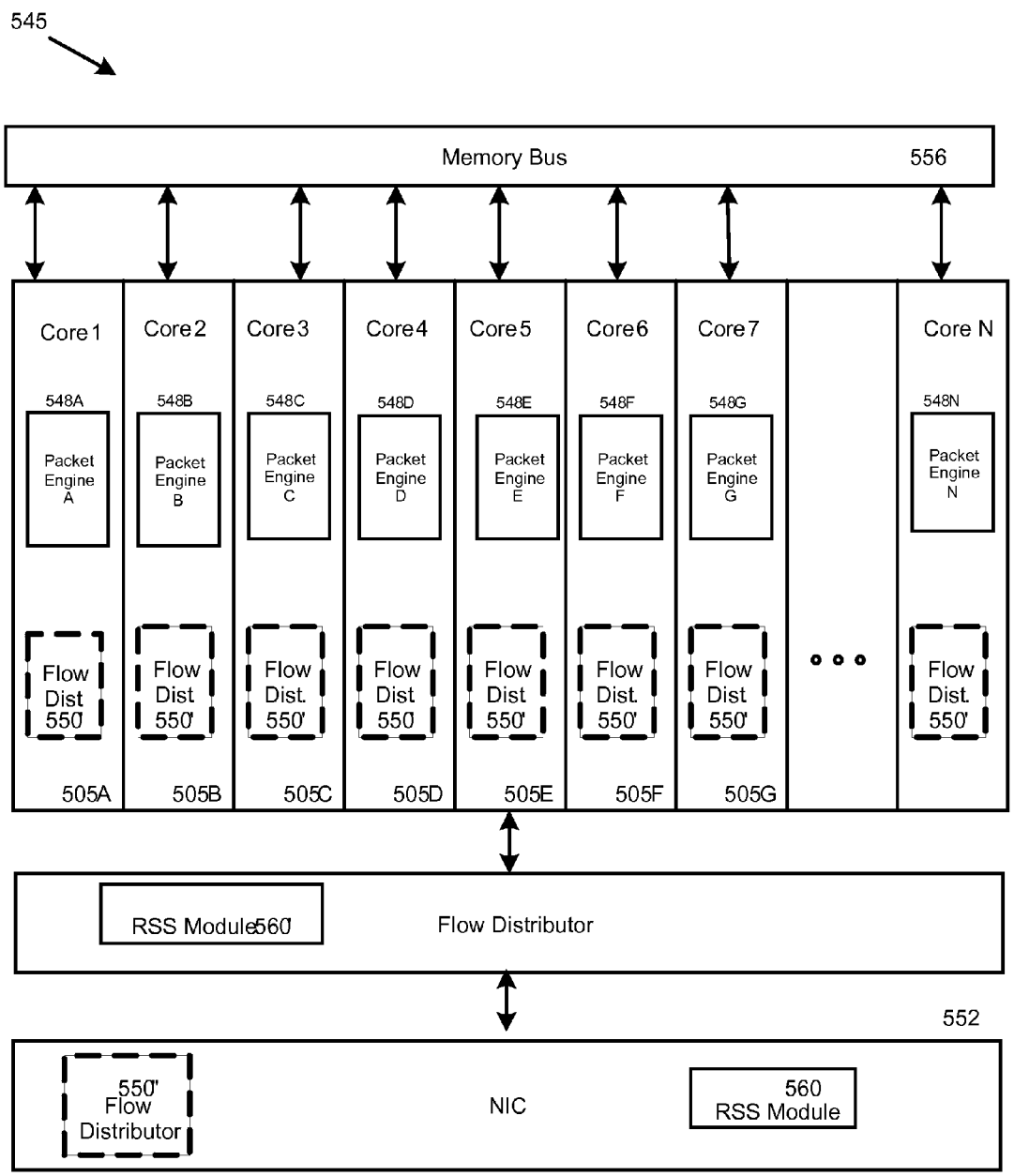
FIG. 5B is a block diagram of an embodiment of a system utilizing a multi-core system.

The functionality or tasks may be distributed in any arrangement and scheme. For example, FIG. 5B illustrates a first core, Core 1 505A, processing applications and processes associated with network I/O functionality 510A. Network traffic associated with network I/O, in some embodiments, can be associated with a particular port number. Thus, outgoing and incoming packets having a port destination associated with NW I/O 510A will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

While FIG. 5A illustrates functions such as network I/O, SSL and TCP, other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism 540. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) 542D-E and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load 515.

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

While FIG. 5A illustrates a single vServer associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In one embodiment, a single NIC can be associated with a single core 505, as is the case with NIC1 542D and NIC2 542E. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores as illustrated by the varying loads 515 of FIG. 5A.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism 520, distribution of data is related to any type of flow of data, such as request/response pairings, transactions, sessions, connections or application communications. For example, network traffic between a client and a server traversing the appliance may be distributed to and processed by one core of the plurality of cores. In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In one embodiment, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load 515A on Core 1 505A may be comprised of the network traffic associated with the transactions between the particular client and server. Allocating the network traffic to Core 1 505A can be accomplished by routing all data packets originating from either the particular client or server to Core 1 505A.

While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load 515A on Core 1 is less than the load 515B-N on the rest of the cores 505B-N. Once the first data packet is allocated to Core 1 505A, the amount of load 515A on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load 515A-N distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes illustrated in FIG. 5A can be combined in any manner to generate a hybrid parallelism or distributed processing scheme that encompasses function parallelism 500, data parallelism 540, flow-based data parallelism 520 or any portions thereof. In some cases, the multi-core system may use any type and form of load balancing schemes to distribute load among the one or more cores 505. The load balancing scheme may be used in any combination with any of the functional and data parallelism schemes or combinations thereof.

Illustrated in FIG. 5B is an embodiment of a multi-core system 545, which may be any type and form of one or more systems, appliances, devices or components. This system 545, in some embodiments, can be included within an appliance 200 having one or more processing cores 505A-N. The system 545 can further include one or more packet engines (PE) or packet processing engines (PPE) 548A-N communicating with a memory bus 556. The memory bus may be used to communicate with the one or more processing cores 505A-N. Also included within the system 545 can be one or more network interface cards (NIC) 552 and a flow distributor 550 which can further communicate with the one or more processing cores 505A-N. The flow distributor 550 can comprise a Receive Side Scaler (RSS) or Receive Side Scaling (RSS) module 560.

Further referring to FIG. 5B, and in more detail, in one embodiment the packet engine(s) 548A-N can comprise any portion of the appliance 200 described herein, such as any portion of the appliance described in FIGS. 2A and 2B. The packet engine(s) 548A-N can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus 556 or the one of more cores 505A-N. In some embodiments, the packet engine(s) 548A-N can comprise one or more vServers 275A-N, or any portion thereof. In other embodiments, the packet engine(s) 548A-N can provide any combination of the following functionalities: SSL VPN 280; Intranet UP 282; switching 284; DNS 286; packet acceleration 288; App FW 280; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) 548A-N can, in some embodiments, be associated with a particular server, user, client or network. When a packet engine 548 becomes associated with a particular entity, that packet engine 548 can process data packets associated with that entity. For example, should a packet engine 548 be associated with a first user, that packet engine 548 will process and operate on packets generated by the first user, or packets having a destination address associated with the first user. Similarly, the packet engine 548 may choose not to be associated with a particular entity such that the packet engine 548 can process and otherwise operate on any data packets not generated by that entity or destined for that entity.

In some instances, the packet engine(s) 548A-N can be configured to carry out the any of the functional and/or data parallelism schemes illustrated in FIG. 5A. In these instances, the packet engine(s) 548A-N can distribute functions or data among the processing cores 505A-N so that the distribution is according to the parallelism or distribution scheme. In some embodiments, a single packet engine(s) 548A-N carries out a load balancing scheme, while in other embodiments one or more packet engine(s) 548A-N carry out a load balancing scheme. Each core 505A-N, in one embodiment, can be associated with a particular packet engine 548 such that load balancing can be carried out by the packet engine. Load balancing may in this embodiment, require that each packet engine 548A-N associated with a core 505 communicate with the other packet engines associated with cores so that the packet engines 548A-N can collectively determine where to distribute load. One embodiment of this process can include an arbiter that receives votes from each packet engine for load. The arbiter can distribute load to each packet engine 548A-N based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof.

In some embodiments, the memory bus 556 can be any type and form of memory or computer bus. While a single memory bus 556 is depicted in FIG. 5B, the system 545 can comprise any number of memory buses 556. In one embodiment, each packet engine 548 can be associated with one or more individual memory buses 556.

The NIC 552 can in some embodiments be any of the network interface cards or mechanisms described herein. The NIC 552 can have any number of ports. The NIC can be designed and constructed to connect to any type and form of network 104. While a single NIC 552 is illustrated, the system 545 can comprise any number of NICs 552. In some embodiments, each core 505A-N can be associated with one or more single NICs 552. Thus, each core 505 can be associated with a single NIC 552 dedicated to a particular core 505.

The cores 505A-N can comprise any of the processors described herein. Further, the cores 505A-N can be configured according to any of the core 505 configurations described herein. Still further, the cores 505A-N can have any of the core 505 functionalities described herein. While FIG. 5B illustrates seven cores 505A-G, any number of cores 505 can be included within the system 545. In particular, the system 545 can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Further referring to FIG. 5B, any of the functionality and/or embodiments of the cores 505 described above in connection with FIG. 5A can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In one embodiment, the cores 505 may be any type and form of processor. In some embodiments, a core can function substantially similar to any processor or central processing unit described herein. In some embodiment, the cores 505 may comprise any portion of any processor described herein. While FIG. 5A illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s) 200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (not shown) can facilitate communication between each core 505. In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In one embodiment, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor 550 can be any application, program, library, script, task, service, process or any type and form of executable instructions executing on any type and form of hardware. In some embodiments, the flow distributor 550 may any design and construction of circuitry to perform any of the operations and functions described herein. In some embodiments, the flow distributor distribute, forwards, routes, controls and/ors manage the distribution of data packets among the cores 505 and/or packet engine or VIPs running on the cores. The flow distributor 550, in some embodiments, can be referred to as an interface master. In one embodiment, the flow distributor 550 comprises a set of executable instructions executing on a core or processor of the appliance 200. In another embodiment, the flow distributor 550 comprises a set of executable instructions executing on a computing machine in communication with the appliance 200. In some embodiments, the flow distributor 550 comprises a set of executable instructions executing on a NIC, such as firmware. In still other embodiments, the flow distributor 550 comprises any combination of software and hardware to distribute data packets among cores or processors. In one embodiment, the flow distributor 550 executes on at least one of the cores 505A-N, while in other embodiments a separate flow distributor 550 assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system 545 comprises one or more flow distributors 550, each flow distributor 550 can be associated with a processor 505 or a packet engine 548. The flow distributors 550 can comprise an interface mechanism that allows each flow distributor 550 to communicate with the other flow distributors 550 executing within the system 545. In one instance, the one or more flow distributors 550 can determine how to balance load by communicating with each other. This process can operate substantially similarly to the process described above for submitting votes to an arbiter which then determines which flow distributor 550 should receive the load. In other embodiments, a first flow distributor 550' can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor 550 can distribute network traffic among the cores 505 according to a distribution, computing or load balancing scheme such as those described herein. In one embodiment, the flow distributor can distribute network traffic according to any one of a functional parallelism distribution scheme 550, a data parallelism load distribution scheme 540, a flow-based data parallelism distribution scheme 520, or any combination of these distribution scheme or any load balancing scheme for distributing load among multiple processors. The flow distributor 550 can therefore act as a load distributor by taking in data packets and distributing them across the processors according to an operative load balancing or distribution scheme. In one embodiment, the flow distributor 550 can comprise one or more operations, functions or logic to determine how to distribute packers, work or load accordingly. In still other embodiments, the flow distributor 550 can comprise one or more sub operations, functions or logic that can identify a source address and a destination address associated with a data packet, and distribute packets accordingly.

In some embodiments, the flow distributor 550 can comprise a receive-side scaling (RSS) network driver, module 560 or any type and form of executable instructions which distribute data packets among the one or more cores 505. The RSS module 560 can comprise any combination of hardware and software, In some embodiments, the RSS module 560 works in conjunction with the flow distributor 550 to distribute data packets across the cores 505A-N or among multiple processors in a multi-processor network. The RSS module 560 can execute within the NIC 552 in some embodiments, and in other embodiments can execute on any one of the cores 505.

In some embodiments, the RSS module 560 uses the MICROSOFT receive-side-scaling (RSS) scheme. In one embodiment, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module 560 can apply any type and form hash function such as the Toeplitz hash function. The hash function may be applied to the hash type or any the sequence of values. The hash function may be a secure hash of any security level or is otherwise cryptographically secure. The hash function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined based on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:

- 4-tuple of source TCP Port, source IP version 4 (IPv4) address, destination TCP Port, and destination IPv4 address.
- 4-tuple of source TCP Port, source IP version 6 (IPv6) address, destination TCP Port, and destination IPv6 address.
- 2-tuple of source IPv4 address, and destination IPv4 address.
- 2-tuple of source IPv6 address, and destination IPv6 address.
- 2-tuple of source IPv6 address, and destination IPv6 address, including support for parsing IPv6 extension headers.

The hash result or any portion thereof may used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. ny portion of the hash result or the hast result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system 575 does not include a RSS driver or RSS module 560. In some of these embodiments, a software steering module (not shown) or a software embodiment of the RSS module within the system can operate in conjunction with or as part of the flow distributor 550 to steer packets to cores 505 within the multi-core system 575.

The flow distributor 550, in some embodiments, executes within any module or program on the appliance 200, on any one of the cores 505 and on any one of the devices or components included within the multi-core system 575. In some embodiments, the flow distributor 550' can execute on the first core 505A, while in other embodiments the flow distributor 550" can execute on the NIC 552. In still other embodiments, an instance of the flow distributor 550' can execute on each core 505 included in the multi-core system 575. In this embodiment, each instance of the flow distributor 550' can communicate with other instances of the flow distributor 550' to forward packets back and forth across the cores 505. There exist situations where a response to a request packet may not be processed by the same core, i.e. the first core processes the request while the second core processes the response. In these situations, the instances of the flow distributor 550' can intercept the packet and forward it to the desired or correct core 505, i.e. a flow distributor instance 550' can forward the response to the first core. Multiple instances of the flow distributor 550' can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

Although FIG. 5B illustrates the flow distributor 550 as executing within the multi-core system 575, in some embodiments the flow distributor 550 can execute on a computing device or appliance remotely located from the multi-core system 575. In such an embodiment, the flow distributor 550 can communicate with the multi-core system 575 to take in data packets and distribute the packets across the one or more cores 505. The flow distributor 550 can, in one embodiment, receive data packets destined for the appliance 200, apply a distribution scheme to the received data packets and distribute the data packets to the one or more cores 505 of the multi-core system 575. In one embodiment, the flow distributor 550 can be included in a router or other appliance such that the router can target particular cores 505 by altering meta data associated with each packet so that each packet is targeted towards a sub-node of the multi-core system 575. In such an embodiment, CISCO's vn-tag mechanism can be used to alter or tag each packet with the appropriate meta data.

Figure 5C:
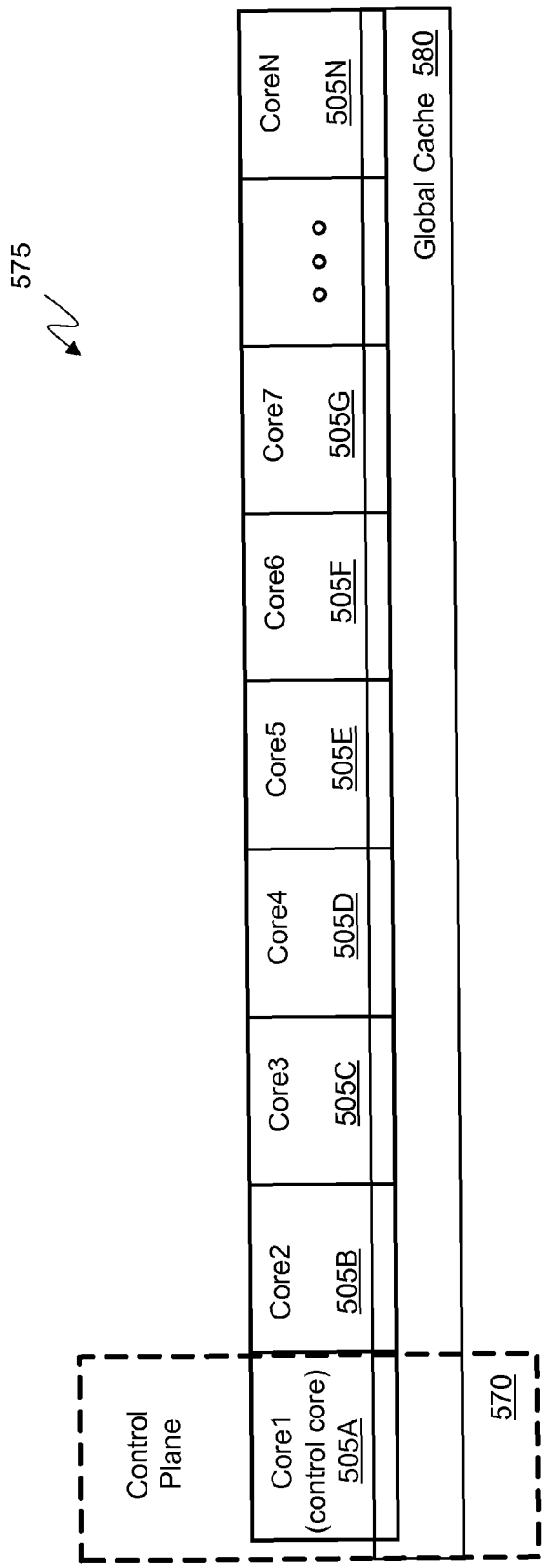
FIG. 5C is a block diagram of another embodiment of an aspect of a multi-core system.

Illustrated in FIG. 5C is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5C, and in more detail, the cores 505A-N as well as the control core 505A can be any processor described herein. Furthermore, the cores 505A-N and the control core 505A can be any processor able to function within the system 575 described in FIG. 5C. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575). The global cache 580 can be allocated from that predetermined amount of memory while the rest of the available memory can be allocated among the cores 505. In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In one embodiment, the control core 505A can receive a greater amount of available cache, while the other cores 505 can receiving varying amounts or access to the global cache 580.

In some embodiments, the system 575 can comprise a control core 505A. While FIG. 5C illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plan 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

F. Load Balancing Using Appliance Determined Metrics and/or Metrics Collected from a Device Via a Network Management Protocol Referring now to FIGS. 6A and 6B, systems and methods are depicted for load balancing based on metrics determined by the appliance 200 and/or metrics collected by the appliance from a device or service via a network management protocol, such as a Simple Network Management Protocol (SNMP). The appliance provides a load monitor to monitor the load of one or more services 270a-270n. In one embodiment, a user may configure one or more load monitors based on metrics selected from a custom metric table which includes metrics or objects obtains via a network management protocol query. In another embodiment, a user may configure one or more load monitors based on metrics or parameters collected by the appliance. In some embodiments, the user configures one or more load monitors based on metrics selected from the custom metric table and the appliance collected metrics. In response to the user's selection, the appliance determines the load of the one or more services and load balances client requests to the services using any type of load balancing technique.

Figure 6A:
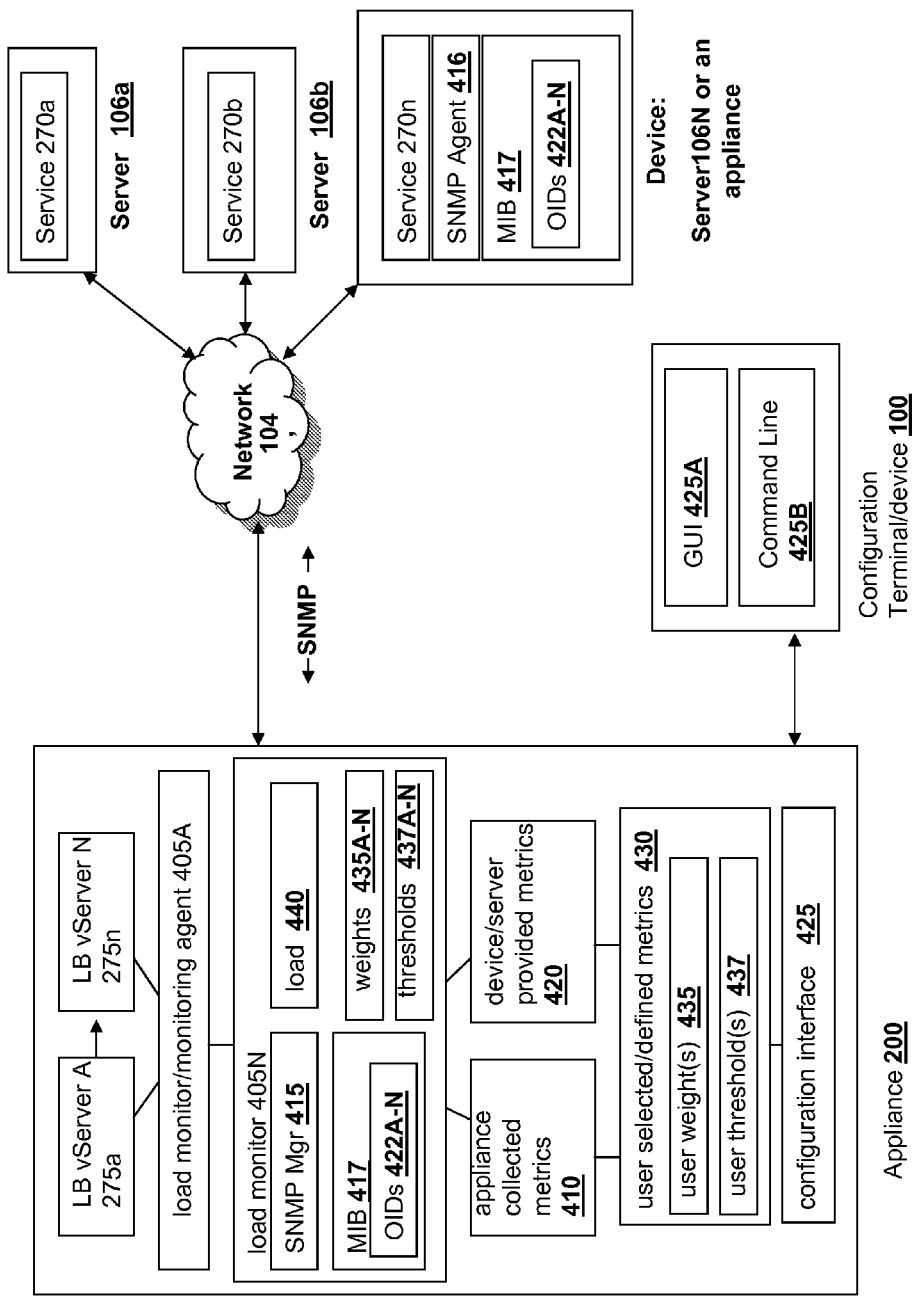
FIG. 6A is a block diagram of an embodiment of a system for load balancing, by an intermediary device, based on metrics acquired or received by the intermediary device.

Referring now to FIG. 6A, an embodiment of an appliance for load balancing one or more services is depicted. In brief overview, an appliance 200 has one or more virtual servers, or vServers 275A-275N configured to provide load balancing 284 to one or more services 270a-270n deployed on or provided by one or more servers 106a-106b. A vServer 275A is associated with, configured to or bound to a service 270A or a group of services 270A-270N. The appliance 200 has one or more load monitors 405A-405N to monitor a status, operation, and/or performance of the services 270A-270N. A load monitor is associated with, configured to or bound to a service 270A or a group of services 270A-270N. The load monitors 405A-405B provide information to the vServers 275A-275N to determine which of the services 270A-270N should receive a request received by a vServer 275. A load monitor 405 and/or vServer 275 may use appliance collected metrics 410 and/or device provided metrics 420 to determine a load across a plurality of services 270A-270N and to load balancing incoming client requests. The appliance 200 also includes a configuration interface 435 to receive information identifying user selected or user defined metrics 430 to be used by the load monitors 405 and/or vServers 275 for load balancing the plurality of services 270A-270N.

The appliance 200 may include any type and form of load monitor 405A-405N, also referred to as monitoring agent, for monitoring any operational or performance characteristic or metric of a service 270, server 106 or device 100. A load monitor 405 may include software, hardware, or any combination of software and hardware. The load monitor 405 may include any application, program, script, service, daemon, process, task, thread or set of executable instructions. In one embodiment, the load monitor 405 operates or executes in kernel space of the appliance 200. In another embodiment, the load monitor 405 operates or executes in user or application space of the appliance 200. In some embodiments, a first portion of the load monitor 405 operates in kernel space while a second portion of the load monitor 405 operates in application layer or space of the appliance 200.

In one embodiment, the load monitor 405 communicates with a service 270 once. In some embodiments, the load monitor 405 monitors or communicates with a service 270 on a predetermined frequency, such as every 1 msec or 1 sec. A user may configure or specify the predetermined frequency via the configuration interface 425. In other cases, another appliance or system may configure or specify the predetermined frequency via the configuration interface 425. In yet another embodiment, the load monitor 405 monitors or communicates with a service 270 responsive to one or more events, such as receipt of a request, response or a network packet. In one embodiment, a load monitor 405 monitors or communicates with a service 270 responsive to one or more policies of a policy engine.

In some embodiments, a load monitor 405 may use a request/reply messaging mechanism or protocol with the service 270 or server 106. In other embodiments, a load monitor 405 may have a custom or proprietary exchange protocol for communicating with a service, server or device. In one embodiment, a load monitor 405 may use the protocol of the service 270 to monitor or communicate with the service 270. As such, in some embodiments, the load monitor 405 uses the HTTP protocol to monitor or communicate with a web service 270A or an FTP protocol for an FTP server 270B. In yet other embodiments, the load monitor 405 uses a TCP or ICMP protocol for monitoring a service 270. In some embodiments, the load monitor 405 uses a network management protocol to monitor or query a status or metric of a service, server or device. In one embodiment, the load monitor 405 uses a Simple Network Management Protocol (SNMP). In another embodiment, the load monitor 405 uses a common management information protocol (CIMP).

In some embodiments, a single load monitor 405 monitors a plurality of services 270A-270N, or servers 106A-106B. In other embodiments, a plurality of load monitors 405A-405N monitor a single service 270A or server 106A. In still other embodiments, multiple load monitors 405 may each monitor a plurality of services 270A-270N, or servers 106A-106N. In one embodiment, multiple load monitors 405 may each monitor a service 270. In yet another embodiment, a load monitor 405A may monitor one or more other load monitors 405B-405N.

In some embodiments, the one or more load monitors 405 are associated with one or more services 270. In one embodiment, a user specifies or configures a load monitor 405 for one or more service 270 via the configuration interface 425. For example, a user via the configuration interface 435 may issue a command to bind the monitor 405 to a service 275. In other embodiments, the load monitor 405 is associated with a vServer 275. In one embodiment, a user specifies or configures via the configuration interface 425 a load monitor 405 for a vServer 275. In yet another embodiment, a use specifies or configures via the configuration interface 425 a vServer 275 for one or more services 270A-270N. For example, a user may bind a vServer 275 to a service 270.

In some embodiments, the one or more load monitors 405 may monitor an appliance 200, vServer 275, network service 270, client 102, server 106, device 100 or any other network resource. In one embodiment, a user specifies a type of network service to associate with the one or more monitoring agents 405. In another embodiment, a user customizes a monitoring agent. For example, a user may implement or otherwise provide a script for monitoring a service. In still another embodiment, a generic monitoring agent 405 is used. In some embodiments, a monitor agent 405 is configurable to use a predetermined monitor, script or status message based on a type of protocol or type of service In yet another embodiment, the one or more monitoring agents 405 determine the response time of the one or more network services 270 for responding to a request of one of the following types: ping, transport control protocol (tcp), tcp extended content verification, hypertext transfer protocol (http), http extended content verification, hypertext transfer protocol secure (https), https extended content verification, user datagram protocol, domain name service, and file transfer protocol. In some embodiment, a monitoring agent 405 checks for predetermined status codes in responses from the service 270. In other embodiments, the monitoring agent 405 checks for predetermined string patters in response from the service 270.

In some embodiments, the one or more load monitors or monitoring agents 405 are protocol-specific agents. For example, an agent 405 may determine availability for a network service of a particular protocol-type. In some embodiments, a monitoring agent 405 determines a response time of a server 106 or network service 270 to a TCP request. In one of these embodiments, the agent uses a "TCP/ICMP echo request" command to send a datagram to the network service 270, receive a datagram from the network service 270 in response, and determine a response time based on the roundtrip time of the datagram. In another of these embodiments, the monitoring agent 405 verifies that the response from the network service 270 included expected content. In one embodiment, the monitoring agent 405 verifies that the response did not include an error.

In other embodiments, a monitoring agent 405 determines availability of a network service 270 to a UDP request. In one of these embodiments, the agent uses a "UDP echo" command to send a datagram to the network service 270, receive a datagram from the network service 270 in response, and determine a response time based on the roundtrip time of the datagram. In another of these embodiments, the monitoring agent 405 verifies that the response from the network service 270 included expected content and did not contain errors.

In still other embodiments, the monitoring agent 405 determines availability of a network service 270 to an FTP request. In one of these embodiments, the monitoring agent 405 sends an FTP command, such as a "get" command or a "put" command, to the network service 270 and determines a time needed by the network service 270 to respond to the command. In another of these embodiments, the monitoring agent 405 verifies that the response from the network service 270 included expected content, such as contents of a file requested by a "get" command, and did not contain errors.

In yet other embodiments, the monitoring agent 405 determines availability of a network service 270 to an HTTP request. In one of these embodiments, the monitoring agent 405 sends an HTTP command, such as a "get" request for a uniform resource locator (URL) or a file, to the network service 270 and determines a time needed by the network service 270 to respond to the request. In another of these embodiments, the monitoring agent 405 verifies that the response from the network service 270 included expected content, such as the content of a web page identified by a URL. In some embodiment, the monitor agent 405 checks for a predetermined status code. In other embodiments, the monitoring agent 405 checks for a predetermine string pattern in an HTTP response.

In further embodiments, the monitoring agent 405 determines availability of a network service 270 to a DNS request. In one of these embodiments, the monitoring agent 405 sends a DNS request, such as a dnsquery or nslookup for a known network address, to the server 106 or network service 270 and determines a time needed by the server 106 or network service 270 to respond to the request. In another of these embodiments, the monitoring agent 405 verifies that the response from the network service 270 included expected content, such as the domain name of a computing device 100 associated with the known network address. In one embodiment, monitoring agent 405 verifies the response did not have an error.

In some embodiments, the appliance 200 via a monitoring agent 405 identifies and collects metrics 410 based on network traffic and information traversing the appliance, or otherwise referred to as appliance collected parameters or metrics. The appliance 200 or agent 405 may store the appliance collected metrics 410 in any type and form of data storage mechanism in memory and/or disk storage. In one embodiment, the appliance stores the metrics 410 in a table. In another embodiment, the appliance stores the metrics 410 in a database. In yet another embodiment, the appliance stores the metrics 410 in an object or data structure. In still other embodiments, the appliance 200 stores appliance collected metrics 410 in multiple tables and/or data storage mechanisms. In one embodiments, the appliance collected metrics 410 may be arranged or organized in any manner in the multiple tables.

In some embodiments, the monitoring agent 405 determines one or more metrics 410 from network packets received and transmitted by the appliance. In one embodiment, the monitoring agent 405 determines a number and/or type of connections to one or more services 270 or server 106. In another embodiment, the monitoring agent 405 determines a number of packets transmitted to a service 270 or server 106. In other embodiments, the monitoring agents 405 determines a number of packets received from or transmitted by a service 270 or server 106. In some embodiments, the monitoring agent 405 determines a response time from a service 270 or service. In one embodiments, the monitoring agent 405 determines an average response time. In another embodiment, the monitoring agent 405 determines a number or percentage of loss packets. In other embodiments, the monitoring agent 405 determines a number of errors received from a service or server.

In some embodiments, the monitoring agent 405 determines a bandwidth of a connection to a service 270 or a server 106. In one embodiment, the monitoring agent 405 determines the bandwidth of a connection based on a response time and/or packet loss. In another embodiment, the monitoring agent 405 determines the bandwidth of a connection based on a number of bytes transferred or communicated to and/or form a service 270 or server 106. In one embodiment, the monitoring agent 405 determines the bandwidth based on a number of bytes received from a service or server over a predetermined time period, such as per second. In another embodiment, the monitoring agent 405 determines the bandwidth based on a number of bytes transmitted to a service or server over a predetermined time period. In some embodiments, the monitoring agent 405 determines the bandwidth based on a number of bytes transmitted to and received from a service or server over a predetermined time period.

In some embodiments, the appliance 200 via a monitoring agent 405 identifies and collects metrics 430 provided by a service, server or device. These metrics 430 may also be referred to as custom metrics or a custom metric table. The appliance 200 or agent 405 may store the service or device collected metrics 430 in any type and form of data storage mechanism in memory and/or disk storage. In one embodiment, the appliance stores the metrics 430 in a table. In another embodiment, the appliance stores the metrics 430 in a database. In yet another embodiment, the appliance stores the metrics 430 in an object or data structure. In some embodiments, the appliance stores the metrics 430 in the same data storage mechanism as the appliance collected metrics 410. In other embodiments, the appliance stores the metrics 430 in a different storage mechanism as the appliance collected metrics 410. In still other embodiments, the appliance 200 stores device provided metrics 420 in multiple tables and/or data storage mechanisms. In one embodiments, the device provided metrics 420 may be arranged or organized in any manner in the multiple tables. For example, the appliance 200 may maintain a metrics table 420 for each service, device or application.

In one embodiment, the load monitor 405 uses a network management protocol, such as SNMP, to query a server or device for one or more objects identifiers and data for the objects of the object identifiers. By way of example only and not in any way limiting, the load monitor 405 uses an SNMP architecture to provide management information bases (MIBs) 417, which specify management data of a device or device subsystem, such as a service 270, using a hierarchical namespace containing object identifiers 422A-422N for managed objects. In some embodiments, a MIB 417 is a collection of information that is organized hierarchically. MIBs 417 may be accessed using a network-management protocol such as SNMP. An MIB 417 includes managed objects identified by object identifiers 422A-422N. In one embodiment, a managed object (sometimes called a MIB object, an object, or a MIB) is one of any number of characteristics or metrics of a managed device, appliance or system. In some embodiments, a managed objects includes one or more object instances, which correspond to or referred to as variables.

In one embodiment, the MIB 417 hierarchy may be depicted as a tree with a nameless root, the levels of which are assigned by different organizations. In some embodiments, the top-level MIB object IDs may belong to different standards organizations, while lower-level object IDs are allocated by associated organizations. The MIB 417 and/or objects 422A-422N may be arranged, constructed or organized for management across any of layers of the OSI reference model. In some embodiments, the MIB 417 and/or objects 422A-422N provide managed data and information on applications such as databases, email, and web services. Furthermore, the MIB 417 and/or objects 422A-422N may define for any area-specific or appliance specification information and operations, such as for any type of service 270, server 106 or device 100 load balanced or managed by the appliance 200.

In the example embodiment of SNMP, the SNMP communication model is based on a manager 415 and an agent 416 with a data of management information 417 and management objects 422A-422N. In one embodiment, the manager 415 provides an interface between appliance and the managed system. The agent 416 provides the interface between the manager 415 and the device, system, application, component, element or resource being managed. As illustrated in FIG. 6A, the appliance 200 may include a manager 415 which requests and obtains object identifiers and values from an agent 416, such as the agent 416 on a server 106. In the example of SNMP, a manager 415 communicates a GET or GET-NEXT message to request information for a specific object. The agent 416, in response to the manger's request, issues a GET-RESPONSE message to the manager 415 with the information requested or an error message. The manager 415 may transmit a SET message to request a change to a value of a specific variable or object 422. The agent 416 may issue a TRAP message to inform the manager 415 of an event, such as an alarm or error on a service 270.

Although generally described in an embodiment of an SNMP network management protocol, the appliance 200 and/or load monitor 405 may use any type and form of network management protocol and communication model to obtain identifiers and values of information, such as objects or variables, from another device for a managed system, sub-system or service 270. For example, the appliance 200 may use any of the following protocols and/or communication models: Remote monitoring (RMON), AgentX, Simple Gateway Monitoring Protocol (SGMP), Common management information protocol (CMIP), Common management information service (CMIS) or CMIP over TCP/IP (CMOT).

Furthermore, although a MIB 417 is generally described in reference to a manager/agent communication model for an example network management protocol such as SNMP, the MIB 417 may include any type and form of data storage of object identifiers, variables, parameters or other identifiers of metrics. The MIB 417 may be either protocol dependent or protocol independent. For example, the MIB 417 may comprise a table of metrics for a device or service that can be queried via any type and form of API.

The managed objects or variables provided via the network management protocol may provide any type and form of metrics or operational characteristics of the service, server or device to be used by the appliance for load balancing, or any other function of the appliance 200. In one embodiment, the device provided metrics 420 may include any of the metrics 410 collected by the appliance as described above. In another embodiment, the device provided metrics 420 may include any type and form of information on any resource usage of the managed device, service or system. In one embodiment, the metrics 410 include CPU, memory and/or disk usage of the device and/or service 270. In other embodiments, the metrics 420 may include information on a number of connections, sessions or clients of the service 270. In some embodiments, the metrics 420 include any information on any thresholds of the service 270 or server 106, such as a threshold identifying a maximum number of sessions or clients. In yet another embodiment, the metrics 420 include any information on a type of protocol of the service 270. In other embodiments, the metrics 420 include any information on any alarms or errors of the service 270.

In some embodiments, each load monitor 405 includes the appliance collected metrics 410. For example, the metric table 410 may be implicitly bound to each monitor 405 by default. In other embodiments, a user associates or binds a custom metric table 420 to a monitor 405. In yet another embodiment, a user associates or binds a custom metric table 420 and appliance collected table 410 to a monitor 405. In yet other embodiments, a user may associate or bind any combination of one or more appliance collected metric tables 410 and custom metric tables 420 to one or more load monitors 405.

In some embodiments, a user via the configuration interface 425 may configure or specify for a load monitor 405 one or more object identifiers 422A-422N to obtain values for and store in the metrics 420. For example, the user may specify a user-defined metric 430. In other embodiments, the appliance 200 or load monitor 405 obtains a list of one or more object identifiers 422A-4222N from a device 100, such as server 106 or service 270. In yet another embodiment, the appliance 200 includes one or more metric tables 420 with predetermined OIDS 422A-422N for a known device. For example, the appliance 200 may include a metric table 420 for any one or more of the following appliances or devices: 1) any version of the NetScaler device manufactured by Citrix Systems, Inc. of Ft. Lauderdale, Fla.; 2) any of the appliances, such as BIGIP or WebAccelerator, manufactured by F5 Networks, Inc. of Seattle, Wash.; 3) any of the AppDirector or AppXcel devices manufactured by Radware Ltd of Mahwah, N.J.; 4) any application acceleration and/or security related appliances and/or software manufactured by Cisco Systems, Inc. of San Jose, Calif.

The appliance 200, vServer 275 and/or load monitor 405 computes, calculates or otherwise determines a load 440 for each service 270 based on any of the metrics from the appliance collected metrics 410 and/or device provided metrics 420. The appliance 200 may use a weight 435A-435N and a threshold 437A-437N for each of the metrics used in the determination of the load 440. In one embodiment, the appliance 200 establishes a weight 435 and/or a threshold 437. In other embodiments, a user establishes a weight 435 and/or a threshold 437. For example, in some cases, if a user does not specify a weight for a plurality of metrics, the appliance equally weights each metric. In one example embodiment, the appliance 200 determines the load 440 for each service as follows:

Sum(weight of metric/established ceiling value of metric)*(obtained value of metric/established ceiling value of metric))/Sum(weights))

In some embodiments, a metric value may be based on a range of 0-100, or absolute range. In other embodiments, a metric value may not be based on a range of 0-100 or is otherwise relative to the type of metric and possible range of values. For example, a metric identifying a number of connections may have a ceiling or predetermined maximum value of 10,000. In one of these embodiments, the appliance establishes a ceiling value or predetermined upper limit for the metric value. In another of these embodiments, a user via the configuration interface 425 establishes a ceiling value or predetermined upper limit for the metric value. In further embodiments, the established ceiling value may comprise a value less than the actual maximum value for the metric or upper limit of the range value. For example, a user may specify or configure a relative range value based on a desired operational or performance range of a metric.

In some embodiments, if a metric of a service exceeds a user or appliance provided threshold, the service may be excluded from the load determination or otherwise from a load balancing decision. In other embodiments, if all the metrics of a service exceeds their corresponding thresholds, the service may be excluded from the load determination or otherwise from a load balancing decisions. In yet another embodiment, even if a service exceeds the threshold(s) for one or more of the metrics, the service may be considered in the load determination or otherwise for load selection. In some cases, a client session may be identified as persistent or sticky to a vServer 275 or service 270. In these cases, if a request for the client's sessions is received by the appliance, the appliance may provide the request to a vServer 275 or service 270 although a metric for the vServer or service has been exceeded.

In still other embodiments, if a threshold of a metric of a service or virtual server has been exceeded, the appliance may, in response to the threshold being exceeded, redirect the client making the request to another resource. In one embodiment, the appliance may transmit a URL to the client comprising the address of a server 106 or service 270 such that the client may bypass the appliance 200 and access the server 106 or service 270 directly. In one embodiment, the appliance may transmit a URL to the client comprising the address of a second appliance 200 or another device. In still another embodiment, the appliance 200 may redirect the client request to a second appliance, device, service or server on behalf of the client.

In some embodiments, if a threshold of a metric of a service or virtual server has been exceeded, the appliance may, in response to the threshold being exceeded direct a client request to a second virtual server or service. In one embodiment, a second virtual server may be a backup to a primary virtual server. Upon detection of the threshold being exceeded, the appliance may spillover requests and connections to a second virtual server.

Although the load 440 is generally discussed in view of the above equation, the appliance may use any type and form of load calculation, weighted or not weighted. In some embodiments, the appliance 200 determines the load using an average of metric values. In other embodiments, the appliance 200 determines the load 440 using any derivative value of a metric. In another embodiment, the appliance 200 determines the load 440 using any statistical measure of a metric. In still another embodiment, the appliance 200 determines the load 440 using any function or computation of a metric. In yet other embodiments, the appliance 200 may determine a load 440 for each metric. In these embodiments, the appliance 200 may aggregate, compare or otherwise compute an load 440 based on any type and form of aggregation of a metric's contribution to a load of a service.

In some embodiments, a user configures multiple monitors 405 for a service 270. In these embodiments, the load 440 on the service 270 is a sum of the load of all the monitors. In one embodiment, the sum of the load from multiple monitors 440 is weighted. The appliance may assign a monitoring 405 a weight. A weight may comprise an integer, decimal, or any other numeric indicator. In some embodiments, a user may configure via the configuration interface 425 the weight corresponding to a monitor 405. In some embodiments, all monitors 405 may be assigned equal weight. In other embodiments, a plurality of monitors 405 may each be assigned different weights. The weights may be assigned to the monitors based on any criteria indicating relative importance, including without limitation the appliance or user determination of the relative importance or value of the monitor in view of the service, reliability of the monitoring mechanism, and the frequency of monitoring.

In one embodiment, a monitoring agent 405 may be assigned a weight based on the relative importance of the service monitored by the appliance. For example, if most user requests in an environment are HTTP requests, a monitoring agent monitoring HTTP availability of a server 106 might be assigned a weight of 10, while a monitoring agent monitoring FTP availability of a server 106 might be assigned a weight of 3. Or, for example, if an administrator placed a high priority on UDP applications, a monitoring agent monitoring UDP availability of a server may be assigned a weight of 20, while a DNS monitoring agent may be assigned a weight of 5.

In some embodiments, an appliance 200 may compute a sum of the weights of the monitoring agents currently reporting a network service 270 as operational. For example, if five monitoring agents, each assigned a weight of 30, are monitoring a network service 270, and three of the five monitoring agents report the network service 270 as available, the appliance may determine the sum of the monitoring agents currently reporting the network service 270 as operational to be 90. Or for example, if only two monitoring agents, one with a weight of 20 and the other with a weight of 40, are reporting a server 106 as available, the appliance may compute the sum of the monitoring agents currently reporting a server 106 as operational to be 60.

The appliance 200 also includes a configuration interface 425 providing any type and form of interface mechanism for a user, application or system to communicate with the appliance 200. In one embodiment, the configuration interface 425 includes a command line interface 425B. In another embodiment, the configuration interface 425 includes a graphical user interface 425A. In some embodiments, the configuration interface 425 includes an application programming interface (API) or development toolkit for an application, program or script to communicate with the appliance 200.

In some embodiments, the appliance 200 displays the configuration interface 425 via a display of the appliance. In other embodiments, a configuration terminal or device 100 connects to or communicates with the appliance 200 and displays the configuration interface 425. For example, the configuration device 100 or terminal may connect to the appliance 200 via a port and IP address of the appliance 200. The appliance 200 may provide a web service listening on the port and IP address to serve a page to the user. The served page may provide a user interface for configuring the appliance 200. In other embodiments, the configuration terminal 100 may connect and communicate with the appliance 200 via any type and form of connection, including a monitor port, serial port or USB connection.

Via the configuration interface 425, the appliance 200 may receive information identifying user selected metrics 430 to use in determining the load 440 for one or more services. In one embodiment, the user identifies or selects a metric from a plurality of appliance collected metrics 410. In another embodiment, the user identifies or selects a metric from a plurality of device provided metrics 420. In some embodiments, the user selects one or more metrics from the appliance collected metrics 510 and one or more metrics from the device provided metrics 410. The appliance 200 may also receive via the configuration interface 425 information identifying a user's selection or designation of a weight 435 for a metric. For example, a user may provide a value of a weight 435 for a metric. In some embodiments, the appliance 200 receives information identifying a user provided value for a threshold 437.

In operation, the appliance 200 may use user selected metrics 430 and user provided weights 435 and thresholds 437 for determining the load 440. In another embodiment, the appliance may use any appliance established metrics from the appliance collected metrics 410 for determining the load. In one embodiment, a user establishes a weight and/or a threshold for an appliance provided metric. So although the metric may not be user selected in some embodiments, the user may control or configure the weights 435 and/or thresholds 437 for the metrics 410. In other embodiments, the appliance may use any combination of user selected metrics 430 and appliance established metrics 410 for determining the load. In another embodiment, the appliance 200 may use any combination of user provided weights 435 and/or thresholds 437 and appliance provided weights 435 and/or thresholds 437 for any metric used for determining the load 440.

Figure 6B:
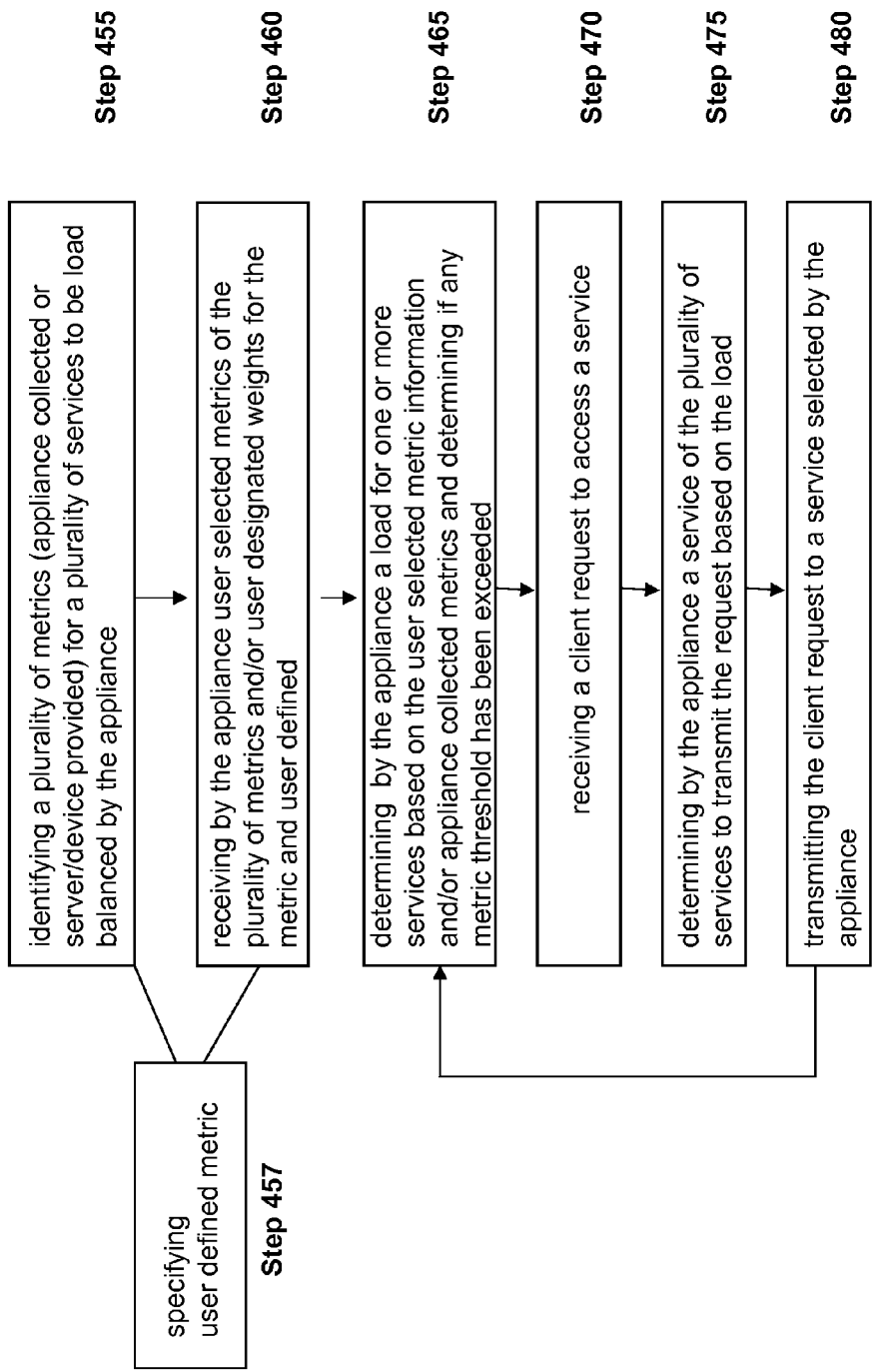
FIG. 6B is a flow diagram of an embodiment of steps of a method for load balancing, by an intermediary device, based on metrics acquired or received by the intermediary device.

Referring now to FIG. 6B, an embodiment of steps of a method for load balancing one or more services is depicted. In some embodiments, the appliance 200 may load balance one or more services using appliance collected metrics 410 and device provided metrics 420. In other embodiments, the appliance 200 load balances one or more services based on user selected metrics, weights and/or thresholds. In brief overview, at step 455 of method 450, multiple metrics are identified for load balancing a plurality of services 270A-270N by the appliance 200. At step 457, in some embodiment, the appliance 200 receives user defined metrics to collect or monitor for a service 270. At step 460, the appliance receives user selected metrics from the set of identified metrics. The user may also identify weights and/or thresholds for the metric. At step 465, the appliance determines a load for each of the services based on the user selected metric information. At step 470, the appliance receives a client request to access a service. At step 475, based on the load determination, the appliance determines a service from the plurality of services to transmit or forward the client request. At step 480, the appliance transmits the client's request to the appliance selected service.

In further details, at step 455, the appliance 200 identifies metrics to collect and monitor for load balancing one or more services 270A-270N. In one embodiment, the appliance 200 provides or identifies one or more appliance collected metrics 410. For example, a table 410 may identify metrics collected by the appliance 200. In another embodiment, the appliance 200 provides one or more predetermined tables of device provided metrics 420, such as for an appliance of Citrix, F5, Cisco, or Radware. In other embodiments, the appliances 200 identifies one or more metrics to collect via a network management protocol in an object or variable database, such as an MIB 417 for SNMP. In one embodiment, the appliance provides a preconfigured or preinstalled MIB 417 for a predetermined device or service 270, such as an application.

In some embodiments, the appliance 200 queries a device or service 270 to determine available metrics to collect and/or monitor. For example, in one embodiment, the appliance 200 queries a device or service for available object identifiers 422A-422N. In another embodiment, the appliance 200 uses a network management protocol, such as SNMP, to query for the identification of objects in a MIB 417. In yet another embodiment, a user via the configuration interface 425 identifies one or more object identifiers 422A-422N to collect and/or monitor from a device or service 270, such as an application.

In some embodiments, at step 457, a user specifies or defines a metric for the appliance to collect and/or monitor for a service 270. For example, the user may specify via the configuration interface 425 an object identifier in a MIB 417. In other embodiments, a user may configure or implement a load monitor 405 to collect and/or monitor a user-defined or specified metric. In yet another embodiment, a user, such as a network administrator, may configure, specify or implement one or more object identifiers 422 in a MIB 417 deployed on a server 106. In some embodiments, the user may implement an application, program, script, service or other set of executable instructions to collect metrics on the server 106 and store values for the metrics in the MIB 417 on the server 106. For example, the user may execute a program or script to monitor metrics of a service 270 on the server 106 and update the MIB 417 with the collected values. The manager 415 on the appliance 200 may query the agent 416 on the server for information and/or values of the metrics stored in the server's MIB 417 for the service 270.

At step 460, the appliance 200 receives information identifying a selection by a user of one or more metrics identified via the appliance. In some embodiments, a user via the configuration interface 425 selects one or more metrics provided via the appliance 200 to use for load balancing a server 270. In one embodiment, the appliance 200 provides for selection by the user via the configuration interface 425 any one or more of the appliance collected metrics 410 or device provided metrics 420. A user may configure the appliance 200 via a command line interface 425B or graphical user interface 425A to use one or more user selected metrics 430 for determining a load 440 or otherwise for load balancing services 270A-270N by the appliance 200.

In one embodiment, the appliance 200 receives information identifying that the user selected one or more appliance collected metrics 410. In another embodiment, the appliance 200 receives information identifying that the user selected one or more device provided metrics 420. In yet another embodiment, the appliance 200 receives information identifying that the user selected one or more appliance collected metrics 410 and one or more device provided metrics 420.

Furthermore, via the configuration interface 425, the appliance 200 may receive information identifying a user's designation or establishment of a weight 435 for a metric. In one embodiment, the appliance 200 receives a user's identification of a weight 435 for a user selected metric 430. In another embodiment, the appliance 200 receives a user's identification of a weight 435 for an appliance established metric 410. In other embodiments, the appliance 200 may receive information identifying a user's designation or establishment of a threshold 437 for a metric. In one embodiment, the appliance 200 receives a user's identification of a threshold 437 for a user selected metric 430. In another embodiment, the appliance 200 receives a user's identification of a threshold 437 for an appliance established metric 410.

At step 465, the appliance determines a load for each of the one or more services. In one embodiment, a load monitor 405 collects and/or monitors one or more of the user selected metrics 430 for a service. In another embodiment, the load monitor 405 collects and/or monitors appliance collected metrics 410. In some embodiments, a load monitor 405 collects metrics via a network management protocol, such as SNMP. In yet another embodiment, multiple load monitors 405A-405N collect and/or monitor metrics for a service 270. In one embodiment, although a user selected one or more metrics 430 for collecting and/or monitoring a service 270, the appliance 200 collects and monitors any one or more appliance established metrics 410, such as number of connections, response time, bandwidth, and number of packets, for the service 270.

In some embodiments, a vServer 275 determines the load 440 for each service 270 via metric information collected and monitored by a load monitor 405. In another embodiment, the load monitor 405 determines the load 440 for the service 270 being monitored. The appliance 200 and/or load monitor 405 may determine the load 440 using a user selected metric 430 weighted by a user designated weight 435. In some embodiments, the appliance 200 and/or load monitor 405 determines the load 440 using a plurality of user selected metrics 430 weighted by user designated weights 435. In yet another embodiment, the appliance 200 and/or load monitor 405 determines the load using a user selected metric 430 and user identified weight 435 and an appliance established metric 410 and an appliance established weight 435. In further embodiments, the appliance 200 determines the load 440 by summing a weighted load for each metric (user and/or appliance) used for the service 270.

For the embodiment of multiple monitors 405A-405N per service 270, the appliance 200 may determine the load for the service by assigning a weight to each monitor and computing weighted load across all the monitors 405. In other embodiments, the appliance 200 and/or load monitor 405 determines a load for a service 270 at a predetermined frequency, such as every 1 msec. or every 1 sec.

In some embodiments, a load monitor 405 determines that a metric for a service 270 has reached or exceed a threshold 437. In other embodiments, a load monitor 405 determines that a metric for a service 270 is within a threshold 437. In one embodiment, the load monitor 405 uses an appliance established or provided threshold for a metric. In another embodiment, the load monitor 405 user a user specified or configured threshold 437.

At step 470, the appliance 200 receives a request from a client to access a service. In one embodiment, a virtual server or vServer 275 intercepts or otherwise receives a request from the client. In some embodiments, the virtual server 275 transparently intercepts the client's request to a service 270 or server 106. In other embodiments, a client 102 transmits the request to the vServer 275. In another embodiment, the vServer 275 determines from the request that the request is for one or more services under management by the appliance 200. In one embodiment, the vServer 275 intercepts or receives the request via a SSL VPN connection between the client and the appliance 200.

At step 475, the appliance 200 determines which of the services to direct the client request based on determination of the load 440 for each service 270. In one embodiment, the vServer 275 directs the request responsive to one or more load monitors 405. In some embodiments, a vServer 275 directs, forwards or otherwise transmits the request to a service 270 with the least or smallest load. In one embodiment, the vServer 275 directs, forwards or otherwise transmits the request to a service with one of the lower determined loads. In some embodiments, the vServer 275 directs, forwards or otherwise transmits the request to the service previously handling requests from the client 102. In one embodiment, the vServer 275 transmits the request to the previously used service if the load of the service is within a predetermined threshold. In some embodiments, the vServer 275 transmits the request to the first available service in a list with a determined load within a predetermined threshold.

In another embodiment, a vServer 275 directs, forwards or otherwise transmits the request to a service 270 using a round robin technique, or weighted round robin. In yet another embodiment, the vServer 275 directs the request to a service based on one or more metrics, such as appliance collected metrics 410 or device provided metrics 420. For example, in some embodiments, the vServer 275 directs the request to a service based on one or more of the following: least response or round trip time, least number of connections, least number of packets, and least bandwidth. In yet other embodiments, the vServer 275 directs the request to a service based on one or more device provided metrics 430, such as CPU, memory and disk resource usage. In another example, the vServer 275 directs the request to a service based on service resource usage on the server, such as system resource usage by an application or session of the application.

In some embodiments, a vServer 275 may not direct a request to a service 270 in which a metric for the service 270 has exceeded a threshold 437, such as a user configured threshold 437. In other embodiments, a vServer 275 may not direct to a request to a service 270 if more than one threshold 437 of the metrics for the service has been exceeded. In yet another embodiment, a vServer 275 may direct a request to a service 270 if a metric threshold 437 has been reached or exceeded. For example, if one metric threshold 437 of a plurality of thresholds 437 has been exceeded, then the vServer 275 may still direct the request to the service if the other metric thresholds have not been reached.

In still other embodiments, the appliance 200 may determine from load monitoring that a metric of a first vServer 275A has reached a threshold 437. In response to the determination, the appliance 200 may spillover management of the services 270A-270N to a second virtual server, or vServer 275B. In one embodiment, the second virtual server 275B may be a backup server. In some embodiments, the second virtual server 275B is established in response to detecting the first virtual server 275A has reached one or more thresholds. In another embodiment, the second virtual server 275B may be established and running on the appliance 200.

At step 480, the appliance transmits the client request to the service determined by the appliance at 475. In one embodiment, the appliance 200 transmits the client request in a manner transparent to the service 270 such that the request appears to have been sent from the client instead of the appliance 200. For example, the appliance 200 may act as a transparent or intercepting proxy for the client 102. In other embodiments, the appliance 200 acts as a non-transparent proxy and transmits the request to the service on the client's behalf. In some embodiment, the vServer 275 transmits the request to a service 270. In other embodiments, a backup vServer 275 transmits the request to the service. In yet other embodiments, a second vServer 275 transmits the request to the service.

G. Global Server Load Balancing (GSLB) Among Heterogeneous Devices

Figure 7A:
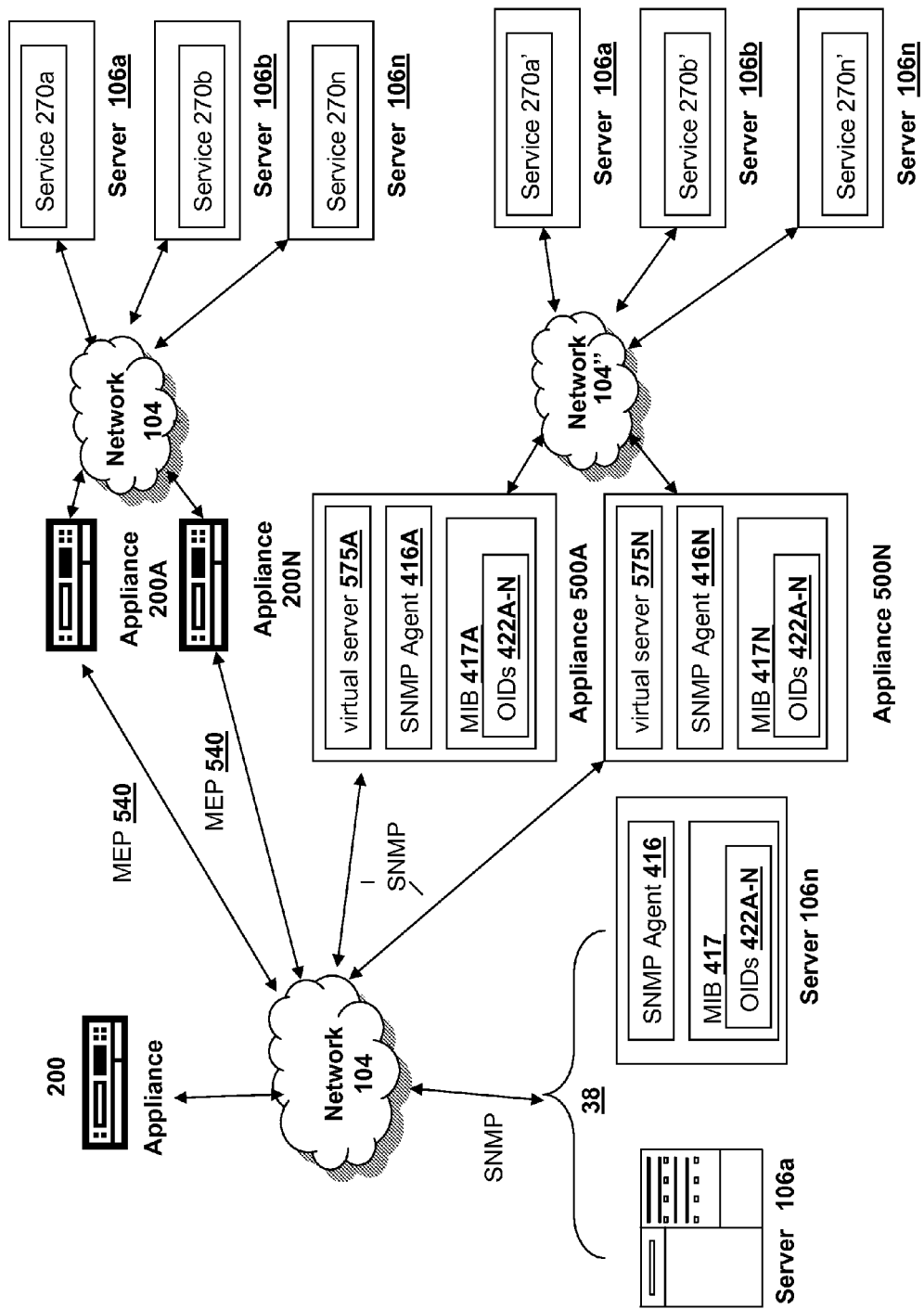
FIG. 7A is a block diagram of an embodiment of a system for global server load balancing (GSLB) of heterogeneous devices by an intermediary device.
Figure 7B:
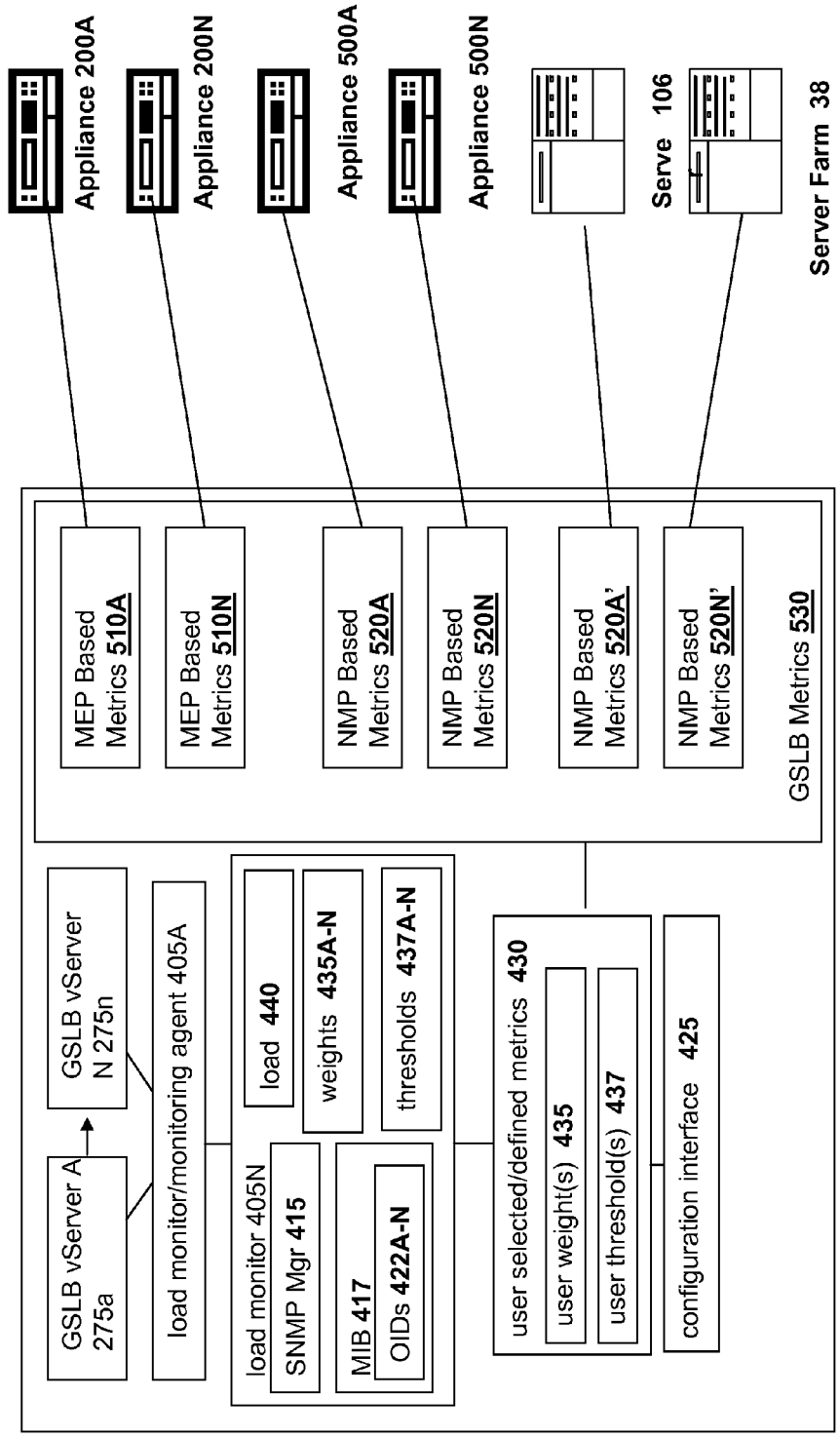
FIG. 7B is a block diagram of another embodiment of a system for global server load balancing (GSLB) of heterogeneous devices by an intermediary device.
Figure 7C:
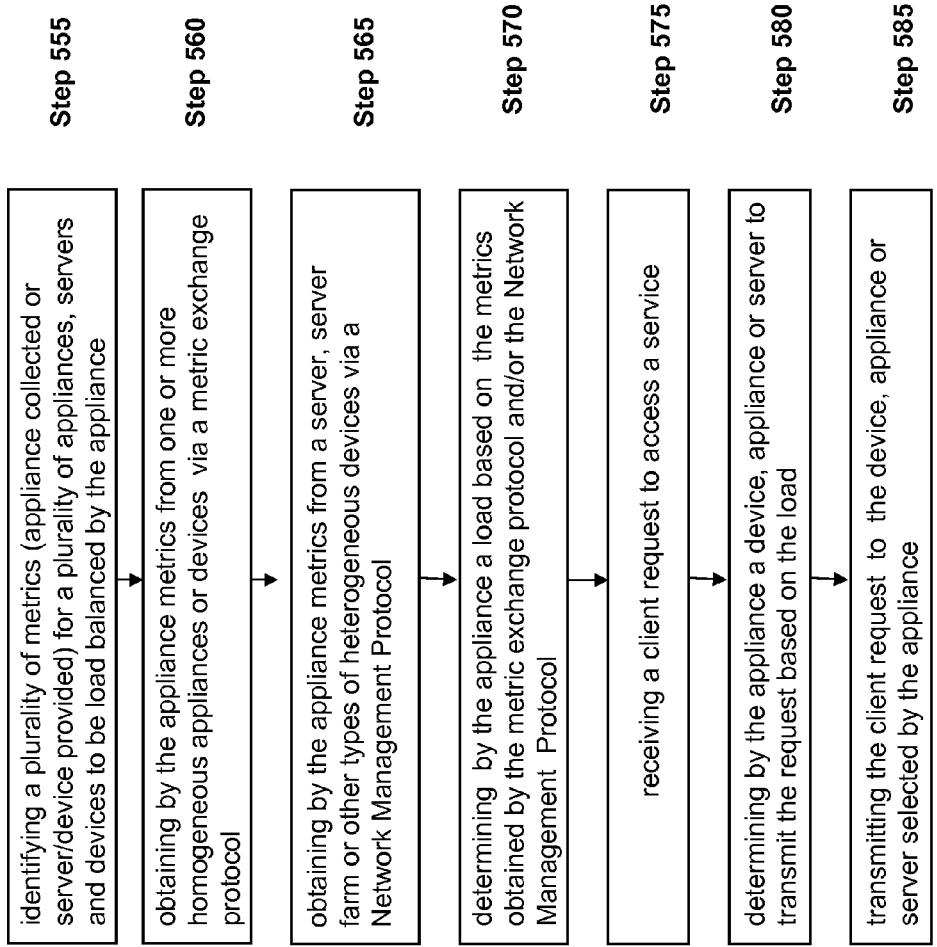
FIG. 7C is a flow diagram of an embodiment of steps of a method for global server load balancing (GSLB) of heterogeneous devices by an intermediary device.

Referring now to FIGS. 7A-7C, systems and methods for load balancing a plurality of heterogeneous devices are depicted. The appliance 200 described herein may be deployed to load balance a plurality of services and load balancing devices. A first appliance 200 may communicate with a second appliance 200A of the same type via a predetermined metric exchange protocol (MEP). The first appliance 200 obtains via the MEP protocol metrics to use for determining a load for the second appliance 200A. Other devices of a different type than the first appliance may be deployed in the network to perform local load balancing, such as for a server farm. These devices may not communicate via the MEP protocol of the first appliance 200. Instead, these other device may provide metrics via a network management protocol, such as a Simple Network Management Protocol (SNMP). Using the techniques described in conjunction with FIGS. 6A and 6B, the first appliance 200 obtains metrics from these heterogeneous devices via the network management protocol. With metrics obtains via the MEP protocol from devices of the same type and metrics obtained via a network management protocol from device of a different type, the appliance 200 may uses these combined metrics to determine a load across these heterogeneous devices and to direct request to one of the devices based on the load.

Referring now to FIG. 7A, an example embodiment of a network environment for load balancing heterogeneous devices, including servers and local or other load balancing devices, is depicted. In brief overview, a network environment includes a plurality of different types of load balancing devices and servers. The appliance 200 is configured as a global load balancing device to load balance the plurality of load balancing devices and servers. Each of the load balancing devices may perform local load balancing to one or more services 270A-270N. For example, a first set of load balancing appliances 200A-200N of the same type may perform local load balancing of services or servers on a first network 104. These appliances 200A-200B may be of the same type of the global load balancing appliance 200. Or in some cases, local load balancing appliance 200A-200N are designed and constructed to communicate metrics and other information via a metric exchange protocol 540. A second type of load balancing appliances 500A-500N may perform local load balancing for one or more services 270A'-270N' on a second network 104'. These load balancing appliances 500A-500N may be of a different type than the first type of appliance 200A-200N and/or the global load balancing appliance 200. The appliance 500A-500N may operate or execute one or more virtual servers or vServers 275A-275N. Appliance 500A-500N may not be designed to communicate via the MEP protocol 540 of appliances 200-200N. Instead these appliances 500A-500N may provide metrics via a network management protocol, such as SNMP. The global load balancing appliance 200 may also perform load balancing for one or more services or servers, such as a server farm 38. Each of the servers or services may be of a different type, such as an HTTP service and an FTP service.

In view of FIG. 7A, the plurality of appliances, servers, and services may be deployed in a hierarchical fashion. The first appliance 200 may be the global load balancing appliance at the top of the hierarchy to manage a plurality of other appliances 200A-200N, 500A-500N and servers. In one case, the appliance 200 manages one or more servers 106 or service 270A-270N directly. In another case, the appliance 200 manages one or more appliances 200A-200N, 500A-500N, which in turn manages one or more servers 106 or services 270A-270N. An appliance managed by the first appliance 200 may manage a second appliance, which in turns manages one or more services or servers.

By way of example in view of various load balancing products, the global load balancing appliance 200 may be any of the product embodiments referred to as NetScaler manufactured by Citrix Systems, Inc. The appliances 200A-200N may also be a NetScaler device configured to perform local load balancing of one or more services 270A-270N. As the appliances 200A-200N are of the same type as the global load balancing appliance 200, these appliances are designed and constructed to communicate via a predetermine protocol or and/or communication model referred to as metric exchange protocol. The appliance 200A-200N may be configured to provide metric information at a predetermined frequency to appliance 200. One or more of the appliances 500A-500N may comprise another type of load balancing device, such as a BigIP load balancing device manufactured by F5 Networks, Inc. Another one or more of the appliances 500A-500N may comprise a different type of load balancing device, such as the AppDirector appliance manufactured by Radware, LTD. In some cases, one or more of the appliances 500A-500N may comprise a Cisco load balancing device. In other cases, one or more of the appliances 500A-500N may comprise a Nortel load balancing device. Any one or more of these appliances 500A-500N may not be designed or constructed to communicate with appliance 200 via the MEP protocol 540. Although the example is generally described above as Citrix NetScaler appliance 200 providing global load balancing device, any other type of load balancing device may be used.

Instead of using MEP 540, each of these different appliances 500A-500N may provide metric information via a network management protocol, such as SNMP. As illustrated in FIG. 7A, these appliances 500 may include an agent 416 for providing object identifiers 422A-422N via an MIB 417. Further to this example embodiment and as discussed in conjunction with FIGS. 6A and 6B, the appliance 200 using a manager/agent communication model may query any of these appliances 500A-500N via a network management protocol to identify, collect and monitor objects identified via the MIB 417. In some cases, the appliance 200 may use SNMP to communicate with one or more appliance 500A-500N. In other cases, the appliance 200 may use another type of network management protocol to communication another one or more of the appliances 500A-500N. In still another case, the appliance 200 may use a third type of network manager protocol to communicate with a further set of one or more appliances 500A-500N.

Appliances 200A-200N may be considered homogenous or the same type of appliance or device as appliance 200. In one embodiment, the appliances 200A-200N is the same product family of the appliance 200. In another embodiment, the appliance 200A-200N is a version of the same device of the appliance 200. In one case, the appliances 200 and 200A-220N are manufactured by the same company. In some embodiments, the appliances 200A-200N and appliance 200 are configured, designed and constructed to communicating using a predetermined protocol and/or communication model. In one embodiment, the appliances 200A-200N and appliance 200 are configured, designed and constructed to use a proprietary or custom protocol and/or communication model.

Appliances 500A-500N may be considered heterogonous or a different type of appliance or device as appliance 200. In one embodiment, the appliances 500A-500N are manufactured by a different company than appliance 200. In some embodiments, the appliances 500A-500N and appliance 500 are not specifically designed to communicate using a predetermined protocol and/or communication model. In one embodiment, the appliances 500A-500N and appliance 200 are not configured, designed and constructed to use a proprietary or custom protocol and/or communication model. In some cases, appliances 500A-500N use a network management protocol instead of using a proprietary protocol for providing metrics to other devices, applications or services.

Referring now to FIG. 7B, an embodiment of the appliance 200 for identifying, collecting and monitoring metrics obtained from heterogeneous network devices and servers with a plurality of protocols is depicted. The appliance 200 may have one or more virtual servers 275A-275N configured, constructed or designed to provide load balancing of the plurality of devices over one or more networks 104, 104', 104'. The appliance 200 may use one or more load monitors 405A-405N to monitor the load of each of the heterogeneous devices. In one embodiment, the appliance 200 monitors the load of appliances 200A-200N. The appliance 200 and/or load monitor 405 uses the MEP protocol 540 to obtain metrics from one or more of the appliances 200A-200N. In another embodiment, the appliance 200 monitors the load of appliance 500A-500N. In other embodiments, the appliance 200 monitors the load of one or more serves 106. In still another embodiment, the appliance 200 monitors the load among servers in a server farm 38. The appliance 200 may use one or more network management protocols to obtain metrics from server 106, server farm 38, and appliances 500A-500N.

The appliance 200 collects metrics via the MEP protocol 540 and network management protocols from a wide variety of heterogeneous devices, such as appliances 500A-500N and servers 106, and homogenous devices 200A-220N. The appliance 200 stores the metrics in a GSLB (Global Server Load Balancing) or global metrics table 530 comprising any type and form of data storage element, such as a file, database, object or data structure in memory and/or on disk. The vServers 275 and/or load monitors 405 use one or more of the metrics from the GSLB metrics 530 to provide global load balancing of servers, server farms, virtual servers, and load balancing devices.

The appliance 200 may collect and monitor metrics obtained via a MEP protocol 540 from one or more appliance 200A-200N and store them in a MEP based metrics table 510A-510N. In one embodiment, the appliance 200 uses a first type or first version of a MEP protocol 540 to obtain metrics from a first appliance 200A and stores the metrics in a first table 510A. In another embodiment, the appliance 200 uses a second type or second version of a MEP protocol 540' to obtain metrics from a second appliance 200N and stores the metrics in a second table 510N.

The appliance 200 may collect and monitor metrics from appliances 500A-500N using any type and form of network management protocol (NMP) and store the metrics in a NMP based metrics table 520A-520N. In one embodiment, the appliance 200 uses a SNMP protocol and communication model to obtains metrics from a second type of appliance 500A and stores the metrics in a NMP based metric table 520A. In some embodiments, the appliances 200 uses a second type of network management protocol, such as CIMP, to obtain from a second or third type of appliance 500N and stores the metrics in a NMP based metric table 520N. In some embodiments, appliance 500A is a different type of appliance than appliance 500N but both appliances support the same network management protocol for providing metrics.

The appliance 200 may also collect and monitor metrics from a server 106 and/or server arm 38 using any type and form of network management protocol (NMP) and store the metrics in a NMP based metrics table 520A'-520N'. In one embodiment, the appliance 200 uses the same network management protocol, such as SNMP, for obtaining metrics from a server 106 as used for obtaining metrics from one of the appliances 500A-500N. In another embodiments, the appliance 200 uses a different type of network management protocol for obtaining metrics from the server than is used by the appliance 200 for obtaining metrics from an appliance 500.

The appliance 200 may store metrics for the GSLB metrics 520 in a separate table for each device. For example, the appliance 200 may store metrics for a first appliance 200A in a first metrics table 510A, and metrics from a second appliance 520A in a second metrics table 520A. The appliance 200 may store metrics from a server 106 in a server metrics tables 520A'. In another embodiment, the appliance 200 stores metrics from a server farm 38 to a metrics table 520N' for the server farm.

The appliance 200 may store metrics for the GSLB metrics 520 in a separate table for each type of protocol. For example, the appliance 200 may store all MEP based metrics from a plurality of appliances 200A-200N in a first metrics table. In some embodiments, the appliance 200 stores a first type or version of MEP protocol based metrics in a first table 510A and a second type or version of an MEP protocol in a second table 510N. The appliance 200 may store all SNMP based metrics from one or more appliances 500A-500N in a second metrics table. In another example, the appliance may store metrics from a second type of network management protocol from one or more appliances 500A-500N to a third metrics table.

The GSLB metrics 530 may comprise any type and form of data, statistics, status or information related to or associated with the operational and/or performance characteristics of the appliance 200, 500, a server 106 or server farm 38. The global metrics 530 may comprise any type and form of data, statistics, status or information related to the network of the appliance 200,500, and/or server 106 or server farm 38. The global metrics 530 may comprise any type and form of data, statistics, status or information related to the services 270A-270N load balanced by the appliance 200A-200N, 500A-500N. In some embodiments, the global metrics 530 comprises operational and/or performance data on any client 102 and/or server 106 connected to the appliance 200A-200N, 500A-500N. In one embodiment, the appliance 200A-200N, 500A-500N determines operational and/or performance information about any client 102 or server 106 it is connected to or servicing, and creates metrics on these clients 102 and/or server 106. In this embodiment, the appliance 200A-200N, 500A-500N may provide these metrics to the global load balancing appliance 200.

In some embodiments, the operational and/or performance characteristic provides a metrics includes information on any of the following for an appliance or server 1) load; 2) numbers and types of connections, 3) resource usage, 4) resource availability, 5) number of requests outstanding, 6) number of requests transmitted, 7) number of clients servicing, 8) response time information, including average and historical response times, 9) errors, status, performance or bandwidth of a connection, and 10) number of sessions, and states or status thereof. In another embodiment, the metrics 530 includes information on any IP or network layer information of the appliance 200A-200N, 500A-500N, or the connections of the appliance 200A-200N, 500A-500N, or of the clients and/or servers serviced by the appliance 200A-200N, 500A-500N. For example, the information provided via metrics 530 may include a routing table of the appliance 200A-200N, 500A-500N for performing network address translation, such as for an SSL VPN connection.

Via the configuration interface 425, a user may select one or more metrics 430 from the global metrics 530 to use for load monitoring and determining the load 440. The appliance 200 may receive information identifying a user selection of one or more metrics from the global metrics 530. The appliance may receive a user selection of one or more MEP based metrics 510 of a first type of appliance. The appliance may receive a user selection of one or more NMP based metrics 520 of a second type of appliance. The appliance may also receive a user selection of one or more NMP based metrics 520' for any server or server farm. The user may select any combination of metrics 430 from the global metrics 530 to configure the appliance 200 to perform load balancing of heterogeneous devices according to the user selected metrics.

In one embodiment, the appliance 200 uses appliance established metrics in combination with any one or more of the user selected metrics 430 for load balancing. For example, the appliance 200 may collect and monitor the number of connections, response time, bandwidth and numbers of packets for any appliance 200, 500 or server 106 and use these metrics with any user selected metrics for load balancing. Via the configuration interface 425 and as also discussed in conjunction with FIGS. 6A and 6B, the appliance 200 may receive information from the user identifying, designating or establishing weights 435 and/or thresholds 437 for any appliance established metrics and/or user selected metrics.

Referring now to FIG. 7C, an embodiment of steps of a method 550 for performing global load balancing among heterogeneous devices is depicted. In brief overview, at step 555, the appliance 200 identifies a plurality of metrics from heterogenous devices to use for load balancing by the appliance. At step 560, the appliance 200 obtains metrics from one or more homogenous appliances 200A-200N or appliances of the same type as the first load balancing appliance 200. At step 565, the appliance 200 obtains metrics from heterogenous devices, such as appliances 500A-500N and/or servers 106, via a network management protocol, such as SNMP. At step 570, the appliance determines a load of one or more of the plurality of appliances, servers, and/or service managed by the appliance 200 based on the metrics collects at step 560 and step 565. At step 575, the appliance receives a client request to access a service. At step 580, the appliance determines based on the load one of the appliances 200A-200N, 500A-500N or one of the servers to which to direct the client request. At step 580, the appliance 200 transmits the request to the device, appliance or service selected in accordance with the determined load.

In further details, at step 555, the appliance 200 identifies metrics to collect and monitor for load balancing one or more appliances 200A-200N, 500A-500N, servers 106 or services 270A-270N. In one embodiment, the appliance 200 provides or identifies one or more appliance collected metrics 410 as described in conjunction with FIGS. 6A and 6B. For example, a table 410 may identify metrics collected by the appliance 200. In another embodiment, the appliance 200 provides one or more predetermined tables of appliance provided metrics 510 or 520, such as for an appliance of Citrix, F5, Cisco, or Radware. In other embodiments, the appliances 200 identifies one or more metrics to collect via a network management protocol in an object or variable database, such as an MIB 417 for SNMP. In one embodiment, the appliance provides a preconfigured or preinstalled MIB 417 for a predetermined appliance 200A-200N, 500A-500N, server 106 or service 270.

In some embodiments, the appliance 200 queries an appliance 200A-200N, 500A-500N, server 106 or service 270 to determine available metrics to collect and/or monitor. For example, in one embodiment, the appliance 200 queries an appliance, server or service for available object identifiers 422A-422N. In another embodiment, the appliance 200 uses a network management protocol, such as SNMP, to query for the identification of objects in a MIB 417. In yet another embodiment, a user via the configuration interface 425 identifies one or more object identifiers 422A-422N to collect and/or monitor from a appliance 200A-200N, 500A-500N, server 106 or service 270. In some embodiments, the user via the configuration interface 425 identifies one or more of the global metric 530 to collect and/or monitor from any one of the heterogenous device under management.

At step 560, the appliance 200 collects and/or monitors metrics 510A-510N from one or more appliances 200A-200N via a MEP protocol 540. In some embodiments, the appliances 200A-200N are of the same type or homogenous with the appliance 200. In one embodiment, the appliance 200 collects and/or monitors metrics 510 established, determined or otherwise selected by the appliance. In another embodiment, the appliance 200 collects and/or monitors metrics 510 established, determined or otherwise selected by a user. In some embodiments, the appliance 200 uses a first type or version of the MEP protocol 540 to collect metrics from a first appliance 200A and a second type or version of the MEP protocol 540' to collect metrics from a second appliance 200N.

One or more load monitors or monitoring agents 405A-405N of the appliance 200 may be configured, constructed or implemented to identify, collect and/or monitor metrics via MEP protocol 540 from one or more appliances 200A-200N. A first load monitor 405A may collect and monitor metric values from a first appliance 200A. A second load monitor 405N may collect and monitor metric values from a second appliance 200N. A third load monitor 405 may collect and monitor metric values from the first and second appliances 200A-200N.

A load monitor 405A-405N may collect and/or monitor metrics on any type of schedule or predetermined frequency. In some embodiments, the load monitor 405 collects metrics responsive to the detection of an event.

At step 565, the appliance 200 collects and/or monitors metrics 520A-520N' from one or more appliances 500A-500N, servers or a server farm any type and form of network management protocol. In some embodiments, the appliances 500A-500N are a different type or heterogeneous with the appliance 200. In other embodiments, one or more of the appliances 500A-500N are of a different type or heterogenous with one or more of the other appliances 500A-500N. In one embodiment, the appliance 200 collects and/or monitors metrics 520 established, determined or otherwise selected by the appliance. In another embodiment, the appliance 200 collects and/or monitors metrics 520 established, determined or otherwise selected by a user. In some embodiments, the appliance 200 uses a first type or version of a network management protocol, such as SNMP, to collect metrics from a first appliance 500A and a second type or version of a network management protocol, SNMP or CIMS, to collect metrics from a second appliance 500N.

One or more load monitors or monitoring agents 405A-405N of the appliance 200 may be configured, constructed or implemented to identify, collect and/or monitor metrics via a network management protocol from one or more appliances 500A-500N. A first load monitor 405A may collect and monitor metric values from a first appliance 500A. A second load monitor 405N may collect and monitor metric values from a second appliance 500N. A third load monitor 405 may collect and monitor metric values from a server 106 or server farm 38. In other embodiments, multiple monitors 405A-405N may collect and/or monitor metrics from a plurality of appliances 500A-500N and/or servers 106. A load monitor 405A-405N may collect and/or monitor any of the metrics 520A-520N on any type of schedule or predetermined frequency. In some embodiments, the load monitor 405 collects metrics 520A-520N' responsive to the detection of an event.

At step 570, the appliance determines a load for each of the one or more appliances 200A-200N, 500A-500N, servers, server farm or services. In some embodiments, a vServer 275 determines the load 440 for each service 270 via metric information collected and monitored by a load monitor 405. In another embodiment, the load monitor 405 determines the load 440 for appliance, server or service being monitored.

The appliance 200, vServer 275 and/or load monitor 405 may determine the load 440 using a user selected metric 430 weighted by a user designated weight 435. In some embodiments, the appliance 200 and/or load monitor 405 determines the load 440 using a plurality of user selected metrics 430 weighted by user designated weights 435. In yet another embodiment, the appliance 200 and/or load monitor 405 determines the load using a user selected metric 430 and user identified weight 435 and an appliance established metric 410 and an appliance established weight 435. In further embodiments, the appliance 200 determines the load 440 by summing a weighted load for each metric. For the embodiment of multiple monitors 405A-405N per service 270, the appliance 200 may determine the load for an appliance, server or service by assigning a weight to each monitor and computing weighted load across all the monitors 405. In yet another embodiment, the appliance may determine the load for an appliance, server or service by assigning a weight to each of the appliance, service or service.

In some embodiments, a load monitor 405 determines that a metric 530 for an appliance, server or service has reached or exceeded a threshold 437. In other embodiments, a load monitor 405 determines that a metric 530 for an appliance, server or service is within a threshold 437. In one embodiment, the load monitor 405 uses an appliance established or provided threshold for a metric 530. In another embodiment, the load monitor 405 uses a user specified or configured threshold 437.

At step 575, the appliance 200 receives a request from a client to access a service. In one embodiment, a virtual server or vServer 275 of the appliance 200 intercepts or otherwise receives a request from the client. In some embodiments, the virtual server 275 transparently intercepts the client's request to a service 270 or server 106. In other embodiments, a client 102 transmits the request to the vServer 275. In another embodiment, the vServer 275 determines from the request that the request is for one or more services under management by the appliance 200. In one embodiment, the vServer 275 intercepts or receives the request via a SSL VPN connection between the client and the appliance 200.

At step 580, the appliance 200 determines which of the appliances 200A-200N, servers 106 or services 270A-270N to direct the client request based on determination of the load 440 for each of the appliances 200A-200N, servers 106 or services 270A-270N. In one embodiment, the vServer 275 directs the request responsive to one or more load monitors 405. In some embodiments, a vServer 275 directs, forwards or otherwise transmits the request to an appliance 200A-200N, 500A-500N, server or service with the least or smallest load. In one embodiment, the vServer 275 directs, forwards or otherwise transmits the request to an appliance 200A-200N, 500A-500N, server or service with one of the lower determined loads. In some embodiments, the vServer 275 directs, forwards or otherwise transmits the request to the s an appliance 200A-200N, 500A-500N, server or service previously handling requests from the client 102. In one embodiment, the vServer 275 transmits the request to the previously used an appliance 200A-200N, 500A-500N, server or service if the load for the appliance 200A-200N, 500A-500N, server or service is within a predetermined threshold. In some embodiments, the vServer 275 transmits the request to the first available an appliance 200A-200N, 500A-500N, server or service in a list with a determined load within a predetermined threshold.

In another embodiment, a vServer 275 directs, forwards or otherwise transmits the request to an appliance 200A-200N, 500A-500N, server or service using a round robin technique, or weighted round robin. In yet another embodiment, the vServer 275 directs the request to an appliance 200A-200N, 500A-500N, server or service based on one or more metrics, such as appliance collected metrics 410 or device provided metrics 420. For example, in some embodiments, the vServer 275 directs the request to an appliance 200A-200N, 500A-500N, server or service based on one or more of the following: least response or round trip time, least number of connections, least number of packets, and least used bandwidth. In yet other embodiments, the vServer 275 directs the request to an appliance 200A-200N, 500A-500N, server or service based on one or more device provided metrics 530, such as CPU, memory and disk resource usage. In another example, the vServer 275 directs the request to an appliance 200A-200N, 500A-500N, server or service based on resource usage on or of an appliance 200A-200N, 500A-500N, server or service.

In some embodiments, a vServer 275 may not direct a request to an appliance 200A-200N, 500A-500N, server or service in which a metric for the service 270 has exceeded a threshold 437, such as a user configured threshold 437. In other embodiments, a vServer 275 may not direct to a request to an appliance 200A-200N, 500A-500N, server or service if more than one threshold 437 of the metrics 530 for the appliance 200A-200N, 500A-500N, server or service has been exceeded. In yet another embodiment, a vServer 275 may direct a request to an appliance 200A-200N, 500A-500N, server or service even if a metric threshold 437 has been reached or exceeded. For example, if one metric threshold 437 of a plurality of thresholds 437 has been exceeded, then the vServer 275 may still direct the request to the appliance 200A-200N, 500A-500N, server or service if the other metric thresholds have not been reached.

In still other embodiments, the appliance 200 may determine from load monitoring that a metric of a first GSLB vServer 275A has reached a threshold 437. In response to the determination, the appliance 200 may spillover management of the appliances 200A-200N, 500A-500N, servers or services to a second GSLB virtual server, or vServer 275B. In one embodiment, the second virtual server 275B may be a backup GSLB server. In some embodiments, the second GSLB virtual server 275B is established in response to detecting the first GSLB virtual server 275A has reached one or more thresholds. In another embodiment, the second GSLB virtual server 275B may be established and running on the appliance 200.

At step 580, the appliance 200 transmits the client request to the appliance 200A-200N, 500A-500N, server or service identified by the appliance at 585. In one embodiment, the appliance 200 transmits the client request in a manner transparent to the appliance 200A-200N, 500A-500N, server or service such that the request appears to have been sent from the client instead of the appliance 200. For example, the appliance 200 may act as a transparent or intercepting proxy for the client 102. In other embodiments, the appliance 200 acts as a non-transparent proxy and transmits the request to the appliance 200A-200N, 500A-500N, server or service on the client's behalf. In some embodiment, the vServer 275 transmits the request to the appliance 200A-200N, 500A-500N, server or service. In other embodiments, a backup vServer 275 transmits the request to the appliance 200A-200N, 500A-500N, server or service. In yet other embodiments, a second vServer 275 transmits the request to the appliance 200A-200N, 500A-500N, server or service Although the systems and methods of FIGS. 7A-7C are generally discussed in the context of global server load balancing, these systems and methods may be used for local load balancing. The appliance 200 may use metrics obtained from heterogeneous devices, servers, or services using a plurality of protocols to load balance one or more services or servers. Using the techniques described herein, the appliance 200 is configurable and flexible to obtain metrics from any network resource—system, sub-system, application, service, device, etc—using either a metric exchange protocol supported by the appliance and/or a more general network management protocol supported by the network resource. Additionally, the appliance 200 is configurable to allow users to select any combination of available metrics from these heterogenous network resources to perform load monitoring and load balancing of one or more services.

H. Synchronizing Metrics Across a Plurality of Cores in a Multi-Core System

Figure 8A:
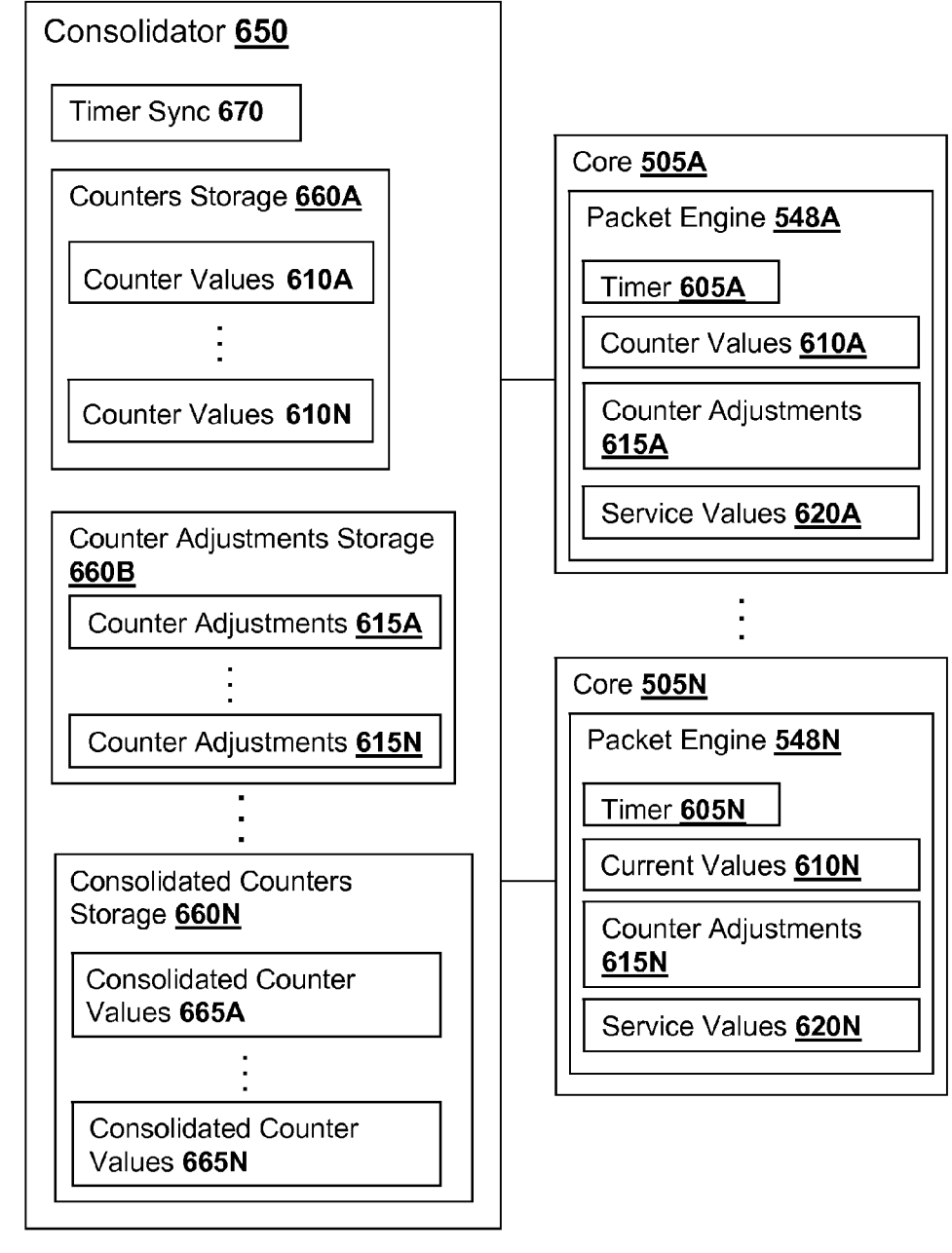
FIG. 8A is a block diagram of an embodiment of a system for synchronizing and consolidating metrics and statistics used for servicing network traffic locally across a plurality of cores of a multi-core intermediary device.

Referring now to FIG. 8A, an embodiment of a system for synchronizing and consolidating information, such as metrics and statistics stored in counters locally across a plurality of packet engines (PEs) in a multi-core system is depicted. In brief overview, FIG. 8A illustrates an appliance 200, also referred to as an intermediary, comprising a consolidator 650 in communication with a plurality of cores 505A through 505N. Each of the cores 505A-N may further comprise a packet engine 548, such as a PE 548A. The consolidator 650 may includes a timer sync 670, and a plurality of storages 660A-N. Storages 660 may include a number of counter storages, such as a counters storage 660A, a counter adjustments storage 660B and a consolidated counters storage 660N. The PE 548 of each of the cores 505 of the appliance 200 further includes a timer 605, counter values 610, counter adjustments 615 and service values 620. The consolidator 650 may exchange information with each of the PEs on the plurality of cores 505A-N to consolidate metrics and statistics used by each of the PEs 548 and update each of the PEs 458 with the consolidated information. The updated information may include consolidated and updated counter values or parameters from each of the PEs 548. The consolidated and updated counter values may include, or correspond to. various metrics and statistics used by the packet engines 548 for providing services, such as the load balancing of network traffic. PEs 548 of each of the cores 505 may use the consolidated and updated metrics and statistics to generate or calculate an updated set of service values 620. The updated set of service values 620 may include configuration and operation settings for implementing of the service, such as the load balancing. Using such a consolidation, each of the packet engines 548 of the multi-core system appliance 200 may instead use consolidated and up to date information for all the PEs 548 of the appliance 200 instead of using only the locally available information which may vary from PE 548 to another PE 548.

In detailed overview, a timer 605 may be any hardware, software or any combination of hardware or software for counting, monitoring or measuring time duration or duration of time intervals. Timer 605 may include any type and form of a logic circuit. Timer 605 may include functions, scripts, hardware units, components or devices for measuring time intervals or time durations. Timer 605 may be comprise functionality to be set or reset by the appliance 200. Timer 605 may include a logic circuitry to perform periodic actions that are used to count time. In some embodiments, timer 605 includes an oscillator. The oscillator may include a crystal in combination with digital or analog circuitry to perform periodic measurements or actions. Timer 605 may count, monitor or measure an amount of time lapsed, or an amount of time left. Timer 605 may count any duration of time, such as for example 0.01, 0.05, 0.1, 0.25, 0.5, 0.75, 1, 1.25, 1.5, 1.75, 2, 2.25, 2.5, 2.75, 3, 3.25, 3.5, 3.75, 4, 4.5, 5, 6, 7, 8, 9, 10, 20, 30, 50, 70, 90, 100, 200, 300, 500 and 1000 milliseconds. In some embodiments, timer 605 counts an amount of time left until an action occurs, an action is taken or a step is performed. The timer 605 may be used as trigger for another action or a process, such as for example sending a transmission or an instruction. Timer 605 may be a stand alone component anywhere on the appliance 200, and may communicate with any of the cores 505. In some embodiments, each of the cores 505 includes one or more timers 605. Timer 605 may operate or run within a packet engine 548, or within any other component of the appliance 200. Timer 605 may monitor, count or measure time on any component of an appliance 200 and may be used in any configuration with any other tasks and for a variety of purposes and functions.

Counter values 610, such as the counter values 610A, may include any type and form of a structure, object, table, array structure, setting or location for storing any type and form of metrics and statistics that correspond to a service or an operation performed by the appliance 200. Counter values 610 may comprise or store any type and form of values, parameters, configurations, data, settings, or any information about service or operations performed by an appliance 200. Counter values 610 may include metrics, statistics, configurations, measurements, parameters or information used by appliance 200 for performing, controlling or managing operations performed on the network traffic traversing the appliance 200. Counter values 610 may include metrics or statistics used by a packet engine 548 for load balancing of network traffic that traverses the packet engine 548. Counter values 610 may be stored into a storage or a memory. Counter values 610 may be organized into, or may include, one or more locations on a memory for storing information. Counter values 610 may be organized into arrays, such as arrays of structures. Arrays of the counter values 610 may include any type and form of information pertaining to network traffic traversing the appliance 200. An array of structures of the counter values 610 may include a plurality of structures, each of which may further include metrics, statistics, parameters, counter values, measurements or information corresponding to specific connections, sessions or communications between clients 102 and servers 106.

Counter values 610 may include any type and form of metrics or statistics used for performing an operation or a service, such as the load balancing. In some embodiments, counter values 610 includes a value corresponding to a number of data packets received by a multi-core appliance 200. The value corresponding to the number of data packets received may be updated as the packet engine 548 storing the counter values 610 receives additional data packets. In other embodiments, counter values 610 includes a value corresponding to a number of data packets sent by the multi-core appliance 200. The value corresponding to the number of data packets sent may be updated as the packet engine 548 storing the counter values 610 sends additional data packets. In further embodiments, counter values 610 includes a value corresponding to a number of data packets pending to be sent by the multi-core appliance 200. The value corresponding to the number of data packets pending to be sent may be updated as the packet engine 548 storing the counter values 610 sends or receives additional data packets. In still further embodiments, counter values 610 includes a value corresponding to a number of bytes of network traffic sent or received by the multi-core appliance 200. The value corresponding to the number of bytes sent or received may be updated as the packet engine 548 storing the counter values 610 sends or receives additional data packets. In yet further embodiments, counter values 610 includes a value corresponding to a number of current connections opened or maintained by the multi-core appliance 200. The value corresponding to the number of opened or maintained connections as the packet engine 548 storing the counter values 610 opens new connections or closes the some connections. In still further embodiments, counter values 610 includes a value corresponding to a number of transactions pending by the multi-core appliance 200. The value corresponding to the number of transactions pending may be updated as the packet engine 548 storing the counter values 610 implements or executes a transaction. In yet other embodiments, counter values 610 includes a value corresponding to a current load of the network traffic pending by the multi-core appliance 200. The value corresponding to the current load pending may be updated as the packet engine 548 storing the counter values 610 implements or executes some transactions or forwards or receives some network traffic. In yet further embodiments, counter values 610 includes a value corresponding to a bandwidth used or bandwidth available by the multi-core appliance 200. The value corresponding to the bandwidth used or the bandwidth available may be updated as the packet engine 548 storing the counter values 610 frees up some bandwidth or uses up some more bandwidth. Counter values 610 may further include any metrics or statistics regarding any number of transactions, messages, requests, responses, servers and clients connected to, applications and resources engaged or load balanced, number of streaming video or audio files load balanced, number of client to server sessions load balanced, number of websites opened, number of sessions or connections opened per one client or one server, or any other metrics or statistics that may be used for load balancing.

Inputs or values stored within the counter values 610 may further include any type and form of information about any network traffic traversing one or more PEs 548. In some embodiments, inputs stored within the counter values 610 include any value, parameter, measurement or a setting pertaining to a number of data of a certain format or type received by a PE 548 or an appliance 200. In further embodiments, inputs or values of the counter values 610 include information about a number of sessions of a certain type or protocol traversing one or more PEs 548, or by an appliance 200. In still further embodiments, counter values 610 inputs includes a number of requests sent by a client 102 via one or more PEs 548, or via the appliance 200. In yet further embodiments, counter values 610 values includes a number of responses sent by a server 106 via one or more PEs 548, or via the appliance 200. In yet further embodiments, counter values 610 values includes a number of data packets of a certain format or type, such as HTTP data packets, streaming video data packets etc. In still further embodiments, counter values 610 values includes information about current connections, such as type of connections such as TCP or UDP connections, type of sessions, type of sessions or connections over a certain protocol. In yet further embodiments, counter values 610 values includes information about a type or format of current load, such as the application network traffic load, streaming video network traffic load, HTTP network traffic load, HTML network traffic load, text or ascii network traffic load, ICA protocol network traffic load or any other type and form of network traffic load. In still further embodiments, counter values 610 values includes information about response times between communications of clients and servers traversing one or more PEs 548. In still further embodiments, counter values 610 values includes information about changes in counter values, measurements, parameters or data values. The changes may be any changes between a previous set of values and a current set of values. In some embodiments, changes include rates of changes of any of the inputs over any number of consolidations. Changes may also include differences between a set of counter values or parameters currently used by one or more PEs 548 for performing operations, or a set of values to be used for performing the same operations in the future. In some embodiments, counter values 610 inputs or values include information about instructions, configuration or operation settings of an appliance 200. Counter values 610 inputs or values may include any type and form of a value, such as a number, a signal, a character, a setting, a configuration point, a measurement or a symbol that may be used for managing, controlling or performing operations or services implemented by the appliance 200.

In one embodiment, counter values 610 of a PE 548 may be organized as an array comprising a plurality of structures each storing a plurality of values, configurations, parameters or data for a specific subset of network traffic traversing the PE 548. Each structure may be defined as a server_info type structure, such as an array of structures from an embodiment presented in table 1 below:

TABLE 1

An example of an array of structures for storing a set of values.

```
typedef server_info
{
    u16bits svc_index;
    u16bits reserved;
    u32bits fast_packets_rcvd;
    u32bits fast_packets_sent;
    u32bits fast_bytes_sent;
    u32bits fast_bytes_rcvd;
    u64bits fast_ttfb;
    u32bits fast_transactions;
    s32bits current_connections;
    cumulative_delta_stats_t deltastats;
} server_info_t;
```

Counter values 610 may include any number of arrays of structures. The arrays may include any number of structures, such as the structure presented in table 1. The arrays may include information, metrics, statistics, counter values, settings or measurements for any specific subset of network traffic traversing an appliance 200. In some embodiments, the subset of the network traffic is an instance of service or operation performed by the appliance 200. In other embodiments, the subset of network traffic are data packets exchanged between a client and a server in a single connection. In other embodiments, the subset of network traffic includes any exchanged information from one or more connections or sessions. The connections and sessions may be between any number of clients and servers. In further embodiments, the subset of network traffic includes information pertaining to network traffic from a single server 106 or a single service provided by the server 106. In some embodiments, the subset of network traffic may be network traffic of a client 102 or a group of clients 102. In still further embodiments, the subset of network traffic of the structure may correspond to an application or a service provided by one or more servers 106. Counter values 610 may include any number of arrays or arrays of structures that include any information about any subset of network traffic traversing the appliance 200, such as the services or connections of any clients 102, servers 106, application, service, resource or any other set of data of any other type traversing the appliance 200.

Counter adjustments 615, such as the counter adjustments 615A, may include any type and form of structure, object, table, array structure, metrics, statistics, adjustment, correction, change or update to any counter value 610. Counter adjustments 615 may include any type and format of input or a value as stored in a counter values 610. Counter adjustments 615 may include a structure, setting or location for storing any type and form of adjustment or correction values, parameters, configurations, data, settings, or any information about service or operations performed by an appliance 200. In some embodiments, counter adjustments 615 include changes, adjustments or amendments to any number of inputs or values within the counter values 610. Counter adjustments 615 may include differences in numbers or values between the current values of the counter values 610 and the correct values to replace the current values. Counter adjustments 615 may include updates to counter values, settings values or parameters used by the packet engines 548 to update or improve load balancing operations of the network traffic traversing the appliance 200.

Counter adjustments 615 may include any information, data, values, settings or parameters used by PE 548 for updating, adjusting or correcting Counter values 610. In some embodiments, counter adjustments 615 includes updates or adjustments for information about a number of bytes received by a PE 548 or an appliance 200. In further embodiments, counter adjustments 615 includes updates or adjustments to information about a number of bytes sent by one or more PEs 548, or by an appliance 200. In still further embodiments, counter adjustments 615 includes updates or adjustments to a number of requests sent by a client 102 via one or more PEs 548, or via the appliance 200. In yet further embodiments, counter adjustments 615 includes an update or adjustments to a number of responses sent by a server 106 via one or more PEs 548, or via the appliance 200. In yet further embodiments, counter adjustments 615 includes an update or adjustments to a number of data packets sent or received by one or more PE 548, or via the appliance 200. In still further embodiments, counter adjustments 615 includes an update or adjustment to information about current connections on one or more PEs 548. In yet further embodiments, counter adjustments 615 includes updates or adjustments for information about current load on one or more PEs 548. In still further embodiments, counter adjustments 615 includes an update or an adjustment for information about response times between communications of clients and servers traversing one or more PEs 548. In still further embodiments, counter adjustments includes updates or adjustments for information about changes in counter values, measurements, parameters or data values. The changes may be any changes between a previous set of values and a current set of values. Counter adjustments may be any difference, amendment or delta to any counter value 610, such as a parameter, number, measurement, setting, counter value or any other information used by one or more PEs 548 for performing operations on the network traffic traversing the appliance 200.

Service values 620 may include any type and form of counter values, parameters, settings, measurements or configuration points used by the PEs 548 for performing or implementing operations or services on the traversing network traffic. Service values 620 may comprise one or more values, parameters, settings or configuration values for performing service or operations, such as load balancing of the network traffic, formatting of the data packets, compression of the network traffic of any other operation performed by the appliance 200. Service values 620 may include one or more counter values 610. In some embodiments, service values 620 include one or more counter adjustments 615. In yet further embodiments, service values 620 include one or more timer 605 values. Service values 620 may include one or more values, parameters, settings, configuration points or instructions calculated from or determined by using counter values 610 and counter adjustments 615. Service values 620 may include any number of values, parameters, settings or configuration points calculated by using a combination of counter values 610 and counter adjustments 615. Service values 620 may be used by functions, programs, units, devices or components of the appliance 200 for performing any operation or any service on the network traffic traversing the appliance 200. The operations performed or implemented may include load balancing of the network traffic, network traffic management or control, redirecting of the network traffic, traffic compression, reformatting of the data packets traversing the appliance 200 or any other function or operation implemented by any component of the appliance 200. In some embodiments, service values 620 are used for determining the direction, redirection or flow of network traffic during the load balancing of the network traffic. Service values 620 may include information about the network bandwidth, number of data packets received or sent by the appliance, load of the network traffic received or sent by the appliance 200, number of open connections, number of open sessions, number of available sessions or connections, or any other information which may be used for load balancing of the network traffic. Service values 620 may be periodically recalculated or updated by the packet engine 548. The recalculated or updated service values 620 may be determined using the previously updated service values 620 along with a new set of counter adjustments 615. In some embodiments, service values 620 are determined by calculations performed using any number of inputs or values of the counter values 610 or counter adjustments 615. Furthermore, packet engine 548 may utilize additional inputs, parameters, values or information for determining service values 620. Service values 620 may be maintained up to date by the packet engine 548 or any other component of the appliance 200. The packet engine 548 or any other component of the appliance 200 may use the service values 620 for performing any function, operation or service on the network traffic traversing the appliance 200.

Consolidator 650 may be any hardware, software or any combination of hardware and software for gathering, consolidating, recalculating, updating and refreshing of any information, such as counter values, from a plurality of cores 505. Consolidator 650 may include any logic, circuitry, function, programs, executables, scripts, devices or any other functionality or means for updating, recalculating, consolidating or refreshing one or more values used by a plurality of packet engines 548 operating on a plurality of cores 505. Consolidator 650 may include one or more memories or locations in a memory storing counter values 610A-N, counter adjustments 615 or even service values 620 for each PE 548 of the plurality of cores 505. In some embodiments, consolidator 650 includes one or more memories or locations in a memory for storing timer 605 values, counter adjustments 615 or service values 620. Consolidator 650 may include any logic, scripts, programs, circuitry, hardware, software or a combination of hardware and software for transmitting, receiving or otherwise exchanging information with cores 505, or PEs 548. Consolidator 650 may execute as a part of one or more processing engines for processing, recalculating, consolidating or updating information, such as counter values 610, from a plurality of PEs 548. In some embodiments, consolidator 650 includes logic, scripts, programs or means for updating or sending updates to each of the counter values 610 of the plurality of PEs 548 on each of the cores 505. Consolidator 650 may synchronize, reset or set timers 605 on each of the cores 505. In some embodiments, consolidator 650 manages or controls the process of updating counter values 610 on each of the PEs 548. Consolidator 650 may use counter values 610 or adjustment values 615 from each of the PEs 548 to determine the updated or consolidated values 610.

Consolidator 650 may calculate or determine an updated or consolidated value for each parameter, setting or a value, such as a counter value 610. In some embodiments, consolidator 650 determines a specific updated or consolidated counter value using each of the corresponding counter values from each of the PEs 548 that correspond to the specific calculated value. For example, a consolidator 650 may receive a specific value from the counter values 610 from each of the PEs 548, each value identifying a number of data packets received by each PE 548 of the plurality of PEs 548. The consolidator 650 may then use the received specific value to calculate or determine an updated or a consolidated number of data packets received for the entire appliance 200. The consolidator 650 may send the consolidated number of data packets to each of the plurality of PEs 548. In some embodiments, the consolidator 650 may send a counter adjustment value 615 to each of the PEs 548 to update or consolidate the number of data packets for each of the plurality of PEs 548. Similarly, consolidator 650 may determine consolidated values for each counter value 610, such as the data packets received value, data packets sent value, data packets pending value, number of bytes sent, received or pending, number of transactions established, available or pending, number of current connections, current load value, response time value or any other counter value 610. In some embodiments, consolidator 650 determines counter adjustment values 615. For example, a consolidator 650 may use a plurality of counter values 610 to determine adjustment values 615 for adjusting a specific counter value 610 for each of the PEs 548 using the corresponding counter values 610 from each of the PEs 548. Consolidator may transmit the adjustment values 615 to each of the corresponding PEs 548. These adjustment values 615 may be used by the PEs 548 to recalculate the new service values 610 to be used for performing operation or service on the network traffic traversing the appliance 200.

Consolidator 650 may comprise one or more arrays, data structures, objects, arrays of structures or storage locations for storing and maintaining values, such as counter values 610 for each of the PEs 548 on the cores 505. In some embodiments, consolidator 650 includes a plurality of arrays of structures, such as a counter values 610 array of structures. In further embodiments, consolidator 650 includes one or more maps of values that correspond to values from the counter values 610 for each of the PEs 548. In yet further embodiments, consolidator 650 stores counter values 610 in one or more memory locations for the counter values. Consolidator 650 may further comprise one or more arrays for maintaining counter adjustment values of each of the PEs 548 or for the appliance 200. Consolidator 650 may further include a consolidated array that includes values that are calculated and consolidated using counter values 610 from each of the PEs 548. Consolidator 650 may further include an array of structures for a total sum for each corresponding value from each of the PEs 548. In some embodiments, consolidator 650 uses the array of structures that comprises the total sum for each of the corresponding values from each of the counter values 610 to maintain the total counter values for the entire appliance 200. For example, the array of structures for total sum of the consolidator 650 may include a sum of all received data packets from each of the PEs 548. Similarly, the array of structures for total sum may also include a sum of all sent data packets from all PEs 548, a sum of all bandwidth used or bandwidth available from all PEs 548, a sum of all connections by all PEs 548 or any sum of any other corresponding set of values across the current values 610A-N for the appliance 200. In some embodiments, consolidator 650 uses arrays to maintain previous values for the counter values 610 and adjustment values 615. Consolidator 650 may use any number of arrays to maintain any combination the counter values 610A-N, counter adjustments 615A-N and service values 620A-N for all the PEs 548 from all the cores 505A-N.

Consolidator 650 may operate or run on any core 505 of the multi-core system. In some embodiments, consolidator 650 runs or operates on a master core 505 of a multi-core system. The master core 505 may use the consolidator 650 to consolidate and update information on each of the cores 505. The master core 505 may ping or send transmissions to each of the cores 505 periodically to update the counter values 610 on each of the cores 505. Consolidator 650 may exchange information with each of the cores 505 using inter-core communication, such as core to core messaging. In some embodiments, consolidator 650 uses shared memory which may be accessed by each of the cores 505 to share information with the PEs 548 operating on each of the cores 505. In some embodiments, consolidator 650 operating on a master core 505 of the plurality of cores 505 maintains storages 660A-N on the shared memory which may be accessed, written to and read from by each of the cores 505. In further embodiments, consolidator 650 from the master core 505 transmits to each of the PEs 548 operating on each of the cores 505 the information, which may include counter values 610, counter adjustments 615 or timer related information.

Storage 660 may be any means, device, unit, function or structure for storing or maintaining a plurality of sets of values, such as counter values 610A-N and counter adjustments 615A-N. In some embodiments, storage 660 includes a storage means or a structure for storing a plurality of array of structures, each comprising a set of values, parameters, measurements or settings. Storage 660 may include any hardware, software or a combination of hardware and software for maintaining one or more set of values, parameters, settings or data. Storage 660 may comprise a memory or a plurality of memories for storing one or more counter values 610A-N or adjustment values 615A-N. Storage 660 may be organized to hold a number of sections, tables, maps, arrays, array structures, or any other means to organize, set up, store and maintain a plurality of sets of values. In some embodiments, storage 660 includes an array comprising information that corresponds to a subset of network traffic traversing an appliance 200. The subset of network traffic may be any network traffic of a connection, a user session, a communication from a server 106 or a client 102, or any network traffic for a service or resource being accessed via the appliance 200.

In one embodiment, storage 660 includes an array of structures for maintaining adjustments or changes between the most updated set of values a set of values currently known or used by a PE 548. In some embodiments, such an array structure is a counter adjustments storage storing a set of adjustment values or corrections to be used by a PE 548 for updating counter values 610 of the PE 548. Such array of structures may also be referred to as delta array. In some embodiments, each of the elements in such an array may include a number of corrected values to replace the current counter values 610 of the PE 548. In other embodiments, each of the elements in such an array include changes or deltas between the current counter values 610 of the PE 548 and the correct values for the counter values 610. For example, an array may hold small increments or decrements to be added to, or subtracted from the counter values 610 of the PE 548 in order to correct the counter values 610 of the PE 548. An example of an array of structures for updating, adjusting or correcting a set of values is shown in table 2 below:

TABLE 2

An example of an array of structures for a set of values for adjusting or updating a set of values used by a Packet Engine 548.

```
typedef struct cumulative_delta_stats
{
    u64bits packets_rcvd;
    u64bits packets_sent;
    u64bits bytes_sent;
    u64bits bytes_rcvd;
    u64bits fast_ttfb;
    u64bits fast_transactions;
    s32bits current_connections;
    u64bits lrtm_response_time; /* current counter */
    s32bits current_load;
} cumulative_delta_stats_t;
```

In addition to arrays of structures presented in tables 1 and 2, storage 660 may further include any number of arrays. Some of the arrays may include a different or similar structure. In some embodiments, some arrays include a different set of values from other arrays. In other embodiments, some arrays hold a similar or even identical set of values as other arrays. Storages 660 may be created, maintained and terminated by the consolidator 650 or the appliance 200. In some embodiments, consolidator creates a new storage 660 for a duration of time to be used for maintaining a set of values during a transient calculation. The consolidator may terminate the new storage 660 when the consolidator 650 completes the calculation and the new storage 660 in no further necessary.

Counters storage 660A may be any type of storage 660 for generating, updating or maintaining counter values 610A-N from one or more PEs 548. Counter storage 660A may comprise any hardware, software or a combination of hardware and software for maintaining one or more set of values, metrics and statistics, as stored in counter values 610A-N. Counter storage 660A may comprise a memory or one or more locations in a memory for storing one or more of sets of values, such as counter values 610A-N or adjustment values 615A-N. In some embodiments, counter storage 660 maintains a plurality of sets of values corresponding to counter values 610A-N from each of the cores 505A-N. Counters storage 660A may include a plurality of arrays of structures, such as the arrays depicted in tables 1 and 2 for storing any set of values. Each of the plurality of arrays may correspond to a counter values 610 from a single one of a plurality of PEs 548. Counters storage 660A may further include logic, circuitry, hardware, software, a combination of hardware and software, a script, an executable or any other means for adjusting, rewriting or editing any one of the values in the counters storage 660A. In one example, counters storage 660A uses a script or an executable to rewrite a value in counter values 610 within the counters storage 660A. Counters storage 660A may maintain or edit any of the values, parameters, such as counter values 610A-N for each of the PEs 548. Counter storage 660A may maintain any number of previous values for each of the inputs of the counter values 610A-N to preserve a history of the values. Counter storage 660A may be refreshed or updated periodically as the consolidator 650 refreshes the counter values 610 or counter adjustments 615 from each of the PEs 548. The refresh or update may occur every 0.05, 0.1, 0.25, 0.5, 1, 1.5, 2, 2.5, 3, 3.5, 4, 5, 8, 10, 15, 20, 50 or 100 milliseconds. In embodiments, refresh of any of the counter values 610 in the counters storage 660A occurs at any period, such as anywhere between every 0.01 millisecond to every 1 second. In some embodiments, the refresh or update occurs based on an event. An event may be a transmission from a PE 548 about a counter values 610 change on the PE 548. In some embodiments, the event may be a detection of change in one or more of counter values 610.

Counters adjustments storage 660B may be any type of storage 660 for generating and maintaining counter adjustments 616A-N for one or more PEs 548. Counters adjustments storage 660B may comprise any hardware, software or a combination of hardware and software for maintaining one or more set of values, such as the counter adjustments 615. Counters adjustments storage 660B may comprise a memory or one or more locations in a memory for storing one or more of sets of values, such as counter values 610A-N or adjustment values 615A-N. In some embodiments, counters adjustments storage 660B maintains a plurality of sets of values corresponding to counter adjustments 615 from each of the cores 505A-N. Counters adjustments storage 660B may include a plurality of arrays of structures, such as the arrays depicted in tables 1 and 2 for storing any set of values. Each of the plurality of arrays may correspond to a counter adjustments 615 value from a single one of a plurality of PEs 548. Counters adjustments storage 660B may further include logic, circuitry, hardware, software, a combination of hardware and software, a script, an executable or any other means for adjusting, rewriting or editing any one of the values in the counters storage 660A. In one example, counters adjustments storage 660B uses a script or an executable to rewrite a value in counter adjustments 615 values within the counters storage 660. Counters adjustments storage 660B may maintain or edit any of the values, parameters, such as counter adjustments 615A-N values for each of the PEs 548. Counters adjustments storage 660B may maintain any number of previous values for each of the inputs of the counter values 610A-N to preserve a history of the values. Counters adjustments storage 660B may be refreshed or updated periodically as the consolidator 650 refreshes the counter values 610 or counter adjustments 615 from each of the PEs 548. The refresh or update may occur every 0.05, 0.1, 0.25, 0.5, 1, 1.5, 2, 2.5, 3, 3.5, 4, 5, 8, 10, 15, 20, 50 or 100 milliseconds. The refresh of any of the values in the counters adjustments storage 660B may occur at any period, such as anywhere between every 0.01 millisecond to every 1 second. In some embodiments, the refresh or update occurs based on an event. An event may be a transmission from a PE 548 about a counter values 610 change on the PE 548. In some embodiments, the event may be a detection of change in one or more of counter values 610.

Consolidated counters storage 660N may be any type of storage 660 for generating and maintaining a consolidated set of metrics and statistics from the counter values 610A-N and/or counter adjustments 615A-N from a plurality of PEs 548. Consolidated counters storage 660N may comprise any hardware, software or a combination of hardware and software for calculating, updating and maintaining the consolidated or combined values. Consolidated counters storage 660N may comprise a memory or one or more locations in a memory for storing one or more of sets of values, such as counter values 610A-N or adjustment values 615A-N. In some embodiments, consolidated counters storage 660N maintains a consolidated set of values that corresponds to a most updated set of values for each of the counter values 610A-N or counter adjustments 615A-N. In some embodiments, consolidated counters storage 660N maintains a total set of values that corresponds to a total sum of all counter values 610A-N or counter adjustments 615 from each of the cores 505A-N. Consolidated counters storage 660N may include a plurality of arrays of structures, such as the arrays depicted in tables 1 and 2 for storing any set of values. Each of the plurality of arrays may correspond to a consolidated set of values corresponding to a single one of a plurality of PEs 548 or all of the PEs 548 of the appliance 200. Consolidated counters storage 660N may further include logic, circuitry, hardware, software, a combination of hardware and software, a script, an executable or any other means for calculating, adjusting, rewriting or editing any one of the inputs, metrics and statistics in the consolidated counter storage 660N In one example, counters adjustments storage 660B comprises a script or an executable to rewrite a value in counter adjustments 615 values within the counters storage 660. Counters adjustments storage 660B may maintain or edit any of the values, parameters, such as counter adjustments 615A-N values for each of the PEs 548. Counters adjustments storage 660B may maintain any number of previous values for each of the inputs of the counter values 610A-N to preserve a history of the values. Counters adjustments storage 660B may be refreshed or updated periodically as the consolidator 650 refreshes the counter values 610 or counter adjustments 615 from each of the PEs 548. The refresh or update may occur every 0.05, 0.1, 0.25, 0.5, 1, 1.5, 2, 2.5, 3, 3.5, 4, 5, 8, 10, 15, 20, 50 or 100 milliseconds. The refresh of any of the values in the counters adjustments storage 660B may occur at any period, such as anywhere between every 0.01 millisecond to every 1 second. In some embodiments, the refresh or update occurs based on an event. An event may be a transmission from a PE 548 about a counter values 610 change on the PE 548. In some embodiments, the event may be a detection of change in one or more of counter values 610.

Consolidated counter values 665A-N may be any set of values generated by consolidating or combining any combination of counter values 610A-N and counter adjustments 615A-N. Consolidated counter values 665A-N may include any set of values generated or calculated by consolidating or combining all the metrics and statistics from all of the PEs 548. As the PEs 548 load balance the network traffic, their metrics and statistics may diverge from the metrics and statistics of other PEs 548. By consolidating the metrics and statistics, all of the PEs 548 may use more updated consolidated metrics and statistics for performing the load balancing of the network traffic. In some embodiments, consolidated counter values 665A-N are generated by adding or summing up all the corresponding values or inputs from the counter values 610A-N. In further embodiments, consolidated counter values 665A-N are generated by adding or summing up all the corresponding values or inputs from the adjustment counter values 615A-N. Consolidated counter values 665A-N may include an array of structures where some of the structures were generated by combining the corresponding structures in other counter values 610A-N and adjustment values 615A-N. The combination may include summation of values, averaging of the values, identifying the largest or smallest of the values, taking a median value of the values. In some embodiments, consolidated counter values 665A-N include a summation, aggregation or consolidation of all the values, parameters, settings or configurations for each of the PEs 548. Consolidated counter values 665A-N may include any number of arrays of structures for storing information that is used during the calculating or determining the new counter values 610A-N or new counter adjustments 615A-N. In some embodiments, consolidated counter values 665A-N may include cumulative sets of values, as shown in an example in table 3 below:

TABLE 3

A cumulative sets of values for a consolidated set of counter values

```
typedef struct noncons_cumulative_delta_stats
{
    u32bits packets_rcvd;
    u32bits packets_sent;
    u32bits bytes_sent;
    u32bits bytes_rcvd;
    u64bits fast_ttfb;
    u32bits fast_transactions;
    s32bits current_connections;
} noncons_cumulative_delta_stats_t;
```

Packet Engine 548, in addition to the previously discussed features and functionalities, may also include additional features and functionalities for generating, updating, calculating and maintaining timers 605, counter values 610, counter adjustments 615 and service values 620. In some embodiments, PE 548 comprises hardware, software or any combination of hardware and software for generating, calculating, storing, updating or maintaining a timer 605, counter values 610, counter adjustments 615 or service values 620. PE 548 may include scripts, executables, programs, applications, hardware devices, units or functions for controlling, managing and recalculating or updating counter values or timer values. PE 548 may comprise programs, functions, units or devices for communicating with consolidator 650 to exchange information regarding the update or consolidation of values of the counter values 610, counter adjustments 615 or the timer 605.

PE 548 may include programs, functions, scripts, units or devices for calculating, updating or generating counter values 610 or counter adjustments 615 using updated values from an update message from a consolidator 650. In one embodiment, PE 548 recalculates or updates counter values 610 or counter adjustments 615 using a script, program or a function such as the one presented in table 4.

TABLE 4

An example of a function, script or program for updating counter values 610, counter adjustments 615 or any other set of values on the

```
NSCLIST_FOR_EACH_CORE(svcptr,svc_glbl_list)
{
    svcptr-> deltastats. packets_rcvd = svc_stats_core_{n-1}[svcptr->svc_index].packets_rcvd – prev2svc_stats_core_{n-1}[svcptr->svc_index]. packets_rcvd;
    ....
    /* For current counter */
    svcptr-> deltastats. current_connections =
        svc_stats_core_{n-1}[svcptr->svc_index].
        current_connections –
        svc_stats_core_j[svcptr->svc_index]. current_connections ;
    svcptr->deltastats .lrtm_response_time=
        svc_stats_core_{n-1}[svcptr->svc_index].
        lrtm_response_time;
    svcptr->deltastats .current_load=
        svc_stats_core_{n-1}[svcptr->svc_index]. current_load;
}
```

As shown in the example from table 4, counter values 610 may be determined, generated, calculated, adjusted or updated based on any number of inputs or values from any of the counter values 610, counter adjustments 615, counters storage 660A, counter adjustments storage 660B or consolidated counters storage 660N. In some embodiments, consolidator 650 sends a message comprising consolidated counter values 665A-N. The consolidated counter values 665A-N may be generated using any combination of counter values 610A-N and counter adjustments 615A-N. PE 548 of a core 505 may receive the message from the consolidator 650 and implement the calculations such as shown in table 4 to update the counter values 610. Similarly, PE 548 may determine or calculate service values 620 based on any number of inputs or values from the counter values 610 and counter adjustments 615 that were previously updated and adjusted.

In one example, consolidator 650 may send a message or an instructions to each of the PEs 548 to update or adjust each of the counter values 610 on each of the PEs 548. Depending on the design, either the consolidator 650 or the PE 548 may be performing calculations for updating or adjusting counter values 610 on the PEs 548. In such an example, the consolidator 650 may either implement or send an instruction to a PE 548 of the plurality of PEs 548 to implement a set of instructions for updating a set of values, as shown in table 5 below:

TABLE 5

An example of a set of instructions for updating a set of values, such as the counter values 610.

```
NSCLIST_FOR_EACH(svcptr,svc_glbl_list)
{
    svc_stats_core_{n-1}[svcptr->svc_index]. packets_rcvd += svcptr-> fast_packets_rcvd;
    svcptr-> deltastats. packets_rcvd += svcptr-> fast_packets_rcvd;
    svcptr-> fast_packets_rcvd =0;
    svc_stats_core_{n-1}[svcptr->svc_index]. packets_sent += svcptr-> fast_packets_sent;
    svcptr-> deltastats. packets_sent += svcptr-> fast_packets_sent;
    svcptr-> fast_packets_sent=0;
    svc_stats_core_{n-1}[svcptr->svc_index]. bytes_rcvd += svcptr-> fast_bytes_rcvd;
    svcptr->deltastats.bytes_rcvd += svcptr-> fast_ bytes_rcvd;
    svcptr-> fast_ bytes_rcvd=0;
    ....
    /* For current counters */
    /* Remembering current counters in a per core or on a
    server_info */
    svc_stats_core_j[svcptr->svc_index].current_connections=svcptr->current_connections;
    /* Adding current counter values to consolidator structure */
    svc_stats_core_{n-1}[svcptr->svc_index].current_connections+=svcptr->current_connections;
}
```

In some embodiments, consolidator 650 may implement the calculation of the new set of values and present the PE 548 with the adjustment values 615 or the new set of counter values 610. In other embodiments, consolidator 650 sends a set of instructions such as the instructions presented above for PE 548 to implement and recalculate a new set of values. In further embodiments, consolidator 650 sends an instruction and a set of adjustment values 615 to a PE 548 and the PE 548 implements a calculation such as those shown in table 5 to generate an updated or a new set of counter values 610 for the PE 548. PE 548 may implement similar calculations also for generating sets of service values 620 as necessary.

Timer Sync 670 may any hardware, software or a combination of hardware and software for synchronizing, setting, resetting, controlling or managing one or more timers 605 on one or more PEs 548. In some embodiments, timer sync 670 includes scripts, executables, devices, units, functions or components for interacting and communicating with each of the timers 605A-N. Timer sync 670 may exchange communication, instructions and information with any of the PEs 548. Timer synch 670 may include logic, circuitry, functions or components for setting, resetting, adjusting, initiating and controlling each of the timers 605 on each of the PEs 548A-N. In some embodiments, timer sync 670 includes functionality and means for resetting one or more timers 605. Timer sync 670 may set the timer 605 count for any number of timers 605. In some embodiments, timer sync 670 resets the timer 605 count to zero for one or more timers 605. In other embodiments, timer sync 670 sets a timer 605 to a predetermined value. The value may be a value, time interval or a time duration set or chosen by the timer sync 670. Timer sync 670 may synchronize timers 605 to expire every 0.1, 0.3, 0.6, 0.9, 1, 1.5, 2, 2.5, 3, 3.5, 4, 5, 6, 7, 8, 9, 10, 15, 20, 25, 30, 40, 50, 70 or 100 milliseconds. Timer sync 670 may send instruction to the timer 605 to start counting. In some embodiments, timer sync 670 sends an instruction to the timer 605 to stop counting. In further embodiments, timer sync 670 sends instructions to PE 548 to reset the timer 605 to zero or to a predetermined value. Timer sync 670 may set each timer 605 of the plurality of timers 605 to expire at the same time, or a substantially same time. In some embodiments, timer sync 670 sets each timer 605 to expire at a time different from other timers 605. Timer sync 670 may include any functionality to manage, control and set any of the timers 605 to count any duration of time, or to expire at any point in time.

Figure 8B:
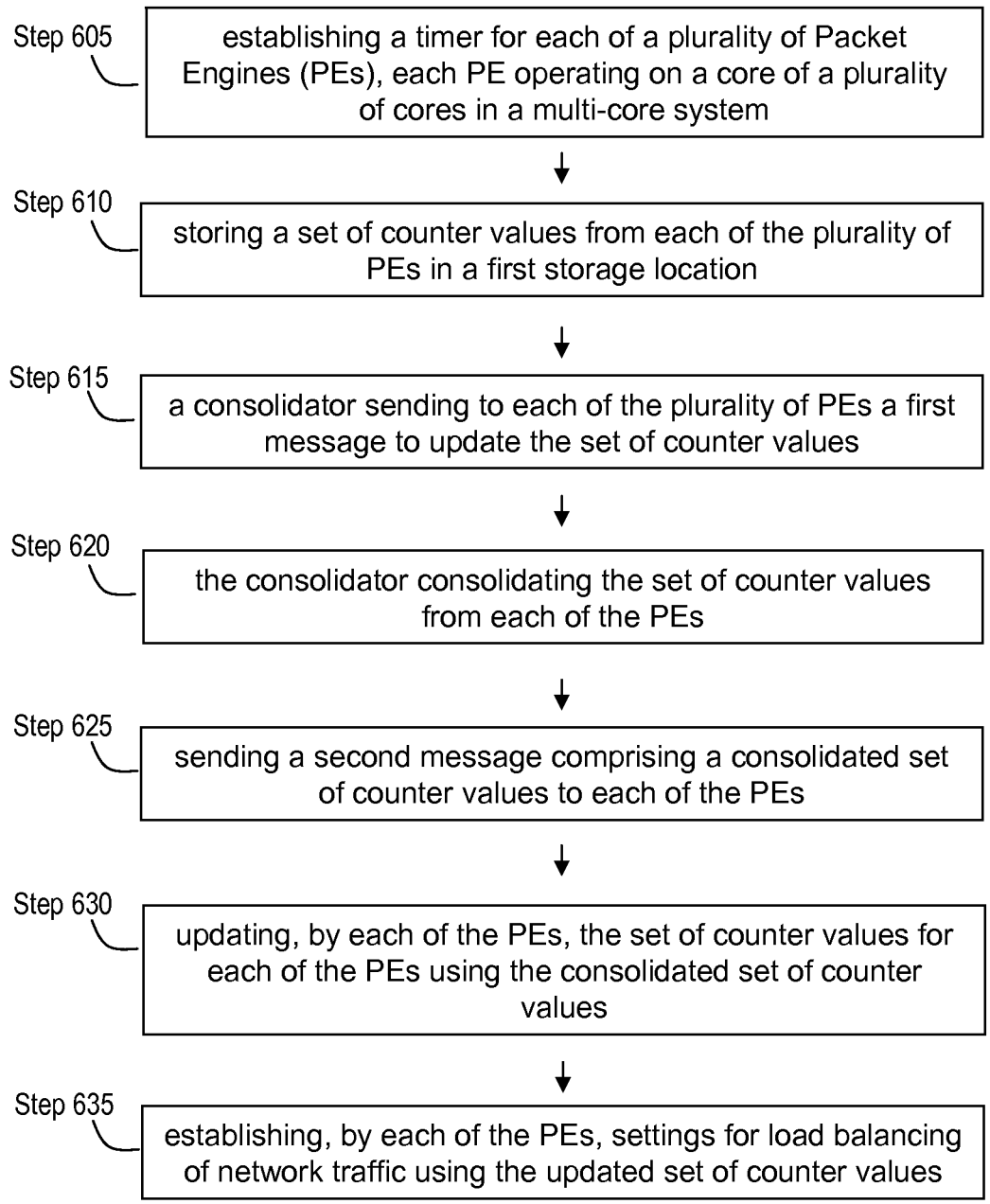
FIG. 8B is a flow diagram of an embodiment of steps of a method for synchronizing and consolidating metrics and statistics used for servicing network traffic locally across a plurality of cores of a multi-core intermediary device.

Referring now to FIG. 8B, embodiments of steps of a method for synchronizing and consolidating information, such as metrics and statistics stored in counters locally across a plurality of packet engines (PEs) in a multi-core system is illustrated. In brief overview, at step 605 a timer is established for each Packet Engine (PE) operating on a core of a plurality of cores in a multi-core system. At step 610, a set of counter values from each of the plurality of PEs is stored in a first storage location. At step 615, a consolidator sends to each of the plurality of PEs a first message to update the set of counter values. At step 620, the consolidator consolidates the set of counter values from each of the PEs. At step 625, a second message comprising a consolidated set of counter values is sent to each of the PEs. At step 630, each of the PEs updates the set of counter values for each of the PEs using the consolidated set of counter values. At step 635, each of the PEs establishes settings for load balancing of network traffic using updated set of counter values.

At step 605, each of the plurality of PEs 548 operating on each of the cores 505 in a multi-core appliance 200 establishes a timer. Consolidator 650 may operate on a master core 505 of the plurality of cores 505. Consolidator 650 may establish a timer 605 for the primary core 505 and the slave cores 505. In some embodiments, each of the PEs 548 establishes a timer 605. Timer 605 may be established to count any duration or period of time. Timer 605 may be preprogrammed or established according to a configuration. In one embodiment, timer 605 is established to count a duration of time between 1 and 5 milliseconds, such as for example 2.75 milliseconds. In further embodiments, timer 605 on a first PE 548 is established to count a duration of time that is different from a duration of time counted by another timer 605 on a second PE 548. In further embodiments, two or more timers 605 on each of the PEs 548 may be established to count a varying duration of time. Some timers 605 may be established to expire at the same time or at a substantially same time. Other timers 605 may be established to expire at different times. In some embodiments, each of the PEs 548 may establish a plurality of timers 605. One or more timers 605 may be established or reset responsive to a received instruction to establish or reset the timer from the timer sync 670. In response to receiving the instruction, one or more PEs 548 may establish or reset one or more timers 605 to count a duration of time, or to expire. Timer 605 may be recurring. The duration of the count or the expiration time for the timer 605 may be identified by the timer sync 670. In some embodiments, a timer 605 of a PE 548 indicates a duration of time within which the PE 548 may use a set of counter values 610 or the service values 620, for performing operations on the subsets of network traffic traversing the PE 548. In some embodiments, timer 605 is established to count down the time within which PE 548 will use a set of counter values stored in the counter values 610 for load balancing network traffic. Timer 605 may be established for a PE 548 to enable the PE 548 to load balance network traffic until the timer 605 expires. In some embodiments, timer 605 is established to count a duration of time during which a PE 548 manages load balancing of the network traffic responsive to the set of values from the counter values 610 or the service values 620 of the PE 548. Timer 605 may be established to count a duration of time during which PE 548 does not update the counter values 610. In some embodiments, upon expiration of the timer 605 counter values 610 may be updated.

At step 610, a consolidator 650 stores a set of counter values from each of the plurality of PEs 548 into one or more storage locations. Consolidator 650 may receive and store counter values 610 from a packet engine 548 and store the counter values 610 into a storage location. The storage location may be designated for a set of counter values 610 that correspond to that same packet engine 548. Consolidator 650 may receive the counter values 610 from PEs 548 of other cores 505 via core to core messaging. In some embodiments, consolidator 650 receives counter values 610 via shared memory that is accessed by each PE 548 of each of the cores 505. Consolidator 650 may maintain storages 660 on the shared memory. PEs 548 from each of the cores 505 may access and store their counter values 610 or counter adjustment values 615 into the shared memory for the consolidator 650. In some embodiments, consolidator 650 stores the set of counter values from one or more PEs 548 into a first storage location responsive to expiration of one or more timers 605 from the one or more PEs 548. In some embodiments, consolidator 650 stores counter values 610A from PE 548A into a corresponding or a reserved storage 660 for that set of counter values, such as the counters storage 660A. In further embodiments, consolidator 650 stores counter values 610 from all of the PEs 548 of the multi-core appliance 200 into counter values 610 within the counters storage 660A. The counter values 610 from each of the PEs 548 may be stored in the corresponding counter values 610A-N in the counter storage 660A which may be reserved for storing the counter values 610 of each particular PE 548. Counter values 610 may be organized as a number of array structures. Each of the values or parameters of the counter values stored may be stored in the corresponding location within the corresponding structure and for the corresponding array of the value. Each of the PEs 548A-N may send counter values 610A-N to be stored by the consolidator 650 into counter values 610A-N on the counters storage 660A in a same or a different array structure.

At step 615, the consolidator 650 sends to each of the plurality of PEs 548 a first message to update the set of counter values. Consolidator 650 may send the first message via by core to core messaging. In some embodiments, consolidator 650 sends the message to update via a shared memory. In other embodiments, consolidator 650 configures a timer 605 to expire at a timing when each of the plurality of PEs 548 should update the set of counter values. The first message may instruct the PEs 548 to store the set of counter values from counter values 610 from each of the PEs 548 into a second storage location. The second storage location may be any storage 660, such as counters storage 660A, counter adjustments storage 660B or consolidated counters storage 660N. In some embodiments, the first message instructs each of the PEs 548 to update or store counter values 610. In further embodiments, the first message instructs each of the PEs 548 to begin or initiate a process or a procedure for updating, adjusting or correcting values stored in the counter values 610 of each of the PEs 548. The first message may include one or more instructions to initiate or trigger updating procedure of the set of counter values for each of the PEs 548. In some embodiments, consolidator 650 sends the first message to a first PE 548 responsive to expiration of the timer 605 of the first PE 548. In further embodiments, consolidator 650 sends the first message to each of the PEs 548 responsive to the expiration of the timer 605 of the consolidator 650. In further embodiments, consolidator 650 sends one or more messages to update counter values 650A-N to each of the PEs 548A-N responsive to expiration of a timer responsive to expiration of any timer 605 on any of the cores 505. The first message may comprise any set of instructions for updating the set of counter values, such as the counter values 610, in the storage location, such as the counters storage 660A. Upon completion of updating the set of counter values, each of the PEs 548 may send to the consolidator 650 a message to acknowledge the completion of the updating. The acknowledgement message may be send via core to core messaging or any other inter-core communication.

At step 620, the consolidator 650 may consolidate the set of counter values from each of the PEs 548. In some embodiments, the consolidator 650 processes, modifies or adjusts any of the values from the counter values 610 received from any of the PEs 548. In further embodiments, consolidator 650 calculates a new value to replace a previous value or input in the counter values 610 of the PE 548. In yet further embodiments, consolidator 650 updates any number of values inside the arrays of structures in the counter values 610. In still further embodiments, consolidator 650 updates or modifies any number of values that correspond to counter values 610 of a PE 548 inside the counters storage 660. In some embodiments, consolidator 650 sums up one or more values that correspond to the same subset of network traffic from a plurality of counter values 610 from a plurality of PEs 548. In some embodiments, consolidator 650 sums up or consolidates values that correspond to a number of data packets received or sent by the PEs 548 for a subset of network traffic. In further embodiments, consolidator sums up or consolidates values that correspond to a number of data packets pending for transmission, operation or service to be performed by the PEs 548 for a subset of network traffic. In yet further embodiments, consolidator sums up or consolidates values that correspond to a number of bytes sent or received by the PEs 548 for a subset of network traffic. In further embodiments, consolidator sums up or consolidates values that correspond to a number transactions pending by the PEs 548 for a subset of network traffic. In still further embodiments, consolidator sums up or consolidates values that correspond to a number of connections that are open or active via the PEs 548 for a subset of network traffic. In yet further embodiments, consolidator sums up or consolidates values that correspond to a number available connections left for the PEs 548 for a subset of network traffic. In further embodiments, consolidator sums up or consolidates values that correspond to a bandwidth utilized by the PEs 548 for a subset of network traffic. In yet further embodiments, consolidator sums up or consolidates values that correspond to a bandwidth available for the PEs 548 for a subset of network traffic. In further embodiments, consolidator sums up or consolidates values that correspond to a response time measured, or an average response time measured by the PEs 548 for a subset of network traffic. The response time may include the time interval it takes for a response to be received from the time when the request is sent by the appliance 200 for a subset of network traffic, such as a connection to a client 102, server 106, a specific session or a specific connection. In some embodiments, consolidator sums up or consolidates values that correspond to a current load to be load balanced by the PEs 548 for a subset of network traffic.

At step 625, consolidator 650 sends a second message that comprises a consolidated set of counter values to each of the PEs 548. Consolidator 650 may send a second message to each of the PEs 548 that includes consolidated counter values 655 that corresponds to each of the PEs 548. In some embodiments, consolidator 650 sends a second message comprising consolidated counter values 665A from the consolidated counters storage 660N to PE 548A of the core 505A. Consolidator 650 may send a second message to the plurality of PEs 548 at the same time, or at a substantially the same time. In yet further embodiments, consolidator 650 sends the second message to the plurality of PEs 548 within a predetermined time interval. In still further embodiments, consolidator 650 sends the second message to each of the PEs 548 periodically, such as for example every 0.25, 0.5, 1, 1.5, 2, 2.5 or every 3 milliseconds. In yet further embodiments, consolidator 650 sends the second message to a second PE 548 a specific period of time after sending the second message to a first PE 548. In yet further embodiments, consolidator 650 sends a second message to a third PE 548 after the same specific period of time after sending the second message to the second PE 548. The second message may include a same consolidated set of values for the second message to each of the PEs 548. In some embodiments, the second message from a first PE 548 includes a different consolidated set of values from a second PE 548. In other embodiments, two or more PEs 548 receive the same or a substantially similar consolidated set of values. The substantially similar consolidated set of values may include adjustments for differences between the first and second original counter values 610 receive by the consolidator. The second message may include any number of instructions, scripts or steps for calculating or updating the new counter values 610 for each of the PEs 548.

At step 630, each of the PEs 548 may update the set of counter values for the each of the PEs 548 using the consolidated set of counter values. Each of the PEs 548 may update the set of counter values for each of the PEs 548 using counter adjustments 615 values from the consolidator 615. In some embodiments, the consolidated set of counter values include counter adjustments 615 for each of the values to be updated by the PE 548. The counter adjustment values may include changes in values, or differences between the current counter values 610 of each PE 548 and the corrected or updated new counter values 610. In some embodiments, each of the PEs 548 replaces the counter values 610 with the values from the consolidated set of counter values. In other embodiments, each of the PEs 548 updates the counter values 610 using a combination of received counter adjustments 615 and the current counter values 610 to determine or calculate the new counter values 610. In yet further embodiments, PEs 548 receive the consolidated set of counter values 665 from the consolidated counters storage 660N and use a calculation method, script, or a function to calculate or determine updated counter values 610. In still further embodiments, each of the PEs 548 implements a function to recalculate each of the updated counter values 610 using any combination of the consolidated counter values 665, counter adjustments 615 and counter values 610. Upon completion of updating the set of counter values, each of the PEs 548 may send to the consolidator 650 a message to acknowledge the completion of the updating of the set of counter values using the consolidated set of values. The acknowledgement message may be send via core to core messaging.

At step 635, each of the PEs 548 establishes settings for load balancing of network traffic using the updated set of counter values. Each of the PEs 548 may determine or calculate any number of values stored in the service values 620 using the updated new counter values 610. In some embodiments, a PE 548 determines or calculates settings or parameters in the service values 620 using the updated set of counter values 610. In further embodiments, PE 548 adjusts or modifies one or more values in the service values 620 using calculations based on the updated set of counter values 620. In yet further embodiments, a PEs 548 establishes, determines or calculates settings, configuration points or instructions stored in the service values 620 responsive to updating by the PEs 548 the set of counter values 610. In yet further embodiments, all of the PEs 548 establish, determine or calculate settings, configurations or values in the service values 620 responsive to updating, by all the PEs 548, the set of counter values 610.

In one example, a multi-core system comprising a plurality of packet engines 548 load balances the network traffic via the plurality of packet engines 548. Each packet engine 548 may maintain a local set of statistics, metrics, values and parameters used for load balancing of the network traffic. The local set of metrics may be stored in an array of structures, where each structure may correspond to a particular subset of network traffic, such as the network traffic pertaining to a server 106, a client 102, a group of client 102 or server 106, one or more services or applications. In some embodiments, the local set of metrics corresponds to the total network traffic traversing the packet engine 548. As the network traffic is load balanced, each packet engine 548 updates the local set of metrics and statistics. The metrics and statistics may include a number of data packets received or transmitted, a number of bytes of network traffic received or transmitted, a number of open connections, a number of connections available for opening, a value for the bandwidth used or available or a current load of the network traffic pending to be load balanced. As each packet engine updates the local metrics and statistics in accordance with the local portion of network traffic load balanced, the metrics and statistics across all of the packet engines 548 may be in disagreement. As such, some packet engines 548 may think that there is more network traffic to be balanced than other packet engines. Similarly, some packet engines may think that there is less available bandwidth than other packet engines. As independent updating of metrics and statistics continues, packet engines 548 may be further from the correct metrics and statistics. The metrics and statistics may be consolidated by the consolidator 650 in order for each of the packet engines 548 to perform load balancing more efficiently.

Consolidator 650 may operate on a master core 505 of the plurality of cores 505. Consolidator 650 may include various storages 660 for storing metrics and statistics from each of the packet engines 548, such as for example the counter storages 660. Consolidator 650 may synchronize timers on each of the cores 505. Upon expiration of the timers, each of the PEs 548 may begin the statistics or metrics consolidation by storing counter values 610 to a counters storage 660A. Counters storage 660A may be located in a shared memory that is accessible by each core 505. In some embodiments, counter storage 660A is stored on the master core 505 at the consolidator 650 and the consolidator receives counter values 610 from each of the cores 505 to update the counters storage 660A. Consolidator 650 may store previously consolidated values to a new storage location such as a storage 660 in order to create an available space for storing the new consolidated values.

Further in the same example, the consolidator 650 may send to each of the packet engines 548 a first message to update the set of counter values 610 of the each PE 548 into a second storage location. The second storage location may be a counters storage 660A. Each PE 548 may send the metrics and statistics to the counters storage 660A. The metrics and statistics may include the local information corresponding to the number of data packets received or transmitted, the number of bytes of network traffic received or transmitted, the number of open connections, the number of connections available for opening or using, the value for the bandwidth used or available and a current load of the network traffic pending. Each PE 548 may update the locally available metrics and statistics by modifying the values in a memory shared storage or by sending the counter values 610 via core to core messaging. Once each of the packet engine 548 updates or stores the metrics and statistics into the counter storage 660A, each of the PEs 548 may send an acknowledgement that the storing or updating is completed. Consolidator 650 may, upon completion of the updating of values in the counter storage 660A, use the metrics and statistics from each of the PEs 548 to calculate a consolidated set of counter values.

The consolidated set of counter values may be calculated using all the information from each of the PEs 548. The metrics and statistics from a plurality of packet engines 548 that correspond to the same network traffic subset may be combined and consolidated. The consolidated set of counter values may be established or determined using the more up to date metrics and statistics from the counter values 610 from all the PEs 548 to establish the global metrics and statistics for the appliance 200. The consolidated set of counter values may include a consolidated value for the number of data packets received or transmitted by all of the PEs 548. The consolidated set of counter values may also include the consolidated number of bytes of network traffic received or transmitted by all PEs 548. The consolidated set of counter values may further include the consolidated number of open or used connections that are opened or used by all of the PEs 548. The consolidated set of counter values may further include the consolidated number of connections available for opening or using by all of the PEs 548. The consolidated set of counter values 548 may further include the consolidated value for the bandwidth used or available or a more up to date value for the current load of the network traffic pending. The consolidated set of counter values may further be tailored, modified or recalculated for each packet engine 548 individually. The consolidated set of counter values 610 may be stored in the consolidated counter values 665 of the consolidated counters storage 660N and may be the more up to date account of the metrics and statistics for the appliance 200. Consolidator 650 may send the consolidated set of counter values to each of the PEs 548 via core to core messaging. In some embodiments, each PE 548 accesses the consolidated set of counter values from the consolidated counter values 665A-N which may be stored a shared memory accessible by each of the PEs 548. Each PE 548 may use the consolidated set of counter values to update the previous counter values 610 for each PE 548. Each PE 548 may use the consolidated set of counter values to update the local PE 548 counter values that correspond to any of: the number of data packets received or transmitted, the number of bytes of network traffic received or transmitted, the number of open connections, the number of connections available for opening or using, the value for the bandwidth used or available and a current load of the network traffic pending. In some embodiments, each of the PEs 548 replaces the previous counter values 610 with the consolidated set of counter values. Each PE 548 may calculate a new set of service values 620 using the newly updated counter values 610. The new set of service values 620 may be used by each of the PEs 548 to set or modify the configuration or operation of the load balancing. Each PE 548 may perform the load balancing more accurately using the newly updated counter values and service values. Each PE 548 may locally update the counter values 610 while the load balancing is performed. Once the timer on each of the PEs 548 expires, the process of consolidating and updating may begin again. This cycle of consolidation of metrics and statistics may ensure that the counter values 610 and service values 620 locally stored on each PE 548 is maintained up to date and the load balancing performed by the PEs 548 is efficient and accurate.

I. Obtaining Metrics for Global Server Load Balancing by a Multi-Core GSLB Device A multi-core GSLB intermediary/appliance appliance 200/500 may be provide global service load balancing of network traffic across a plurality of sites. Each of the sites may include one or more intermediaries/appliances 200 load balancing the network traffic across a plurality of servers 106. Each of the servers 106 at each of the sites may receive the client requests from numerous different clients 102 load balanced by the load balancing virtual servers 275 at the site deployed intermediaries 200. When a client sends a DNS request to resolve an IP address associated with a uniform resource locator (URL), any core of the multi-core GSLB appliance may receive the DNS request. In such instances, a GSLB virtual server 275 of the core 505 receiving the request may use any available information or metrics to provide a DNS resolution. However, as the network traffic and the conditions on the network may change over time, the metrics used by GSLB virtual servers 275 may become outdated. Furthermore, as each of the cores of the multi-core GSLB appliance 200/500 may service different connections and perform different actions, each core 505 of the GSLB appliance 200/500 may comprise information not comprised by other cores 505. In such situations, some cores 505 in addition to having outdated information, may also have information that is not available to other cores 505. In order to avoid such discrepancy in the information available between the cores 505, GSLB appliance 200/500 may assign a master core which may obtain, receive, update and consolidate all the metrics pertaining to a particular site or a load balancing appliance 200/500. GSLB appliance 200/500 may also distribute or transmit the updated metrics information across the cores 505. Each of the cores 505 receiving the information from the master core 505 may then use the updated and consolidated metrics information to more accurately and efficiently resolve incoming DNS requests.

Figure 9A:
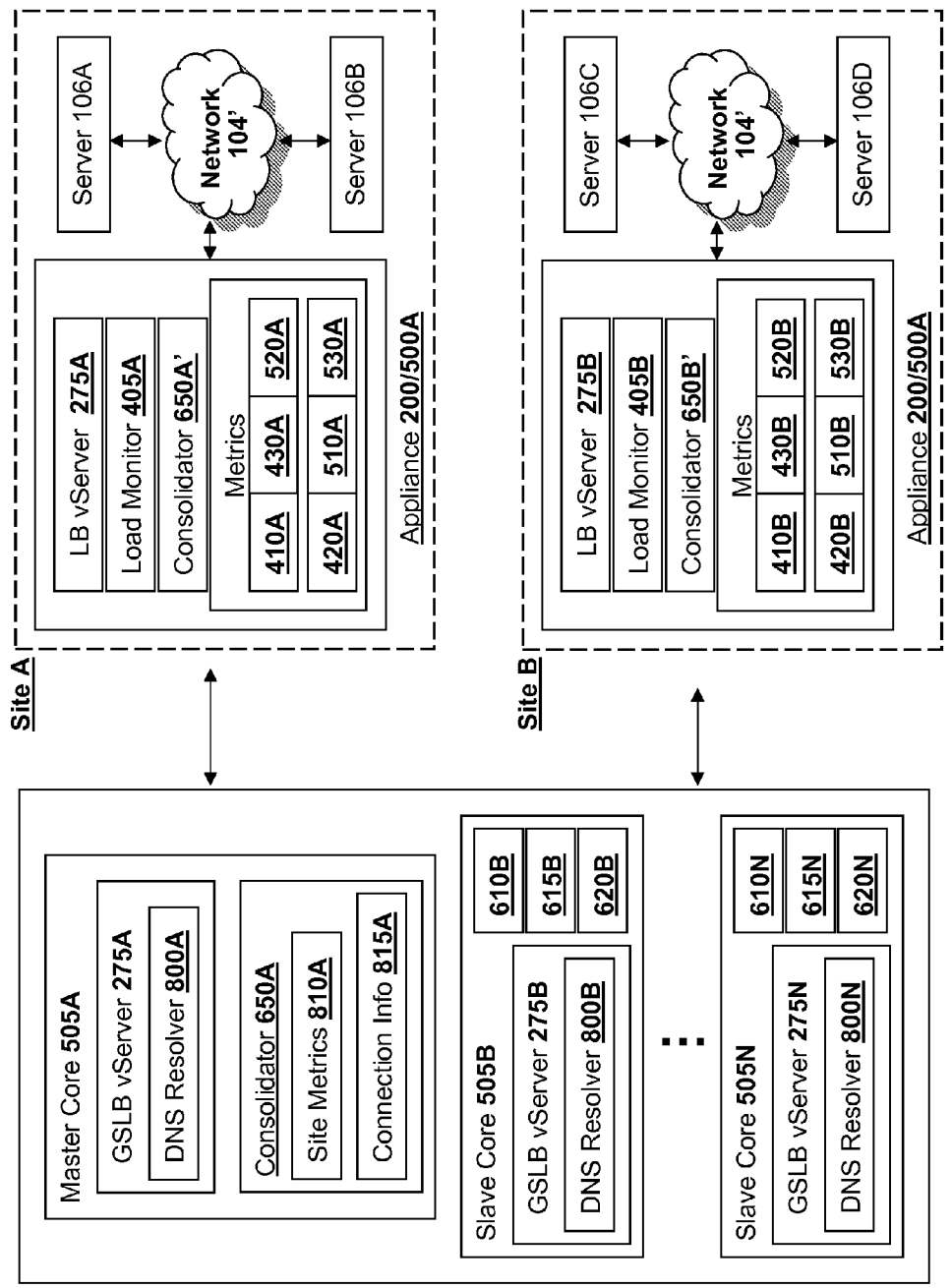
FIG. 9A is a block diagram of an embodiment of a system for global server load balancing by a multi-core GSLB device based on obtained metrics.

Referring now to FIG. 9A, an embodiment of a system for obtaining and updating metrics by a multi-core GSLB appliance 200/500 for performing global service load balancing across a plurality of sites is illustrated. In brief overview, FIG. 9A depicts GSLB appliance 200/500 comprising a plurality of cores 505A-N. Core 505A of the GSLB appliance 200/500 is identified as a master core 505A. The master core 505 A includes a GSLB virtual server 275A that includes a DNS resolver 800A. The master core 505A further comprises consolidator 650A that includes site metrics 810A and connection information 815A. Each of the remaining cores 505B-N of the GSLB appliance 200/500 include a GSLB virtual server 275 comprising a DNS resolver 800B. Each of the cores 505B-N also include counter values 610, counter adjustments 615 and service values 620. GSLB appliance 200/500 communicates with appliances/intermediaries 200/500A-B load balancing the network traffic across the servers 106A-B and 106C-D on each of the sites A and B. Intermediaries 200/500A-B each include load balancing vservers 275, load monitors 405 and consolidators 650A'-B'. Intermediaries 200/500A-B may also each include metrics, such as appliance collected metrics 410, device/server provided metrics 420, user selected/defined metrics 430, MEP based metrics 510, NMP based metrics 520 and GSLB metrics 530. GSLB appliance 200/500 may obtain metrics from each of the site deployed appliances 200/500A-B in order to maintain updated metrics for implementing the global server load balancing operations.

In further overview of FIG. 9A, a GSLB virtual server 275, in addition to any aforementioned functions of any other virtual server 275, may further comprise functionality, features or configurations for performing any global server load balancing specific operations. GSLB vserver 275 may include a virtual server 275 configured to balance network traffic across site deployed appliances 200/500. In some embodiments, GSLB vserver 275 distributes incoming network traffic from various clients across appliances 200/500. In further embodiments, GSLB vserver 275 resolved DNS requests from the clients 102. GSLB virtual server 275 may further comprise any functionality for DNS resolution. In some embodiments, GSLB virtual server 275 comprises a DNS resolver 800, a DNS server or any device, component or a function capable of resolving DNS requests. In further embodiments, GSLB vserver 275 comprises information for resolving DNS requests, such as internet protocol addresses, domain names and host names stored in a cache for retrieval and resolution of DNS requests. GSLB virtual server 275 may be executing on any core 505 of the multi-core GSLB appliance 200/500. GSLB virtual server 275 may direct, manage or load balance network traffic across a plurality of sites, such as sites A and B, using metrics and information updated from a master core 505. In some embodiments, GSLB virtual server 275 of a slave core 505 resolves DNS requests using updated and consolidated metrics received from the consolidator 650 operating on a master core 505A.

A master core 505 of a multi-core appliance 200/500 may be assigned a master status based on any action or operation.

A master core 505 may be assigned a master status based on a connection established between that particular core 505 and an intermediary 200/500 deployed at a site. In some embodiments, a core 505 establishing a connection with an appliance 200/500 becomes a master 505 for all operations, services or network traffic assigned to or associated with that particular appliance 200/500. A core 505 may become a master core 505 for obtaining, maintaining, consolidating and updating any information about a particular appliance 200/500 with whom the core 505 has established a connection. In some embodiments, a core 505 is assigned a master status may be assigned a master status on connection by connection basis. In such embodiments, core 505B may be a master for operations or services regarding an intermediary 200/500B load balancing the network traffic at site B, while core 505A may be a master for services or operations regarding an intermediary 200/500A at site A. In some embodiments, a core 505A may be a master for all appliances 200/500. In some embodiments, a core 505 that establishes a connection or a service with an appliance 200/500 becomes a master for that connection or for that service. In such embodiments, multiple cores 505 may perform actions of a master core, while there will be only one master core 505 for any particular connection or any particular service. A master core 505 may be declared a master for obtaining, maintaining, consolidating and propagating metric information for a particular appliance 200/500 operating on a particular site. Such master core 505 may also establish a monitor, such as a load monitor, in order to maintain knowledge or information of load handled by the load balancing appliance 200/500.

DNS resolver 800 may include any hardware, software or a combination of hardware and software for resolving a DNS request. DNS resolver 800 may include any functions, algorithms, logic, database of information stored in a memory and any processing power for translating a domain name of a client request into an IP address. In some embodiments, DNS resolver 800 comprises any functionality for translating an IP address into a domain name. DNS resolver 800 may comprise any functionality for translating a URL into an IP address of a network device which may provide information requested by the URL. In further embodiments, DNS resolver 800 comprises functionality for picking out an IP address in order to most efficiently load balance network traffic across multiple sites. For example, if a client requests a DNS resolution, DNS resolver 800 may provide a plurality of IP addresses which may satisfy the client request. However, DNS resolver 800 may provide additional functionality to identify the IP address of the plurality of available IP addresses that is most appropriate based on the available metrics, such as site metrics 810. In some embodiments, DNS resolver 800 identifies a site designated load balancing intermediary 200/500 to forward the client request to. The site designated intermediary 200 may receive the client request and further forward the request to the most appropriate server 106 to handle the request. DNS resolver 800 may work in conjunction with GSLB vserver 275 to resolve DNS requests such that the client requests are efficiently distributed across the sites, such as sites A and B.

DNS resolver 800 may store any information used for resolving a DNS request into a storage location for retrieval during DNS resolution process. DNS resolver 800 may store in a cache any information linking or associating a host name and an IP address pair for a particular resource at a server 106. In some embodiments, DNS resolver 800 stores in a cache information from load balancing appliances 200/500 associating URLs, host names and domain names with one or more IP addresses. The IP addresses associated with the URLs, host names and domain names may include IP addresses of intermediaries 200/500 and/or servers 106. DNS resolver 800 may store any information, such as lists of domain names and IP addresses for linking or associating domain names to IP addresses. Similarly, DNS resolver 800 may use any piece of information, such as an object, a URL, a string of characters or a parameter to identify a particular IP address of a network device. DNS resolver 800 may store any DNS related information into site metrics 810 of a consolidator 650. DNS resolver 800 may store any information for DNS resolution into consolidator 650. Consolidator 650 may obtain, update and consolidate any metrics or information from appliances 200/500 at remote sites in order to enable the DNS resolver 800 to resolve DNS requests using the updated information.

DNS resolver 800 may function and operate on any core 505A-N. Any core 505 of a GSLB appliance 200/500, assigned a master or a slave status may utilize a DNS resolver 800 for resolution of any DNS requests. DNS resolvers 800 of operating on a slave 505, such as 505B-N, may resolve DNS requests 800 using statistics and metrics stored locally in counters and values 610, 615 and 620. However, the locally stored statistics and metrics may be updated by consolidator 650A operating on the master core 505. The statistics and metrics from the consolidator 650 may modify or change any information that may be used by DNS resolver 800 of a slave core 505, such as a domain name and IP address pair, a host name and IP address pair, an object and IP address pair, a URL and IP address pair or any information or statistics that may be used to resolve a particular IP address requested by a DNS request.

In addition to aforementioned features of any consolidator 650, consolidator 650 of the GSLB appliance 200/500 may also include functionality to gather and obtain any information used for global server load balancing. Consolidator 650 may include a monitor, or a monitoring service for a master core of GSLB appliance 200/500 to monitor, receive, obtain and maintain updated information about load balancing appliances 200/500 deployed at remote sites A and B. Consolidator 50 may monitor, obtain, update and consolidate information about any appliances 200/500. Consolidator 650 of the GSLB vserver 275A may include a functionality to gather, receive or obtain any metric information from the intermediaries 200/500 deployed at any site, such as sites A and B. In some embodiments, consolidator 650 includes functionality to obtain and consolidate any information comprised by a consolidator 650A of intermediary 200/500A deployed on site A. Consolidator 650 may directly communicate with consolidator 605' of a load balancing intermediary 200/500 deployed at any of the sites. Consolidator 650 may gather, receive or obtain any information from consolidators 650A' and use such information to consolidate or update existing metrics information on GSLB vserver 275A. Consolidator 650 may gather, receive, updates, and/or consolidates any metrics, such as site metrics 810 information, using any metrics from any consolidators 650A' on load balancing intermediaries 200/500. In some embodiments, consolidator 650 gathers or receives information from an appliance collected metrics 410 at an intermediary 200/500. In further embodiments, consolidator 650 gathers or receives information from a device/server provided metrics 420 at an intermediary 200/500. In still further embodiments, consolidator 650 gathers user selected/defined metrics 430 from intermediaries 200/500. In yet further embodiments, consolidator 650 gathers MEP based metrics 510 from intermediaries 200/500. In still further embodiments, consolidator 650 gathers NMP based metrics 520 and/or GSLB metrics 530 from intermediaries 200/500. Consolidator 650 of the GSLB appliance 200/500 may obtain metrics from each of the site deployed appliances 200/500A-B in order to maintain updated metrics for implementing the global server load balancing operations. In some embodiments, consolidator 650 gathers information and/or metrics from other GSLB appliances 200/500, and/or other consolidators 650 at other GSLB appliances 200/500.

Consolidator 650 may also comprise functionality to update or consolidate any metrics or information received from other load balancing intermediaries 200/500. Consolidator 650 may include any hardware, software, or a combination of hardware and software described herein to update, recalculate and consolidate any metrics or information from any GSLB or load balancing intermediary 200/500 or any core 505 of any GSLB or load balancing intermediary 200/500. In some embodiments, consolidator 650 includes processors, logic circuits, memory caches, functions and algorithms for updating and/or consolidating information gathered from remote appliances 200/500 or remote GSLB appliances 200/500. Each of the cores 505A-N of the GSLB appliance 200/500 may gather information from remote load balancing appliances 200/500. Each of the cores 505A-N may store information into core 505 designated counter values 610, counter adjustments 615 and service values 620. Cores 505 may provided metrics gathered from the remote appliances 200/500 to the consolidator 650 to be consolidated and updated. Consolidator 650 may update, recalculate and consolidate the metrics gathered from each of the cores 505A-N and provide consolidated and updated metrics back to each of the cores 505A-N to be used for global service load balancing. In some embodiments, consolidator 650 updates and/or consolidates metrics used for global service load balancing based on the information or metrics received from any of the cores 505A-N, and cores 505A-N may receive metrics or information from site deployed load balancing intermediaries 200/500. In such a configuration, consolidator 650 of the GSLB load balancer 200/500 may obtain, gather, consolidate and provide the most updated metrics to cores 505 of the GSLB appliance 200/500. Each of the cores 505A-N may use the most updated metrics and store them into service values 620. Each of the GSLB virtual servers 275A-N at each of the cores 505A-N may use the most updated metrics to perform global service load balancing tasks efficiently.

Consolidator 650 of the GSLB appliance 200/500 may obtain, update and consolidate any information regarding any particular site deployed load balancing appliance 200/500. Consolidator 650 may obtain or gather any metrics for a DNS request resolution of any request concerning a resource or service provided via servers 106 load balanced by such particular appliance 200/500. Consolidator 650 may obtain or gather any information linking or associating a host name and an IP address pair for a particular resource at a server 106. In some embodiments, consolidator 650 obtains lists of domain name and corresponding IP addresses corresponding to servers 106 managed by a particular appliance 200/500. Consolidator 650 may receive updates from the load balancing appliance 200/500 regarding any updates or changes to the list of domain names and IP addresses. Similarly, consolidator 650 may obtain information from load balancing appliances 200/500 associating any objects, identifiers, data, URLs, host names and domain names with one or more IP addresses. IP addresses associated with the URLs, host names and domain names may include IP addresses of intermediaries 200/500 and/or servers 106. In some embodiments, consolidator 650 obtains and gathers information about connection statuses from intermediaries 200/500. For example, consolidator 650 may obtain, gather and maintain information about active or existing connections traversing intermediary 200/500. In some embodiments, consolidator 650 obtains or gathers information or metrics about states of each of the connections. Consolidator 650 may obtain, update and maintain metrics about any connections between a client 102 and intermediary 200/500, client 102 and server 106 traversing the intermediary or server 106 and intermediary device. Consolidator 650 may obtain, update and maintain metrics indicating that the current state of a connection is any of: established, active, listen, timed out or closed. Consolidator 650 may distribute any received connection related metrics or information, such as connection status to each of the cores 505A-N of the GSLB appliance 200/500.

Site metrics 810 may include any type and form of information, statistics or metrics regarding the network traffic managed or serviced by network devices at a particular site. Site metrics 810 may include information or metrics used for resolving a DNS request by a DNS resolver 800. Site metrics 810 may include any information linking or associating an information or a feature to an IP address of a network device. In some embodiments, site metrics 810 include domain name and IP address pairs, URL and IP address pairs, host name and IP address pairs, object and IP address pairs or any information that may be used to resolve an IP address from a DNS request. Site metrics 810 may include any metrics, statistics or information about the network traffic traversing a particular load balancing appliance 200/500 at a particular site, such as sites A and B. Site metrics 810 may include any information or metrics from a consolidator 650A of a site deployed load balancer appliance 200/500. Site metrics 810 may include any information about a connection, such a status of a connection and any information about a session, such as a status of a session.

Site metrics 810 may include any information about any network devices managed by GSLB appliance 200/500. In some embodiments, site metrics 810 include metrics or information about a status of a server 106 at a site load balanced, serviced or managed by GSLB appliance 200/500. For example, a status may indicate that a network device, such as the server or appliance 200/500 is down, unavailable, off line, on line, available, receiving network traffic, not receiving network traffic, overloaded by network traffic, not overloaded by network traffic, available to accept more network traffic, not available to accept more network traffic or any other status that may be used by GSLB appliance 200/500 to distribute the network traffic across site deployed appliances 200/500. In some embodiments, site metrics 810 include information about a status of another GSLB appliance 200. In further embodiments, site metrics include information about a particular service or resource provided by a server at any of the sites, such as service or resource available, service or resource unavailable, service or resource limited or service or resource overloaded by requests. In further embodiments, site metrics 810 include information or metrics about a status of any virtual servers 275 operating at load balancing appliances 200/500. In some embodiments, site metrics 810 include information that a virtual server 275 is unavailable, available, off line, on line, receiving network traffic or not receiving network traffic. Site metrics 810 may include any type of metrics or information used by any appliance 200/500 to manage, service or optimize network traffic.

Site metrics 810 may include any information stored on any consolidator 650 of any intermediary/appliance 200/500 or any information used for any global service load balancing operation. Site metrics 810 may include lists of IP addresses and corresponding domain names. The list of IP addresses and domain names may correspond a particular domain name to a particular IP address. Such lists may be used by DNS resolvers to resolve client 102 DNS requests. Site metrics 810 may also include metrics stored on a site deployed intermediary 200/500, such as metrics 410, 420, 430, 510, 520 and 530. In some embodiments, site metrics 810 of a GSLB appliance 200/500 includes appliance collected metrics 410. In further embodiments, site metrics 810 of a GSLB appliance 200/500 includes device/server provided metrics 420 at an intermediary 200/500. In still further embodiments, site metrics 810 of a GSLB appliance 200/500 includes user selected/defined metrics 430 from intermediaries 200/500. In yet further embodiments, site metrics 810 of a GSLB appliance 200/500 includes MEP based metrics 510 from intermediaries 200/500. In still further embodiments, site metrics 810 of a GSLB appliance 200/500 includes NMP based metrics 520 and/or GSLB metrics 530 from intermediaries 200/500.

Connection information 815 may include any type and form of information about any connection between the network devices. Connection info 815 may include an information about a connection between GSLB appliance 200/500 and a site deployed intermediary appliance 200/500. Connection information 815 may include information indicating which core 505 of the plurality of cores 505 is a master core for a particular connection. Similarly, connection information 815 may comprise information indicating which core 505 is not a master core or is a slave core for a particular connection. Connection info 815 may include a status of a connection, such as: established, active, listen, timed out or closed. Connection info 815 may maintain a status of a session established between GSLB appliance 200/500 and intermediary 200/500. Connection info 815 may include any information about a connection between a client 102 and server 106, via any of the GSLB appliance 200 and/or appliance 200/500. Connection info 815 may include any updates or net developments regarding the connection, such as change of a connection status or change in a service provided for a connection.

Figure 9B:
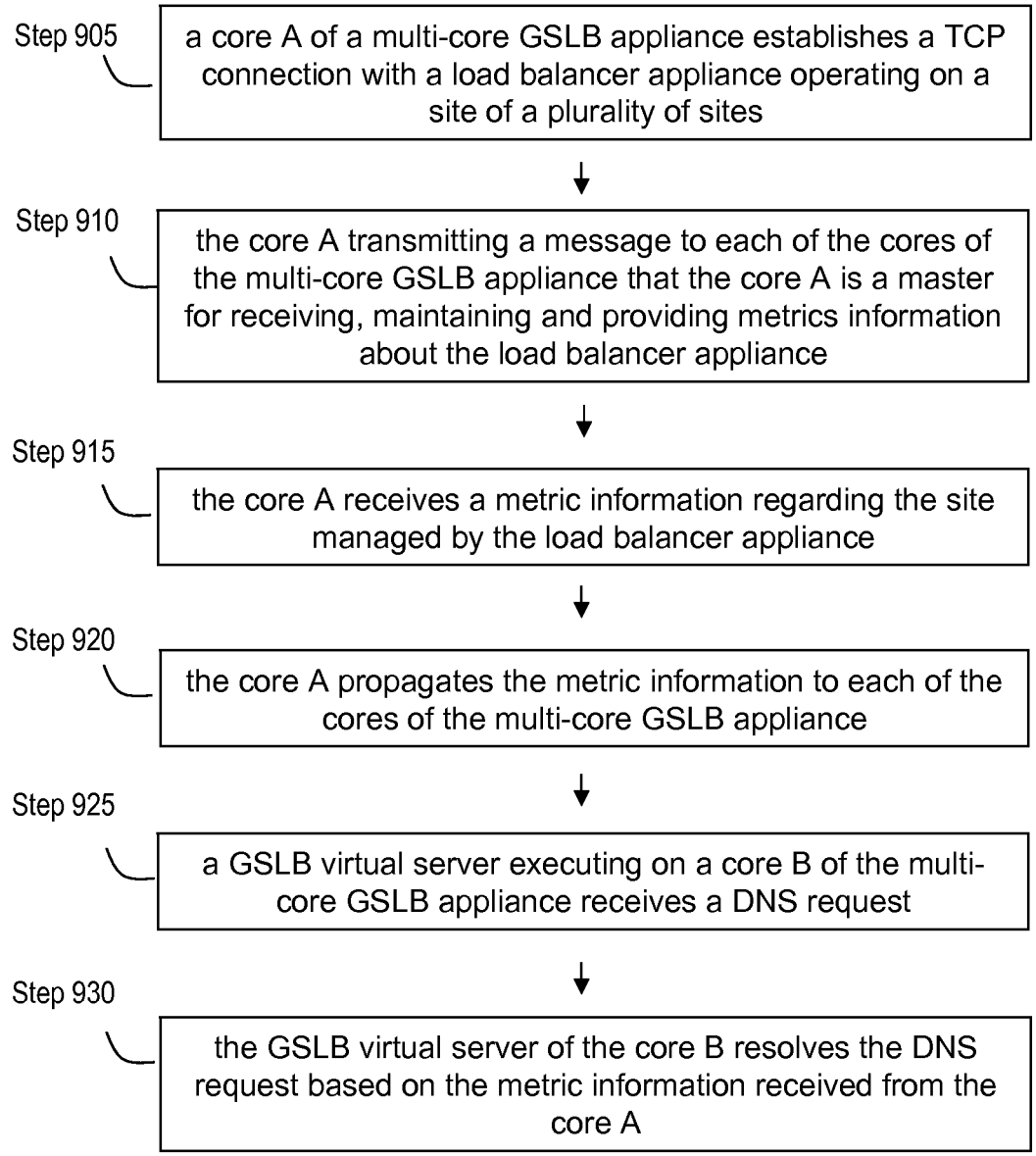
FIG. 9B is a flow diagram of an embodiment of steps of a method for global server load balancing by a multi-core GSLB device based on obtained metrics.

Referring now to FIG. 9B, an embodiment of steps of a method for performing global server load balancing services and operations based on metrics information obtained by a master core of a multi-core GSLB appliance is illustrated. In some embodiments, the method is for obtaining and/or using metrics information by a multi-core intermediary device to provide global server load balancing service to appliances at remote sites. At step 905, a core A of a multi-core GSLB appliance 200/500 establishes a TCP connection with a load balancer appliance 200/500 operating on a site of a plurality of sites. At step 910, the core A transmits a message to each of the cores of the multi-core GSLB appliance that the core A is a master core for receiving, maintaining and providing metrics information from the load balancer appliance 200. At step 915, the core A receives a metric information regarding the site managed by the load balancer appliance. At step 920, the core A propagates the metric information to each of the cores of the multi-core GSLB appliance. At step 925, a GSLB virtual server 275 executing on a slave core B of the multi-core GSLB appliance 200/500 receives a DNS request. At step 930, the GSLB virtual server of the slave core B resolves the DNS request using the metric information received from the master core A.

At step 905, a core A, such as core 505A, of a multi-core GSLB appliance 200/500 establishes a transport layer connection with a load balancer appliance 200/500A operating on a site A of a plurality of remote sites. In some embodiments, core A determines that an internet protocol (IP) address of the GSLB appliance 200/500 is lower than an IP address of the load balancer intermediary 200/500A. Core A may, in response to this determination, establish the transport layer connection to the load balancer appliance 200/500A operating at the site A. In further embodiments, another core, such as a core B of the same GSLB appliance 200/500 establishes a transport layer connection with another load balancer appliance 200/500B operating at site B. Core A may further establish a monitor, such as a consolidator 650, to monitor information or metrics about a status of the site A. In some embodiments, the consolidator 650 of the core A obtains, maintains and monitors metrics and statistics about load balancing appliance 200/500A operating at site A. In some embodiments, a core of the GSLB appliance 200/500, such as the core A, establishes a TCP connection with a load balancing appliance 200/500. In further embodiments, the core establishes a session with the load balancing appliance 200/500. In some embodiments, the core establishes a MEP or a SNMP connection with the load balancing appliance 200/500. In other embodiments, the core establishes a user datagram protocol (UDP) connection with the load balancing appliance 200/500. In further embodiments, the core establishes a datagram congestion control protocol (DCCP) connection with the load balancing appliance 200/500. In some embodiments, the core establishes a stream control transmission protocol (SCTP) connection with appliance 200/500.

At step 910, the core A transmits a message to each of the cores of the multi-core GSLB appliance 200/500 that the core A is the master core for receiving, maintaining and providing metric information concerning the load balancing appliance 200/500A. In some embodiments, core A transmits the message using an inter-core communication system, such as via core to core messaging. In some embodiments, core A sends the message via a shared memory. In other embodiments, core A sends a message via a periodic message update or reset of statuses for the cores 505. The message may instruct cores 505, other than the sending core 505A, to store information indicating that core 505A sending the message is the master core for obtaining and distributing metric information for the load balancing appliance 200/500A. In some embodiments, core B may transmit a message to each of the cores 505 of the GSLB appliance 200/500 that core B is the master core for receiving, obtaining and maintaining information about load balancing appliance 200/500B. Core B may transmit such information responsive to establishing a connection with appliance 200/500B. Cores B may transmit the message to each of the remaining cores 505 declaring the core B as the master in response to determination by core B that no other core has an established connection with appliance 200/500B. In some embodiments, core A establishes that no other core 505 of the GSLB appliance 200/500 maintains an active connection with load balancer appliance 200/500A, and in response to this determination transmits the message that core A is the master core.

At step 915, the core A receives a metric information regarding the site managed by the load balancer appliance 200A. In some embodiments, load balancing appliance 200/500A transmits the metric information via the connection established at step 905. In some embodiments, core B receives metric information from load balancing appliance 200/500B. In some embodiments, load balancer appliance 200/500A transmits the metric information to core A of the GSLB appliance 200/500 via a new connection. In some embodiments, core A receives from load balancing appliance 200/500A a metric information from a consolidator 650 operating at the load balancing appliance 200/500A. In some embodiments, core A receives metric information that may be used for resolving an DNS request, such as information about an IP address, a host name, a domain name or a URL. The metric information may include a list of IP addresses and corresponding domain names to be used for DNS resolution for requests concerning site A. The metric or the information may further comprise information about a status of a server 106 at site A or the load balancer appliance 200/500A. In some embodiments, core A receives a metric information to be handled by consolidator 650 of the GSLB appliance 200. The metric information may include any information, such as information managed or handled by a consolidator 650, the received metric information to any information that may involve appliance collected metrics 410, device/server provided metrics 420, user selected/defined metrics 430, MEP based metrics 510, NMP based metrics 520 and GSLB metrics 530.

At step 920, the core A propagates the metric information to each of the cores of the multi-core GSLB appliance 200/500. In some embodiments, core B propagates the metric information received from site B, or the load balancer appliance 200/500B to each of the cores of the GSLB appliance 200/500. The cores A or B may propagate the metric information after the metric information has been consolidated by consolidator 650 of the GSLB appliance 200/500. In some embodiments, a core 505 may receive an updated metric information from core A regarding load balancing appliance 200/500B and ignore the updated metric information in response to the determination that core A is not a master for information about load balancing appliance 200/500B. Similarly, a core 505 may receive updated metric information from core B about load balancer appliance 200/500B and accept the information in response to the determination that core B is master core concerning information about appliance 200/500B. In some embodiments, core A propagates an update message to each of the cores 505 that identifies a difference between an updated metric information and the previous metric information. Cores 505 receiving the update message may use the update message to update the metric information. In further embodiments, core A propagates the metric information along via instructions that the information propagated is the most up to date information. Each of the receiving cores 505 may store the received metric information for retrieval in case the metric information needs to be used to respond to a client request. Each of the cores 505 receiving the propagated metric information may replace prior metric information with the newly received metric information. In some embodiments, each slave core 505 receiving the propagated metric information may use the received metric information to update the metric information stored locally on the slave core 505. In some embodiments, the metric information is updated in the consolidator 650 and then propagated to each of the remaining cores 505. In some embodiments, the metric information is forwarded to each of the cores 505 without being consolidated by consolidator 650. In some embodiments, core A propagates the metric information using an inter-core communication system, such as core to core messaging. In some embodiments, core A propagates the metric information by making it available via a shared memory. In other embodiments, core A propagates the metric information via a periodic message update to each of the cores 505.

At step 925, a GSLB virtual server operating on a core B of the multi-core GSLB appliance 200/500 receives a DNS request from a client 102. The DNS request may be any type of DNS request requesting a resolution of an IP address for a resource or service. In some embodiments, the DNS request requests to resolve a domain name. In some embodiments, the DNS requests provides a URL and requests an IP address of a network device that provides the resource identified by the URL. In further embodiments, the DNS requests includes an object or any piece of information which the GSLB virtual server 275 may use to identify a particular server 106 or a particular load balancing appliance 200/500. The DNS request may be from any network device on the network 104, such as any client 102 or any appliance 200/500.

At step 930, the GSLB virtual server of the core B resolves the DNS request based on the metric information received from the core A. GSLB virtual server 275 may use metric information received from core A in order to resolve the DNS request. In some embodiments, DNS resolver of the GSLB virtual server may use an updated list of domain names or IP addresses received via the metric information at step 920 to resolve the DNS request. GSLB virtual server 275 may use list of updated IP addresses and domain names to identify a particular IP address for a response for a DNS request. GSLB virtual server 275 may use the metric information, such as the list of domain name and IP address pairs, in response to determining that the metric information is received from the core A which is identified as the master core for appliance 200/500A. GSLB virtual server 275 may rely on the information provided from the core 505 identified as the master core 505 for obtaining and providing information for a particular load balancer intermediary 200/500. GSLB virtual server 275 may transmit the response to the DNS request along with the resolved IP address back to the client 102. In some embodiments, GSLB virtual serve 275 resolves the IP address and forwards the resolved IP address to other components of the GSLB appliance 200/500 which then forward the DNS response back to the client 102.

We claim:

1. A method of providing domain name service (DNS) resolution via a device comprising a plurality of cores, the method comprising:
   (a) receiving, by a first core of a device having a plurality of cores and intermediary to a plurality of clients and a plurality of remote sites, via a transport layer connection between the first core and a second device of a first remote site of the plurality of remote sites, site metrics for the first remote site of the plurality of remote sites, the site metrics comprising a plurality of internet protocol (IP) addresses and corresponding domain names, wherein the first core is designated as a master core to receive site metrics from the first remote site;
   (b) communicating, by the first core via core-to-core messaging, the plurality of internet protocol (IP) addresses and corresponding domain names of the site metrics to each of the other cores of the device acting as slave cores with respect to the site metrics for the first remote site; and
   (c) determining, by a second core of the device responsive to receipt of a domain name service (DNS) request from a client of the plurality of clients for a domain name of the first remote site, a resolution of the DNS request to an internet protocol address corresponding to the first remote site based on the plurality of IP addresses and corresponding domain names of the metric information.

2. The method of claim 1, wherein step (a) further comprises establishing, by the first core, the transport layer connection to the second device of the first remote site.

3. The method of claim 2, further comprising receiving, by the first core, the site metrics transmitted from the second device via the transport layer connection.

4. The method of claim 1, further comprising storing, by the second core, to memory the site metrics received from the first core.

5. The method of claim 1, wherein step (c) further comprises receiving, by a virtual server executing on the second core, the DNS request from the client.

6. The method of claim 1, wherein step (c) further comprises determining, that the domain name of the DNS request matches a domain name from the site metrics of the first remote site.

7. The method of claim 1, further comprising monitoring, by a core of the device, a status of the first remote site.

8. The method of claim 7, further comprising determining, by the core responsive to monitoring, that the first remote site is down and transmitting, by the core to the other cores of the device, a communication that the first remote site is down.

9. The method of claim 8, further comprising excluding, by each of the cores of the device, the first remote site from determining a resolution for a second DNS request.

10. The method of claim 1, wherein the device provides global server load balancing of client requests among the plurality of remote sites.

11. A system of providing domain name service (DNS) resolution via a device comprising a plurality of cores, the system comprising:
    a device having a plurality of cores and intermediary to a plurality of clients and a plurality of remote sites;
    a first core of the device configured as a master core to receive, via a transport layer connection between the first core and a second device of a first remote site of the plurality of remote sites, site metrics for the first remote site of the plurality of remote sites and communicate via core-to-core messaging a plurality of internet protocol (IP) addresses and corresponding domain names of the site metrics to each of the other cores of the device acting as slave cores with respect to the site metrics for the first remote site; and
    a second core of the device configured to determine, responsive to receipt of a domain name service (DNS) request from a client of the plurality of clients for a domain name of the first remote site, a resolution of the DNS request to an internet protocol address corresponding to the first remote site based on the plurality of IP addresses and corresponding domain names of the metric information.

12. The system of claim 11, wherein the first core is configured to establish the transport layer connection to the second device of the first remote site.

13. The system of claim 12, wherein the first core is configured to receive the site metrics transmitted from the second device via the transport layer connection.

14. The system of claim 11, wherein the first core is configured to store to memory the site metrics received from the first core.

15. The system of claim 11, wherein a virtual server executing on the second core is configured to receive the DNS request from the client.

16. The system of claim 11, wherein the second core is configured to determine the domain name of the DNS request matches a domain name from the site metrics of the first remote site.

17. The system of claim 11, wherein a core of the device is configured to monitor a status of the first remote site.

18. The system of claim 17, wherein the core is further configured to, responsive to monitoring, that the first remote site is down and transmit to the other cores of the device a communication that the first remote site is down.

19. The system of claim 18, wherein each of the cores of the device is configured to exclude the first remote site from determining a resolution for a second DNS request.

20. The system of claim 11, wherein the device is configured to provide global server load balancing of client requests among the plurality of remote sites.

* * * * *